United States Patent
Fujimora et al.

(10) Patent No.: US 6,683,493 B1
(45) Date of Patent: Jan. 27, 2004

(54) TIMING REPRODUCING DEVICE AND DEMODULATOR

(75) Inventors: Akinori Fujimora, Tokyo (JP); Seiji Okubo, Tokyo (JP); Toshiharu Kojima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 154 days.

(21) Appl. No.: 09/926,069

(22) PCT Filed: Sep. 21, 2000

(86) PCT No.: PCT/JP00/06468

§ 371 (c)(1),
(2), (4) Date: Aug. 23, 2001

(87) PCT Pub. No.: WO01/58104

PCT Pub. Date: Aug. 9, 2001

(30) Foreign Application Priority Data

Feb. 4, 2000 (JP) .......................................... 2000-27080

(51) Int. Cl.[7] .............................................. H03D 3/00
(52) U.S. Cl. ........................ 329/304; 329/307; 375/324; 375/326; 375/327; 375/376
(58) Field of Search .......................... 329/304; 375/324, 375/326, 327, 376

(56) References Cited

U.S. PATENT DOCUMENTS

| 5,170,415 A | 12/1992 | Yoshida et al. ............. 329/304 |
| 6,002,728 A | 12/1999 | Blois et al. ................. 375/355 |

FOREIGN PATENT DOCUMENTS

| JP | 61-191137 | 8/1986 |
| JP | 6-141048 | 5/1994 |
| JP | 7-212430 | 8/1995 |
| JP | 7-235956 | 9/1995 |
| JP | 8-46658 | 2/1996 |
| JP | 11-261661 | 9/1999 |
| WO | WO 95/13675 | 5/1995 |

OTHER PUBLICATIONS

T. Nagura, et al., Proceedings of the Conference on Communications, vol. 3, XP–000535034, pp. 1636–1640, "QPSK Carrier and Bit–Timing Simultaneous Recovery Scheme For Coherent Demodulation", Jun. 18, 1995.

T. Takao, et al., IEICE Trans. Fundamentals, vol. E80–A, No. 7, XP–000748949, pp. 1183–1189, "A New Bit Timing Recovery Scheme For High Bit Wireless Access", Jul. 1997.

A. Fujimura, et al., Electron Information Communication Society, vol. J81–B–11, No. 6, pps. 665–668, "Timing Recovery Scheme Using Received Signal Phase Information For QPSK Modulation," Jun. 1998 (with English translation).

T. Nagura, et al., Technical Report of IEICE, RCS94–60, The Institute of Electronics, Information and Communication Engineers, pps. 7–12, "Carrier–Clock Simultaneous Recovery Scheme," Sep. 1994, (with English translation).

*Primary Examiner*—Arnold Kinkead
(74) *Attorney, Agent, or Firm*—Oblon, Spivak, McClelland, Maier & Neustadt, P.C.

(57) ABSTRACT

In-phase and orthogonal components of a base band signal having a preamble symbol are squared to obtain squared in-phase orthogonal components. Amount of correlation is obtained between the squared in-phase component and a ½ symbol frequency component output from a VCO or an oscillator, and amount of correlation is obtained between the squared orthogonal component and the ½ symbol frequency component. Finally, a phase control signal for carrying out a phase control is generated by using the obtained amount of correlations.

41 Claims, 36 Drawing Sheets

FIG.2
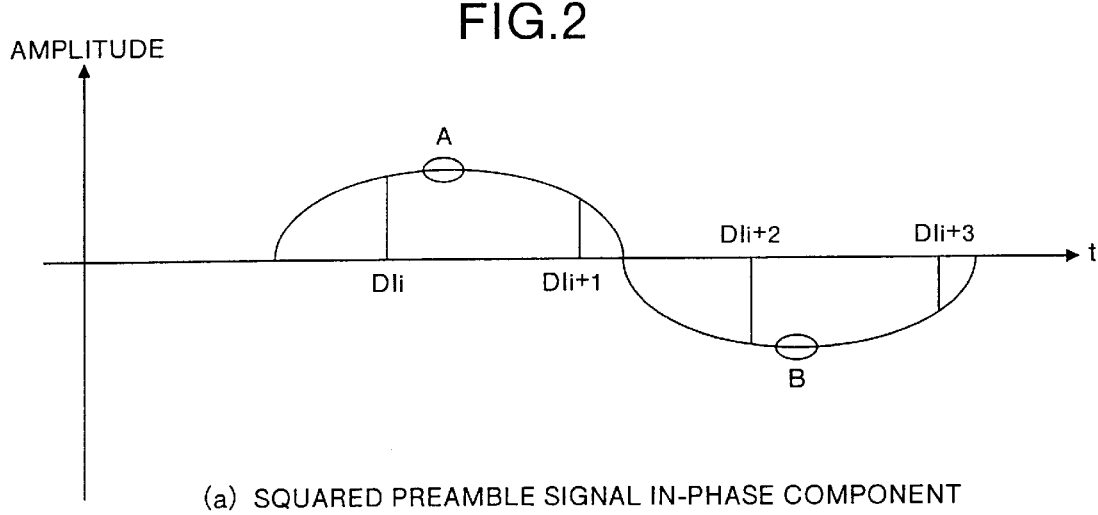
(a) SQUARED PREAMBLE SIGNAL IN-PHASE COMPONENT
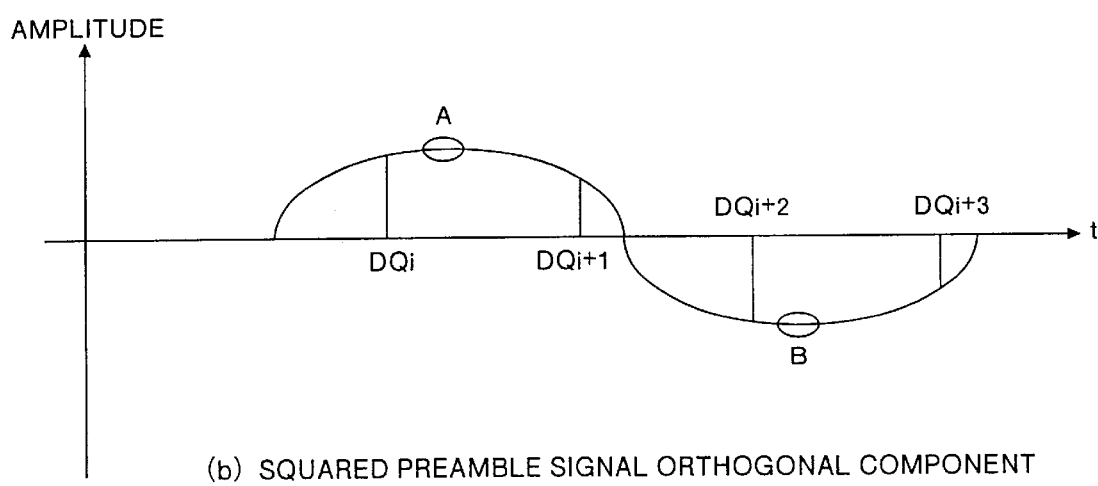
(b) SQUARED PREAMBLE SIGNAL ORTHOGONAL COMPONENT

FIG.3
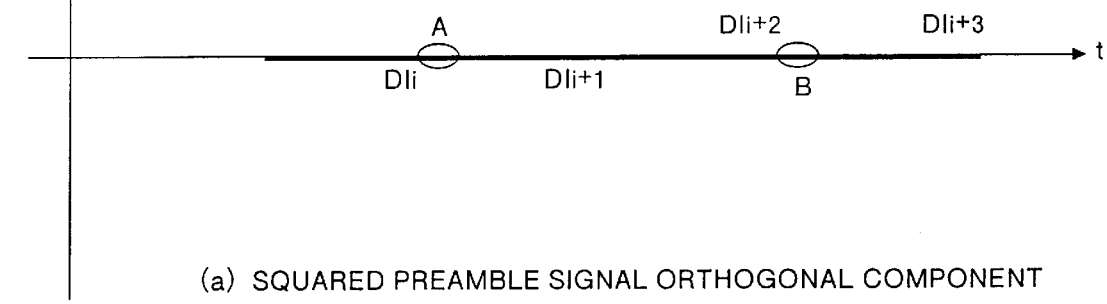
(a) SQUARED PREAMBLE SIGNAL ORTHOGONAL COMPONENT
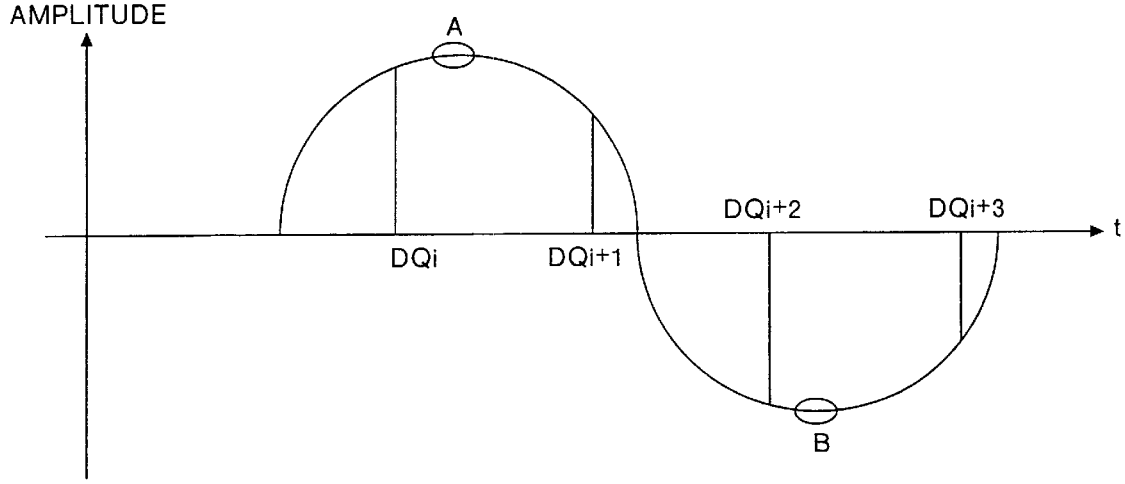
(b) SQUARED PREAMBLE SIGNAL IN-PHASE COMPONENT

FIG.4
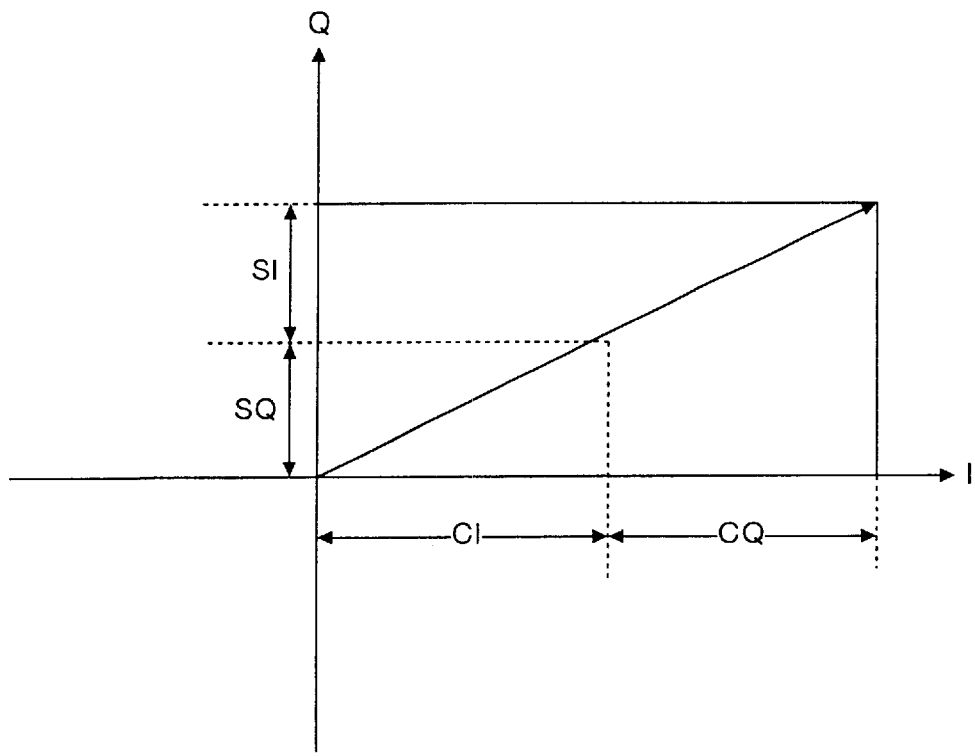
(a) CORRELATION VALUE WHEN $\theta c = 45$ [deg]
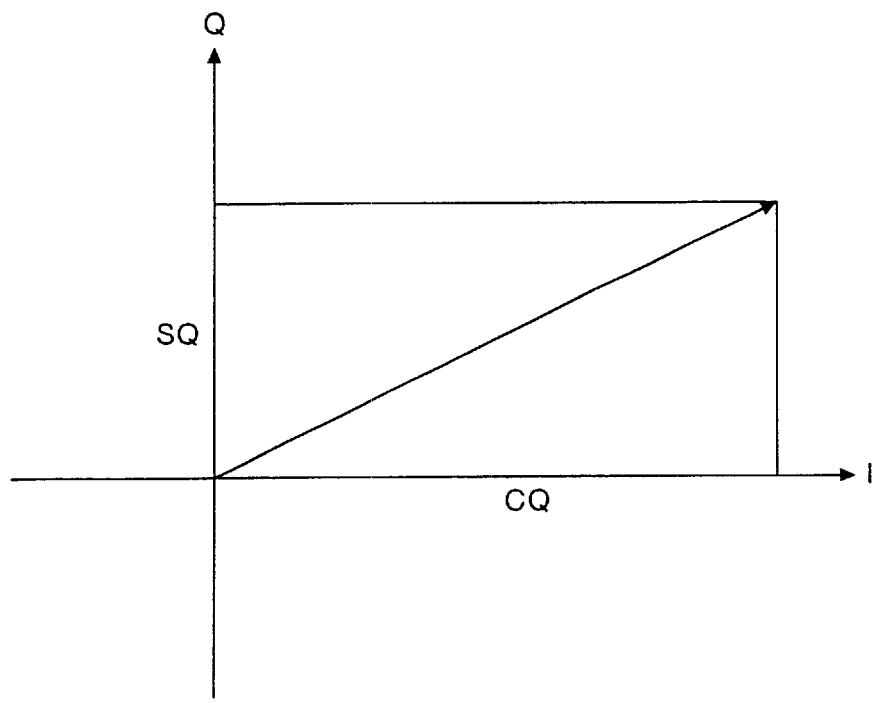
(b) CORRELATION VALUE WHEN $\theta c = 90$ [deg]

FIG. 10
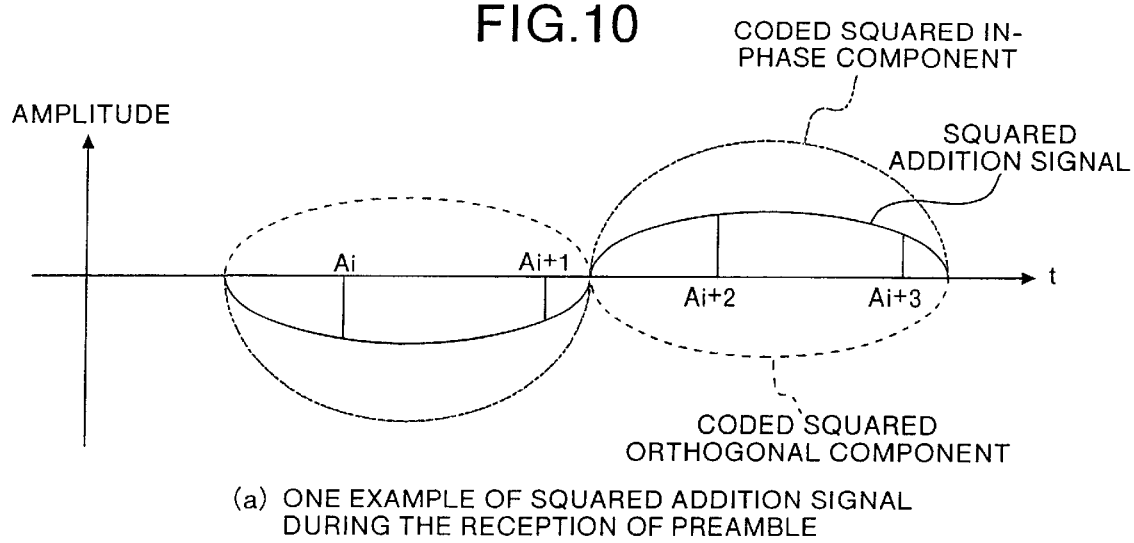
(a) ONE EXAMPLE OF SQUARED ADDITION SIGNAL DURING THE RECEPTION OF PREAMBLE
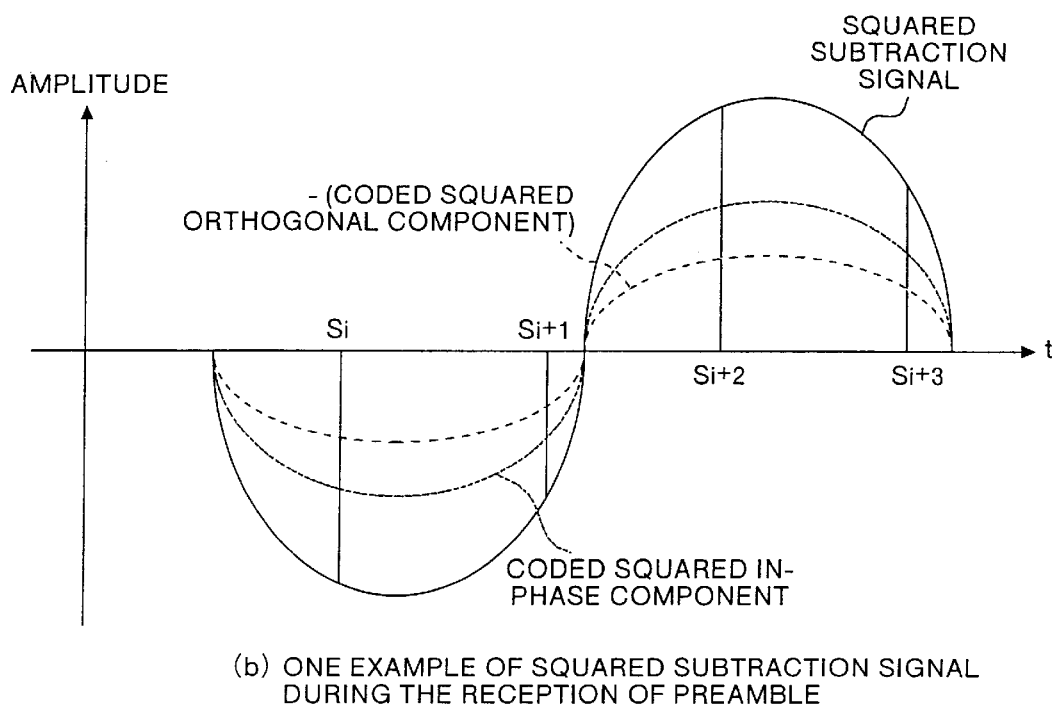
(b) ONE EXAMPLE OF SQUARED SUBTRACTION SIGNAL DURING THE RECEPTION OF PREAMBLE

FIG.11
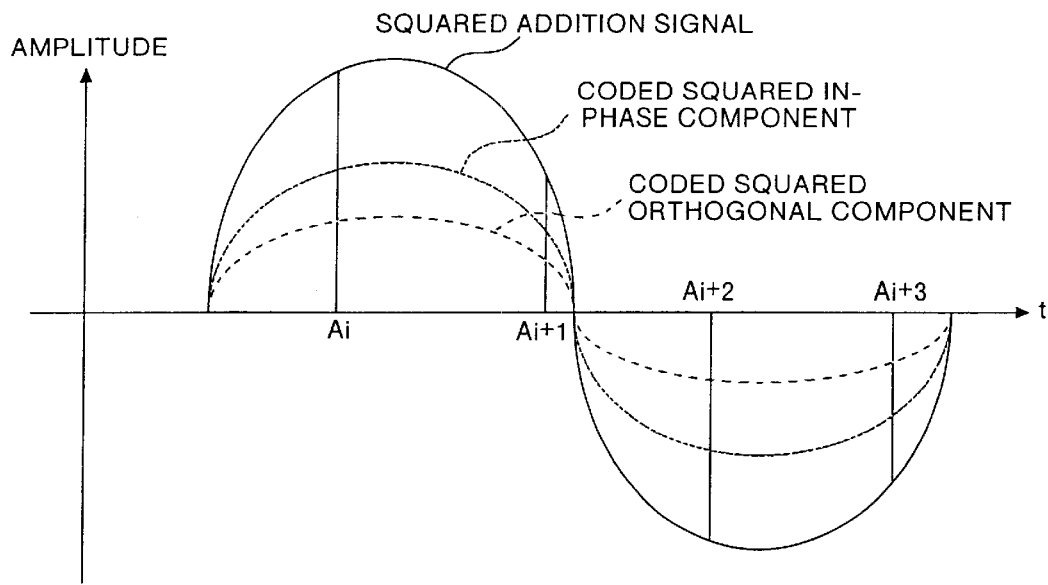
(a) ONE EXAMPLE OF SQUARED ADDITION SIGNAL DURING THE RECEPTION OF PREAMBLE
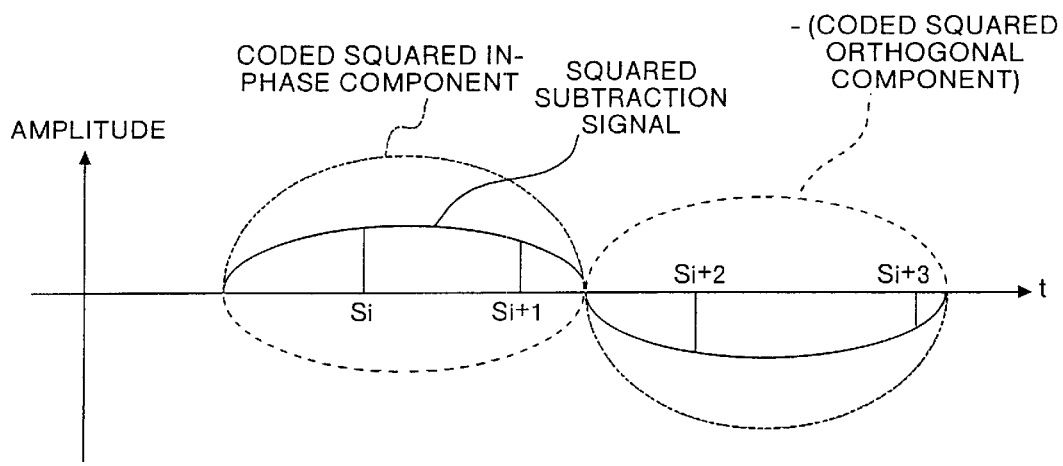
(b) ONE EXAMPLE OF SQUARED SUBTRACTION SIGNAL DURING THE RECEPTION OF PREAMBLE

FIG.14

FIG.23
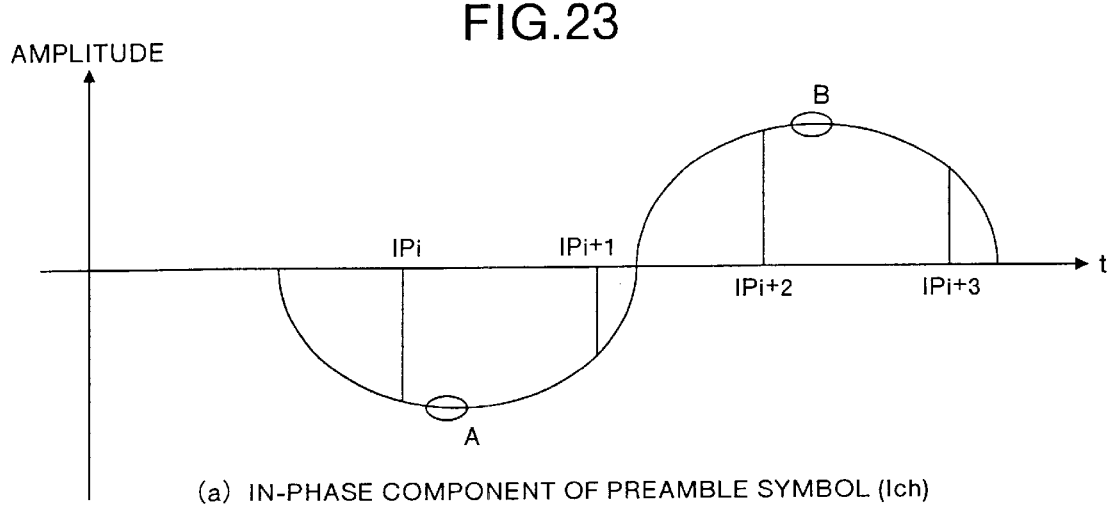
(a) IN-PHASE COMPONENT OF PREAMBLE SYMBOL (Ich)
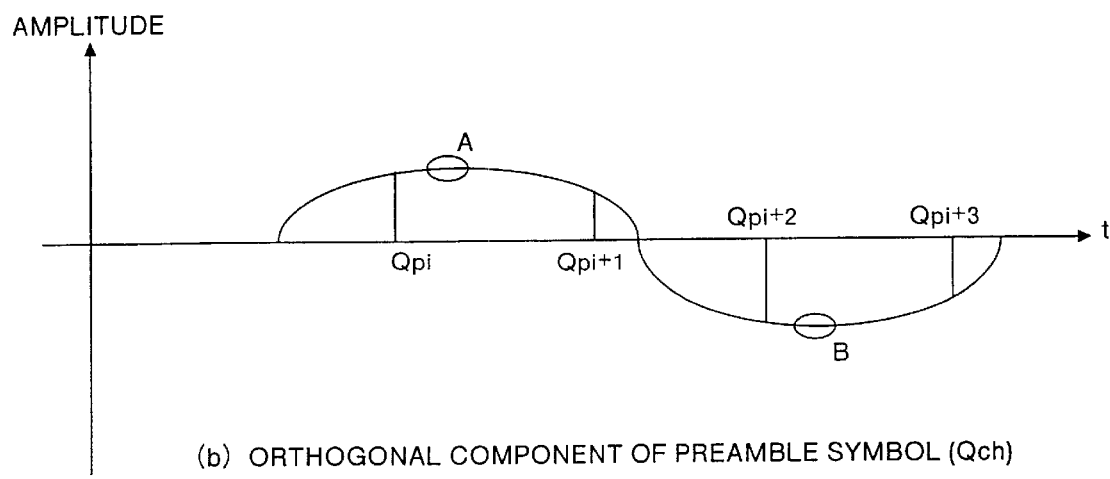
(b) ORTHOGONAL COMPONENT OF PREAMBLE SYMBOL (Qch)

FIG.24
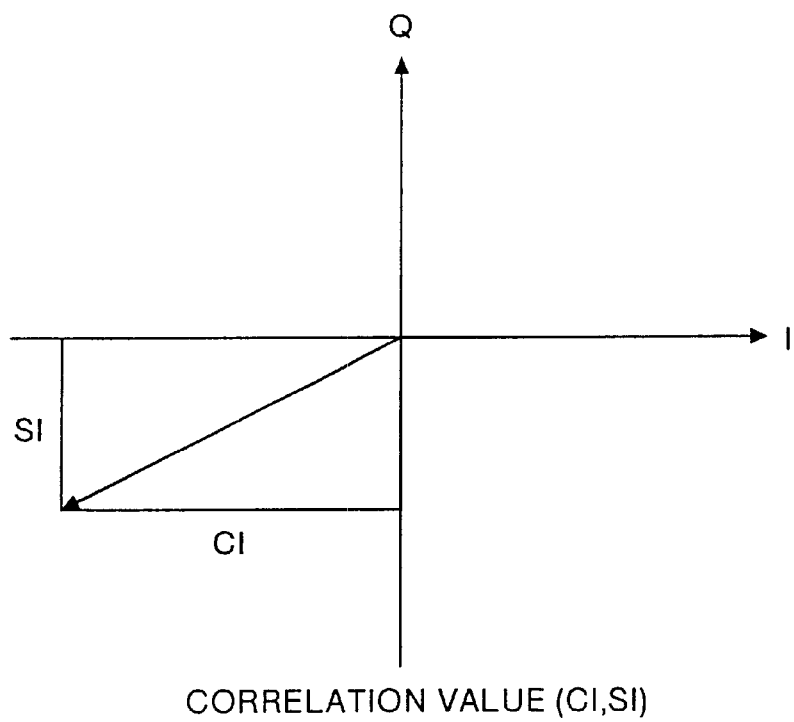
CORRELATION VALUE (CI,SI)
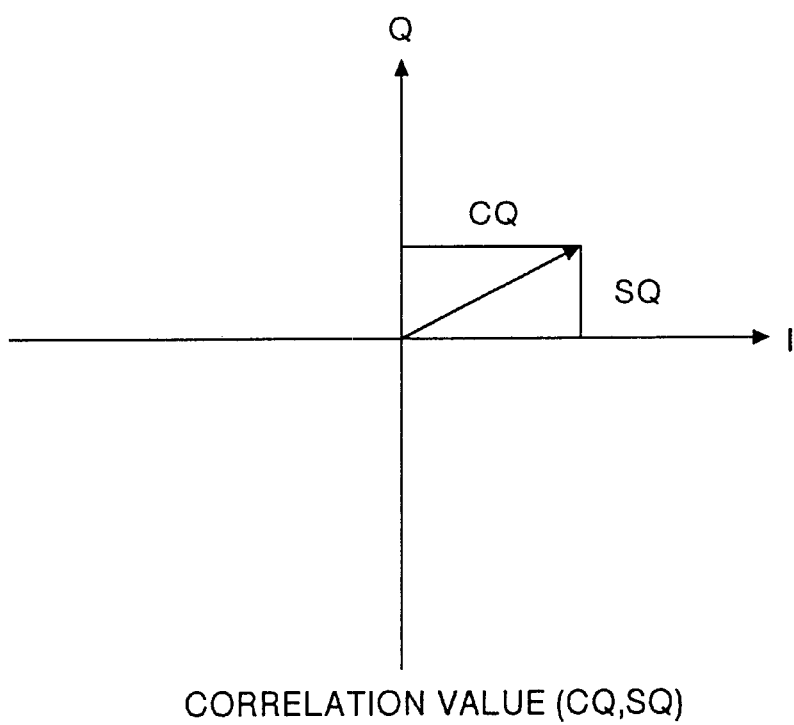
CORRELATION VALUE (CQ,SQ)

FIG.26
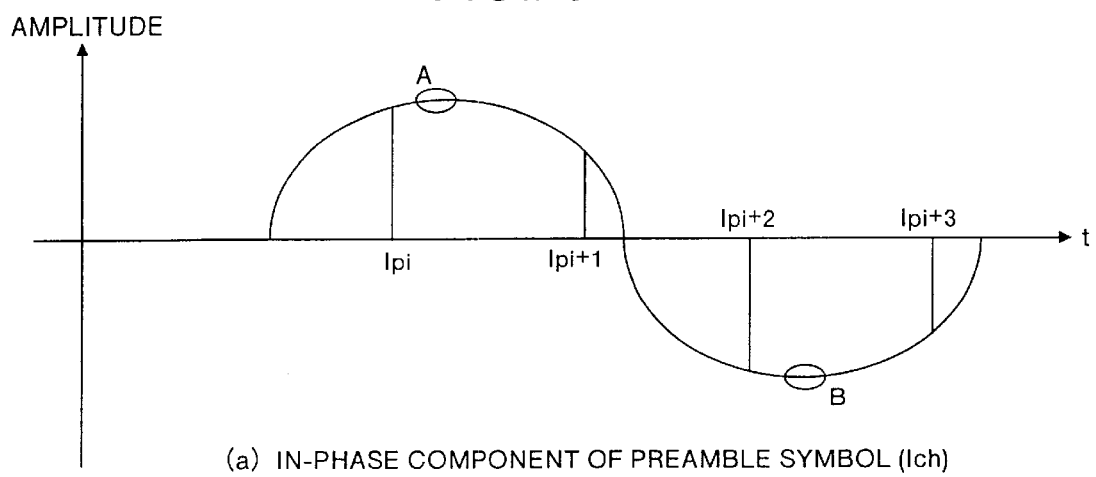
(a) IN-PHASE COMPONENT OF PREAMBLE SYMBOL (Ich)
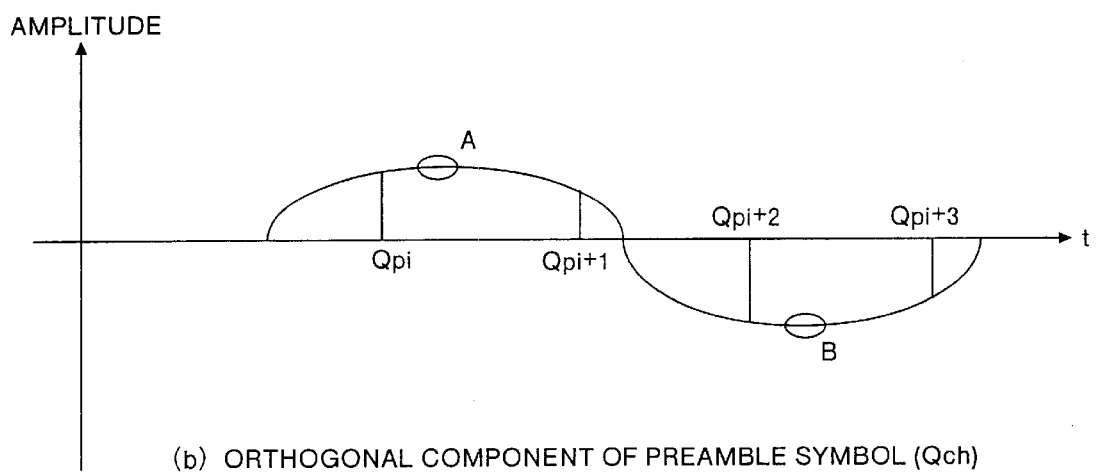
(b) ORTHOGONAL COMPONENT OF PREAMBLE SYMBOL (Qch)

FIG.27
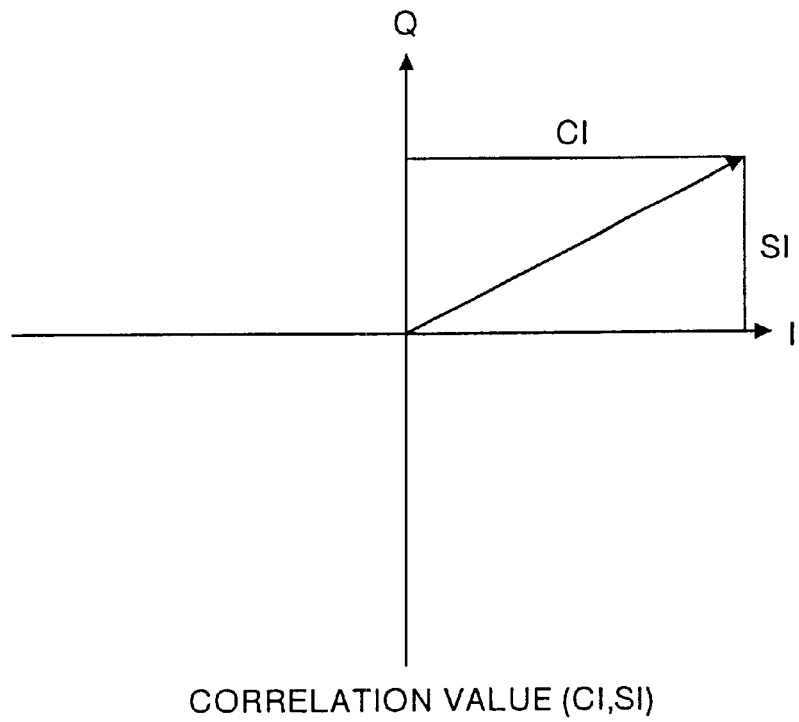
CORRELATION VALUE (CI,SI)
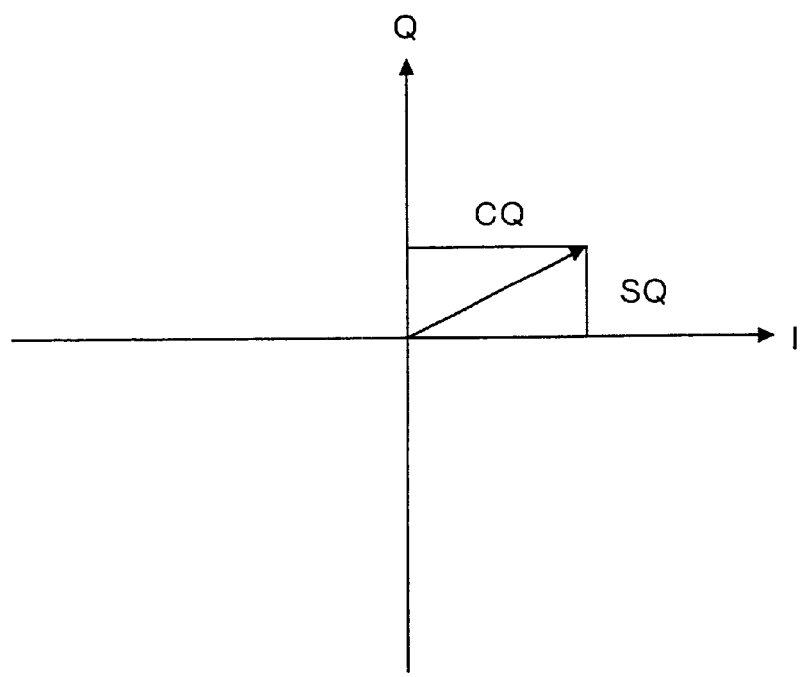
CORRELATION VALUE (CQ,SQ)

FIG.32
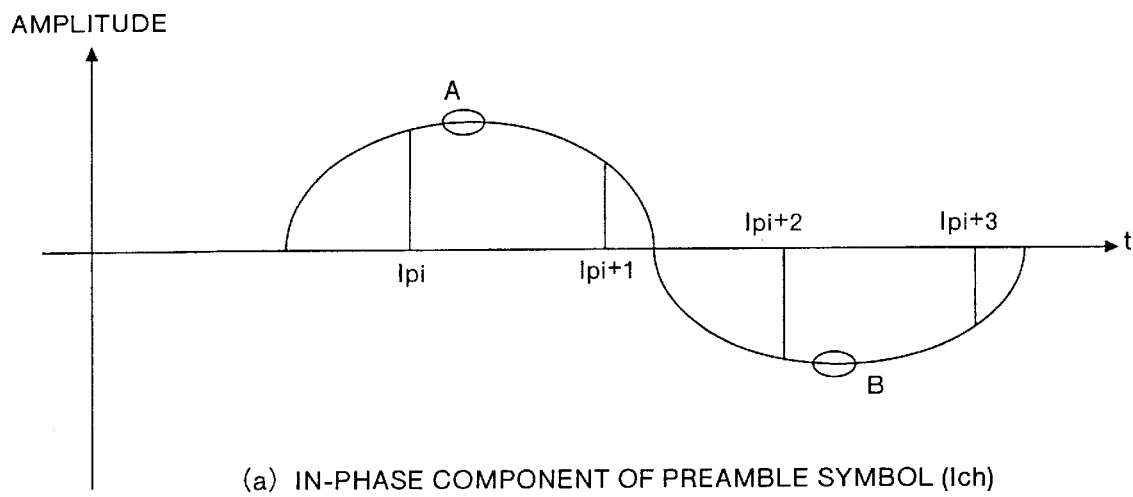
(a) IN-PHASE COMPONENT OF PREAMBLE SYMBOL (Ich)
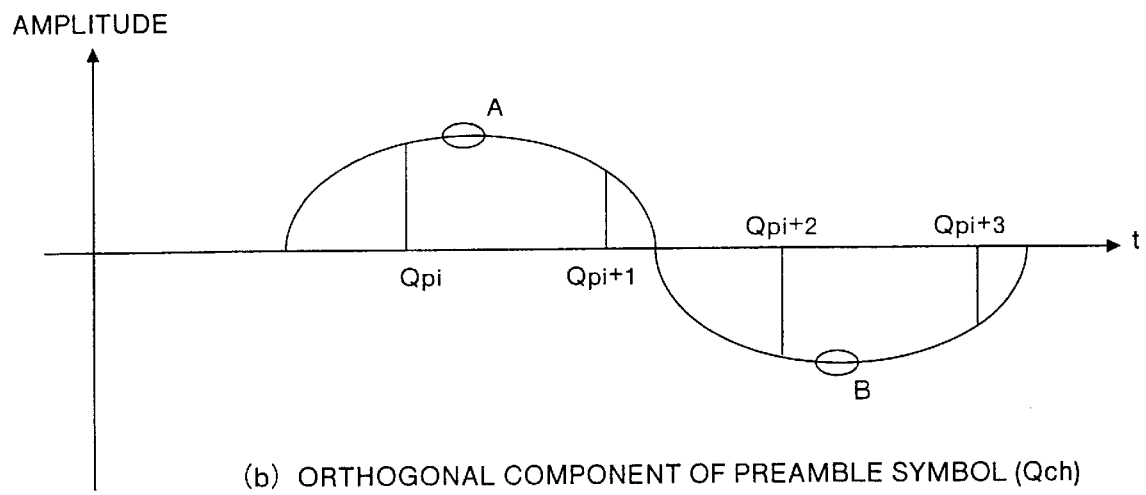
(b) ORTHOGONAL COMPONENT OF PREAMBLE SYMBOL (Qch)

FIG.33
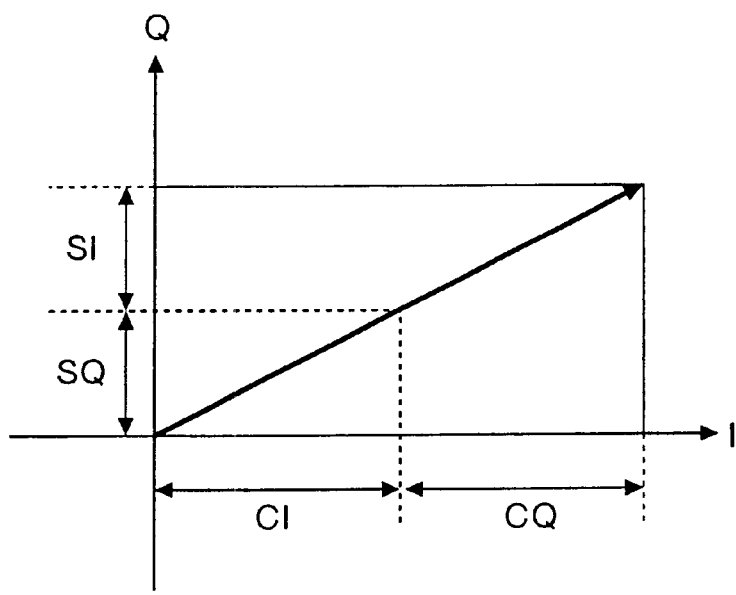
(a) CORRELATION VALUE WHEN $\theta c$ = 45 [deg]
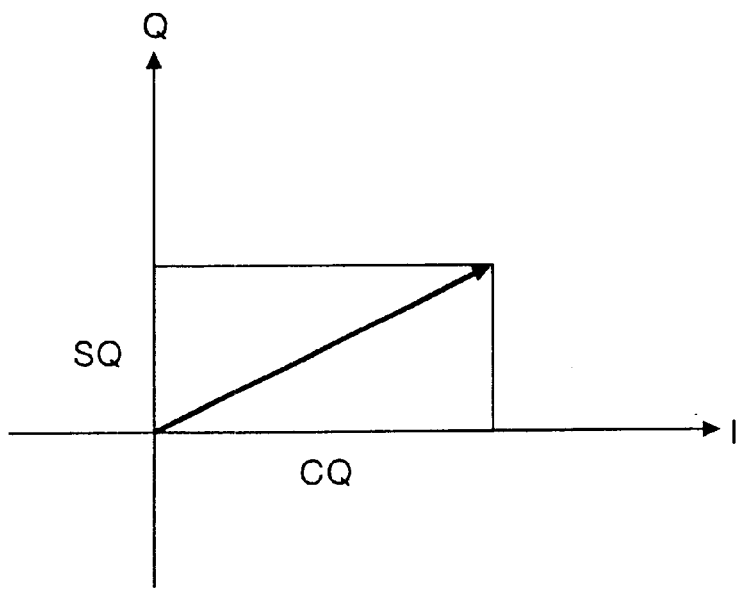
(b) CORRELATION VALUE WHEN $\theta c$ = 90 [deg]

FIG.35
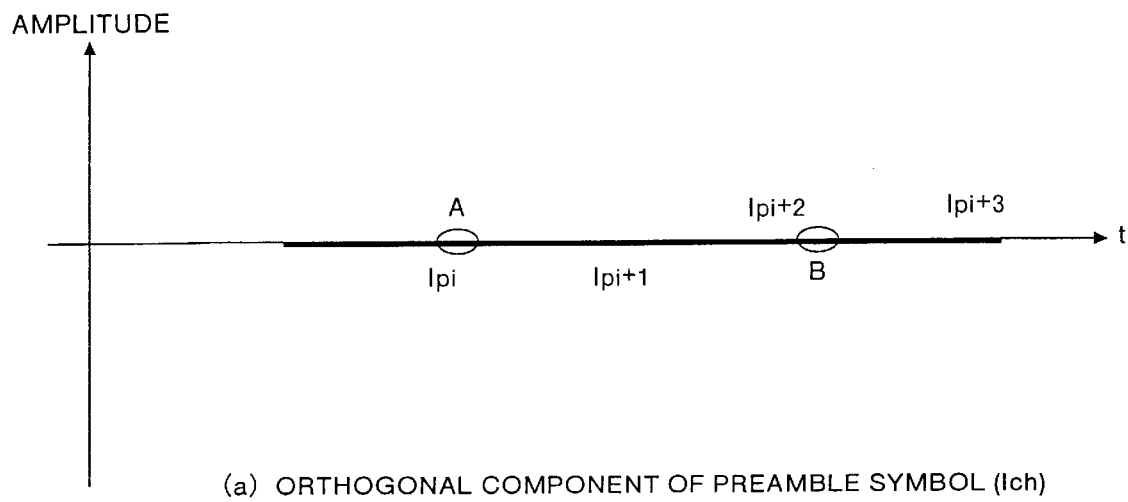
(a) ORTHOGONAL COMPONENT OF PREAMBLE SYMBOL (Ich)
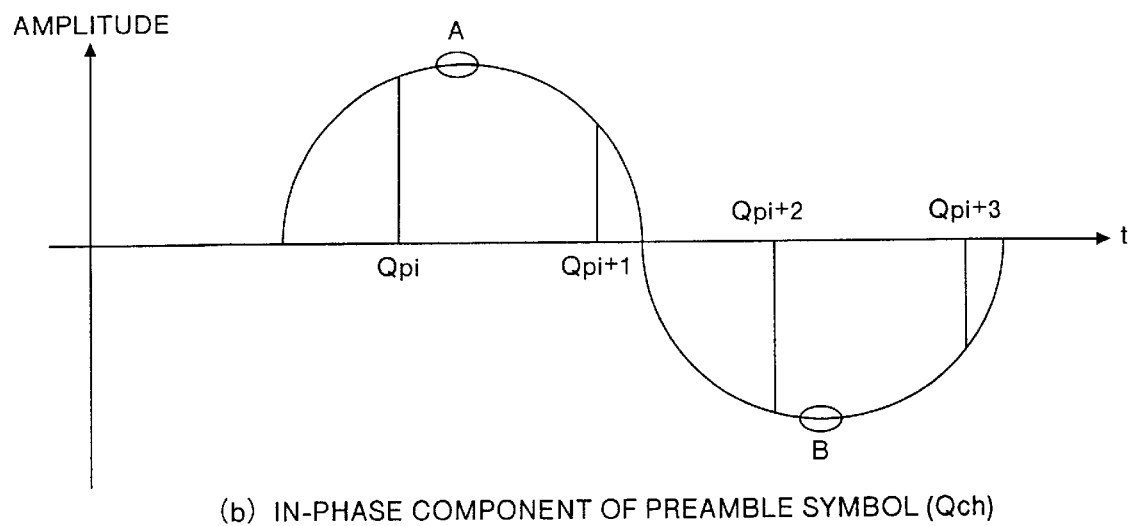
(b) IN-PHASE COMPONENT OF PREAMBLE SYMBOL (Qch)

US 6,683,493 B1

TIMING REPRODUCING DEVICE AND DEMODULATOR

TECHNICAL FIELD

The present invention relates to a demodulator and a timing regenerating device that is used in this demodulator.

BACKGROUND ART

As a conventional system of timing regeneration for a demodulator of a broadband digital radio communication system having a preamble signal analysis function, there has been one as described in Japanese Patent Application Laid-Open No. 8-46658.

This system focuses on the fact that the preamble signal has ½ of the frequency component of the symbol frequency (fs). Based on this, a correlation is obtained at the receiver side between the preamble signal and a ½ symbol frequency component $\exp[-j\pi(fs)t]$ output from a VCO (Voltage Control Oscillator). A timing phase is estimated from a vector angle of this correlation value.

Further, according to this system, sampling speed (i.e. sample/symbol) of the data is only 2. In the mean time, Japanese Patent Application Laid-Open No. 6-141048 discloses a system of estimating a timing phase from a correlation between a signal (for example, an envelope) after a nonlinear processing and a symbol frequency component $\exp[-j2\pi(fs)t]$. According to this system, minimum value of a necessary sampling speed is 4. Therefore, the sampling speed in the system described in Japanese Patent Application Laid-Open No. 8-46658 is ½ of that disclosed in Japanese Patent Application Laid-Open No. 6-141048. As a result, it is possible to realize low power consumption of the receiver.

FIG. 20 is a structure diagram of a demodulator including a timing regenerating device that is similar to the demodulator described in the Japanese Patent Application Laid-Open No. 8-46658.

This demodulator mainly consists of antenna 100, frequency converting unit 200, first A/D converter 300a, second A/D converter 300b, timing regenerating device 400, and data deciding unit 500.

The timing regenerating device 400 includes VCO 401, timing phase difference calculating unit 402, Ich correlation calculating unit 403, Qch correlation calculating unit 404, and vector combination selecting unit 405.

Detailed structure of the vector combination selecting unit 405 will be explained with reference to FIG. 21.

The vector combination selecting unit 405 mainly consists of first vector combining unit 406a, second vector combining unit 406b, third vector combining unit 406c, fourth vector combining unit 406d, maximum absolute value detecting unit 407, and selecting unit 408.

How this demodulator demodulates a received preamble signal will be explained now.

First, the antenna 100 receives the preamble symbol of RF band. The frequency converting unit 200 frequency converts this preamble symbol of the RF band into a preamble symbol of a base band.

FIG. 22 is a signal space diagram showing a preamble symbol of this base band (for example, a "1001" pattern in the QPSK conversion system). In FIG. 22, θc denotes, in degrees, a carrier phase of a reception signal. The preamble symbol shifts between a Nyquist point "A" and a Nyquist point "B" alternately through the origin for each one symbol in the drawing.

The vector angle of the Nyquist point "A" is θc, and the vector angle of the Nyquist point "B" is (θc+180). Difference between the vector angles of the Nyquist point "A" and the Nyquist point "B" is 180 degree.

The first A/D converter 300a receives the preamble symbol of the base band, samples the in-phase component of the preamble symbol at time $t=\tau+iT/2$ (where i=1, 2, 3, ..., and τ represents a timing error $(-T/2 \leq \tau < T/2)$, and T represents a symbol frequency), and outputs a sampled preamble data string $Ip_i$ (i=1, 2, 3, ...).

Similarly, the second A/D converter 300b receives the preamble symbol of the base band, samples the orthogonal component of the preamble symbol at the time $t=\tau+iT/2$, and outputs a sampled preamble data string $Qp_i$ (i=1, 2, 3, ...). The first A/D converter 300a and the second A/D converter 300b sample the data based on a sampling clock output from the timing regenerating device 400.

The timing regenerating device 400 calculates a timing error τ by using the sampled preamble data strings $Ip_i$ and $Qp_i$ (i=1, 2, 3, ...), and carries out a phase control for canceling the timing error τ to a regeneration sample clock and a regeneration symbol clock. The regeneration symbol clock is a clock of a symbol period having the regeneration sample clock frequency-divided into two.

The data deciding unit 500 receives the significant random data strings $Id_i$ and $Qd_i$ (i=1, 2, 3, ...) that follow the preambles after the timing error τ has been cancelled by the timing regenerating device 400, and latches the data at the Nyquist points by the regeneration symbol clock. Then, the data deciding unit 500 decides the data using the latched Nyquist point data, and outputs the demodulated data.

Detail operation of the timing regenerating device 400 will be explained now. First, the Ich correlation calculating unit 403 obtains correlation between each of the in-phase component I (t) and the orthogonal component Q (t) of the preamble symbol shown in FIG. 22 and a frequency component $\exp[-j\pi(fs)t]$ that is ½ of the symbol frequency, respectively. Specifically, the Ich correlation calculating unit 403 performs the calculation shown in the equations (1a) and (1b) with respect to the over-sampled preamble data string $Ip_i$ (i=1, 2, 3, ...):

$$Ic_i = Ip_i \times \cos \pi i/2 \quad (1a)$$

$$Is_i = Ip_i \times \sin \pi i/2 \quad (1b)$$

Then, the Ich correlation calculating unit 403 calculates an average of the obtained results ($Ic_i$, $Is_i$), thereby to obtain correlation values (CI, SI). Further, the Qch correlation calculating unit 404 performs the calculation shown in the equations (2a) and (2b) with respect to the over-sampled preamble data string $QP_i$ (i=1, 2, 3, ...) in a similar manner:

$$Qc_i = Qp_i \times \cos \pi i/2 \quad (2a)$$

$$Qs_i = Qp_i \times \sin \pi i/2 \quad (2b)$$

Then, the Qch correlation calculating unit 404 calculates an average of the obtained results ($Ic_i$, $Is_i$), thereby to obtain correlation values (CQ, SQ).

In the equations (1a), (1b), (2a), and (2b), $\cos \pi i/2 = 1, 0, -1, 0, \ldots$, and $\sin \pi i/2 = 0, 1, 0, -1, \ldots$. Therefore, it is easy to obtain the correlation values (CI, SI) and (CQ, SQ). For example, when averaging with four symbols, the correlation values (CI, SI) can be obtained from the equations (3a) and (3b) as follows:

$$CI = (Ip_i - Ip_{i+2} + Ip_{i+4} - Ip_{i+6} + Ip_{i+8} - Ip_{i+10} + Ip_{i+12} - Ip_{i+14})/8 \quad (3a)$$

$$SI = (Ip_{i+1} - Ip_{i+3} + Ip_{i+5} - Ip_{i+7} + Ip_{i+9} - Ip_{i+11} + Ip_{i+13} - Ip_{i+15})/8 \quad (3b)$$

Correlation values (CQ, SQ) can be obtained from the equations (4a) and (4b) as follows:

$$CQ=(Qp_i-Qp_{i+2}+Qp_{i+4}-Qp_{i+6}+Qp_{i+8}-Qp_{i+10}+Qp_{i+12}-Qp_{i+14})/8 \quad (4a)$$

$$SQ=(Qp_{i+1}-Qp_{i+3}+Qp_{i+5}-Qp_{i+7}+Qp_{i+9}-Qp_{i+11}+Qp_{i+13}-Qp_{i+15})/8 \quad (4b)$$

The vector angle between the correlation values (CI, SI), and the vector angle between the correlation values (CQ, SQ) both indicate timing phase errors. However, depending on the carrier phase θc, both the vectors may be pointed in the same direction, opposite directions, or one vector may have a value equal to zero.

For example, for the preamble symbols at A and B that satisfy the range of θc as (90<θc<180) or (270<θc<360) as shown in FIG. 22, when the Ich correlation calculating unit 403 samples at the timings of vertical lines shown in FIG. 23(a) and also when the Qch correlation calculating unit 404 samples at the timings of vertical lines shown in FIG. 23(b), data strings {$Ip_i$, $Ip_{i+1}$, $Ip_{i+2}$, $Ip_{i+3}$, . . . } and data strings {$Qp_i$, $Qp_{i+1}$, $Qp_{i+2}$, $Qp_{i+3}$, . . . } are obtained respectively. In this case, the correlation values (CI, SI) and (CQ, SQ) as shown in FIG. 24 are obtained, and the correlation vectors are pointed in opposite directions.

On the other hand, for the preamble symbols that satisfy the range of θc as (0<θc<90) or (180<θc<270) as shown in FIG. 25, when the Ich correlation calculating unit 403 samples at similar timings as those in FIG. 23, that is, at timings of vertical lines shown in FIG. 26(a) and also when the Qch correlation calculating unit 404 samples at the timings of vertical lines shown in FIG. 26(b), data strings {$Ip_i$, $Ip_{i+1}$, $Ip_{i+2}$, $Ip_{i+3}$, . . . } and data strings {$Qp_i$, $Qp_{i+1}$, $Qp_{i+2}$, $Qp_{i+3}$, . . . } are obtained respectively. In this case, two correlation values of the correlation values (CI, SI) and correlation values (CQ, SQ) as shown in FIG. 27 are obtained, and the correlation vectors point toward the same direction.

Further, it is also clear that each vector length changes depending on the carrier phase θc. When θc={0, 180}, the vector corresponding to the correlation values (CI, SI) has a value equal to zero, and when θc={90, −90}, the vector corresponding to the correlation values (CQ, SQ) has a value equal to zero.

The vector combination selecting unit 405 receives the correlation values (CI, SI) and (CQ, SQ), and combines them in four statuses respectively in order to reduce the influence of the carrier phase θc. Then, the vector combination selecting unit 405 selects a combined vector having the highest SN ratio. The timing phase difference calculating unit 402 receives this combined vector, and calculates a timing phase.

Next, detail operation of the vector combination selecting unit 405 will be explained with reference to FIG. 21. The maximum absolute value detecting unit 407 obtains four absolute values of CI, CQ, SI and SQ of the correlation values (CI, SI) and (CQ, SQ), and detects a maximum of these the four absolute values.

The first vector combining unit 406a outputs combined vectors (G1c, G1s) based on following equations (5a) and (5b):

$$G1c=CI+\text{sign}[CI]\cdot|CQ| \quad (5a)$$

$$G1s=SI+\text{sign}[CI\cdot CQ]\cdot|SQ| \quad (5b)$$

The second vector combining unit 406b outputs combined vectors (G2c, G2s) based on following equations (6a) and (6b):

$$G2c=CQ+\text{sign}[CQ]\cdot|CI| \quad (6a)$$

$$G2s=SQ+\text{sign}[CI\cdot CQ]\cdot|SI| \quad (6b)$$

The third vector combining unit 406c outputs combined vectors (G3c, G3s) based on following equations (7a) and (7b):

$$G3c=CI+\text{sign}[SI\cdot SQ]\cdot|CQ| \quad (7a)$$

$$G3s=SI+\text{sign}[SI]\cdot|SQ| \quad (7b)$$

The fourth vector combining unit 406d outputs combined vectors (G4c, G4s) based on following equations (8a) and (8b):

$$G4c=CQ+\text{sign}[SI\cdot SQ]\cdot|CI| \quad (8a)$$

$$G4s=SQ+\text{sign}[SQ]\cdot|SI| \quad (8b)$$

In the above equations, the sign [*] expresses a sign {−1, +1} of a numerical value within the brackets.

The selecting unit 408 receives a detection signal of the maximum absolute value detecting unit 407, and sets combined correlation values (ΣC, ΣS) as shown in following equations (9a), (9b), (9c), and (9d) respectively according to the status of a maximum value of the absolute values:

$$(\Sigma C, \Sigma S)=(G1c, G1s) \text{ (when } |CI| \text{ is maximum)} \quad (9a)$$

$$(\Sigma C, \Sigma S)=(G2c, G2s) \text{ (when } |CQ| \text{ maximum)} \quad (9b)$$

$$(\Sigma C, \Sigma S)=(G3c, G3s) \text{ (when } |SI| \text{ is maximum)} \quad (9c)$$

$$(\Sigma C, \Sigma S)=(G4c, G4s) \text{ (when } |SQ| \text{ is maximum)} \quad (9d)$$

Based on the above processing, the influence of the carrier phase θc is removed, and the combined vector having the vector represented by the correlation values (CI, CQ) and (SI, SQ) set to the same direction is selected as a vector most suitable for estimating a timing phase.

For example, in the case of FIG. 24, the correlation values (CQ, SQ) having a smaller vector length are inverted to set both vector directions to the same direction, and the inverted correlation values (CQ, SQ) are added to the correlation values (CI, SI). Then, this combined vector is selected. In this case, the combined correlation values (ΣC, ΣS) become as shown in FIG. 28. In the case of FIG. 27, the correlation values (CQ, SQ) having a smaller vector length are added directly to the correlation values (CI, SI). Then, this combinedvector is selected. In this case, the combined correlation values (ΣC, ΣS) become as shown in FIG. 29.

It is also possible to structure the vector combination selecting unit 405 as shown in FIG. 30. In the case of the vector combination selecting unit 405 shown in FIG. 30, the vector combination selecting unit shown in FIG. 21 does not select one vector from the four vectors generated in advance from CI, SI, CQ and SQ. In stead, the vector combination selecting unit 405 selectively adds a result of first selecting unit 406a, a result of second selecting unit 406b, a result of third selecting unit 406c, and a result of fourth selecting unit 406d, based on a detection result of the maximum absolute value detecting unit 407. In this structure, it is possible to reduce the circuit scale as compared with the structure of FIG. 21. In FIG. 30, 409a denotes first adder, and 409b denotes second adder.

Next, the operation of the vector combination selecting unit 405 shown in FIG. 30 will be explained. First, the respective selecting unit output values of SEL1, SEL2, SEL3, and SEL4, based on the detection result of the maximum absolute value detecting unit 407. The details are as follows.

SEL1 output by the first selecting unit 406a has a value as represented by the following equations (10a) and (10b):

$$SEL1=CI \text{ (when } |CI| \text{ or } |SI| \text{ is maximum)} \quad (10a)$$

$$SEL1=CQ \text{ (when } |CQ| \text{ or } |SQ| \text{ is maximum)} \quad (10b)$$

SEL2 output by the first selecting unit 406b has a value as represented by the following equations (11a), (11b), (11c), and (11d):

$$SEL2=\text{sign}[CI]\cdot|CQ| \text{ (when } |CI| \text{ is maximum)} \quad (11a)$$

$$SEL2=\text{sign}[CQ]\cdot|CI| \text{ (when } |CQ| \text{ is maximum)} \quad (11b)$$

$$SEL2=\text{sign}[SI\cdot SQ]\cdot|CQ| \text{ (when } |SI| \text{ is maximum)} \quad (11c)$$

$$SEL2=\text{sign}[SI\cdot SQ]\cdot|CI| \text{ (when } |SQ| \text{ is maximum)} \quad (11d)$$

SEL3 output by the third selecting unit 406c has a value as represented by the following equations (12a), (12b), (12c), and (12d):

$$SEL3=\text{sign}[CI\cdot CQ]\cdot|SQ| \text{ (when } |CI| \text{ is maximum)} \quad (12a)$$

$$SEL3=\text{sign}[CI\cdot CQ]\cdot|SI| \text{ (when } |CQ| \text{ is maximum)} \quad (12b)$$

$$SEL3=\text{sign}[SI]\cdot|SQ| \text{ (when } |SI| \text{ is maximum)} \quad (12c)$$

$$SEL3=\text{sign}[SQ]\cdot|SI| \text{ (when } |SQ| \text{ is maximum)} \quad (12d)$$

SEL4 output by the fourth selecting unit 406d has a value as represented by the following equations (13a) and (13b):

$$SEL4=SI \text{ (when } |CI| \text{ or } |SI| \text{ is maximum)} \quad (13a)$$

$$SEL4=SQ \text{ (when } |CQ| \text{ or } |SQ| \text{ is maximum)} \quad (13b)$$

The outputs SEL1 and SEL2 of the selecting units 406a and 406b is input into the first adder 109a. The outputs SEL3 and SEL4 of the selecting units 406c and 406d is input into the second adder 109b. The first adder 409a adds the values of SEL1 and SEL2, and outputs a result of the addition as ΣC. The second adder 409b adds the values of SEL3 and SEL4, and outputs a result of the addition as ΣS.

Thus, the vector combination selecting unit 405 shown in FIG. 30 outputs values similar to those of the vector combination selecting unit 405 having the structure shown in FIG. 21.

The timing phase difference calculating unit 402 receives the combined correlation values (ΣC, ΣS) obtained by the vector combination selecting unit shown in FIG. 21 and FIG. 30, and obtains the vector angle shown by the correlation values (ΣC, ΣS) based on the following equation (14):

$$\theta_{2s}=\tan^{-1}(\Sigma S/\Sigma C) \quad (14)$$

where $\theta_{2s}$ represents a timing phase difference when normalization is carried out in the two-symbol period (2T). Therefore, when normalization is carried out in the symbol period (T), the timing phase difference θs [deg] is obtained from the equation (15):

$$\theta s=2\theta_{2s} \bmod 360 \quad (15)$$

There is a difference of 180 [deg] between $\theta_{2s}$ shown in FIG. 28 and $\theta_{2s}$ shown in FIG. 29. However, based on the processing of the equation (15), the θs obtained from the $\theta_{2s}$ in FIG. 28 and the θs obtained from the $\theta_{2s}$ in FIG. 29 coincide with each other.

The relationship between the timing phase difference θs and the timing error τ is as shown in the equations (16a) and (16b). When θs>180 [deg], $$\tau=(\theta s-360)T/360 \quad (16a)$$

and when θs≦180 [deg], $$\tau=(\theta s)T/360 \quad (16b)$$

The timing phase difference calculating unit 402 gives a phase control signal for canceling the timing error τ to the VCO 401 at the latter stage, based on the timing error τ obtained using the equations (16a) and (16b).

The VCO 401 receives the phase control signal from the timing phase difference calculating unit 402, controls phases of the regeneration sample clock and the regeneration symbol clock, and sets the timing error τ to "0". The regeneration symbol clock is generated based on the frequency division into two of the regeneration sample clock that has been phase-controlled by the control signal, for example.

As explained above, the conventional timing regenerating device 400 using the preamble calculates correlation between the ½ symbol frequency component included in the preamble symbol and the ½ symbol frequency component exp[−jπ(fs)t] output from the VCO 401, and then estimates a timing phase from the vector angle shown by the correlation values. Further, as the sampling speed is a low speed of 2 [sample/symbol], this is an effective method particularly for the broadband TDMA radio communication system.

Although the vector combination selecting unit 405 reduces the influence of the carrier phase θc, this timing regenerating device has had a problem that the precision of the calculation in the timing error τ is controlled by the carrier phase θc.

In other words, the magnitude of the combined correlation values (ΣC, ΣS) output from the vector combining unit 405 becomes largest when the carrier phase θc is {45, 135, 225, 315} [deg], and becomes smallest when the carrier phase θc is {0, 90, 180, 270} [deg]. The ratio of these magnitudes becomes $2^{1/2}$:1. Therefore, there arises such a phenomenon that the precision in the calculation of the timing error τ becomes best when the carrier phase θc is {45, 135, 225, 315} [deg], and becomes worst when the carrier phase θc is {0, 90, 180, 270} [deg].

When the preamble symbol having the carrier phase θc=45 [deg] as shown in FIG. 31 is received at the timings of the vertical lines shown in FIG. 32, for example, the amplitude of the I component and the amplitude of the Q component of the preamble symbol becomes the same value ($1/(2^{1/2})$ of an envelope level, where the envelope level is a radius of a circle of the signal space diagram shown in FIG. 32). Therefore, the correlation values (CI, SI) at the I component side and the correlation values (CQ, SQ) at the Q component side become the same magnitude. The combined correlation values (ΣC, ΣS) in this case become the values obtained by synthesizing the correlation values (CI, SI) at the I component side with the correlation values (CQ, SQ) at the Q component side, as shown in FIG. 33(a)

On the other hand, when the preamble symbol having the carrier phase θc=90 [deg] as shown in FIG. 34 is received at the timings of the vertical lines shown in FIG. 35, for example, the amplitude of the I component of the preamble symbol becomes "0", and the amplitude of the Q component of the preamble symbol becomes the envelope level. Therefore, the correlation values (CI, SI) at the I component side becomes "0", and the correlation values (CQ, SQ) at the Q component side become $2_{1/2}$ times the correlation values when θc=45 [deg]. The combined correlation values (ΣC, ΣS) in this case become the correlation values (CQ, SQ) at the Q component side because the correlation values (CI, SI) at the I component side becomes "0", as shown in FIG. 33(b).

As a result, the ratio of the magnitude of the combined correlation values (ΣC, ΣS) when θc=45 [deg] to the magnitude of the combined correlation values (ΣC, ΣS) when θc=90 [deg] becomes $2^{1/2}$:1. Therefore, it is clear that the SN ratio of the combined correlation values (ΣC, ΣS) when θc=45 (or 125, 225, 315) [deg] becomes higher than the SN ratio of the combined correlation values (ΣC, ΣS) when θc=90 (or 0, 180, 270) [deg]. Accordingly, in the conventional system, the precision in the calculation of the timing error τ when θc=45 (or 125, 225, 315) [deg] becomes higher than the precision in the calculation of the timing error τ when θc=90 (or 0, 180, 270) [deg].

Further, according to the conventional timing regenerating device, when the preamble symbol has a ½ symbol frequency component like the preamble symbol that shifts by ±90 [deg] at every one symbol as shown in FIG. 36, in addition to the preamble symbol that shifts by ±180 [deg] at every one symbol as shown in FIG. 22, for example, it is possible to estimate a timing phase from any signal. However, in this case, there has also been a problem that the precision in the calculation of the timing error τ is influenced by the carrier phase θc.

Further, the conventional timing regenerating device is effective only when the reception timing of a timing phase is known. For example, when the reception timing of a burst signal at the time of turning on the power supply to the mobile terminal or at the line reconnection time after recovery from a shadowing is unknown, it is not possible to know the reception timing of a preamble symbol. Therefore, it has not been possible to apply the conventional timing regenerating device.

It is an object of the present invention to provide a demodulator capable of calculating a timing error at high precision without receiving an influence of a carrier phase θc.

Further, it is another object of the present invention to provide a demodulator that becomes valid when the reception timing of a preamble is not known, by simultaneously realizing an estimation of a timing phase using a preamble and a detection of the preamble.

Further, it is still another object of the present invention to provide a demodulator that realizes a high-speed synchronization and a high-speed resynchronization in a short preamble without receiving an influence of a carrier phase, and realizes a satisfactory BER (bit-error ratio) characteristics in a significant data section that follows the preamble, even when the reception timing of a burst signal that occurs at the power supply start-up time or at the reconnection timing after a recovery from a shadowing is unknown.

DISCLOSURE OF THE INVENTION

The timing regenerating device according to one aspect of the present invention comprises an in-phase component square calculation unit that receives a base band signal having a preamble symbol, calculates square of an in-phase component of the base band signal and outputs the squared in-phase component; an in-phase multiplier that multiplies a sign bit (±1) of the in-phase component of the base band signal to the squared in-phase component and outputs the result as signed squared in-phase component; an orthogonal component square calculation unit that receives the base band signal, calculates square of an orthogonal component of the base band signal and outputs the squared orthogonal component; an orthogonal multiplier that multiplies a sign bit (±1) of the orthogonal component of the base band signal to the squared orthogonal component and outputs the result as a signed squared orthogonal component; a squared-preamble in-phase correlation calculating unit that calculates correlation value between the signed squared in-phase component and a ½ symbol frequency component, and outputs the correlation value as an in-phase correlation signal; a squared-preamble orthogonal correlation calculating unit that calculates correlation value between the signed squared orthogonal component and the ½ symbol frequency component, and outputs the correlation value as an orthogonal correlation signal; a vector combination selecting unit that compares the magnitude of the in-phase correlation signal with the magnitude of the orthogonal correlation signal, matches the direction of a vector shown by the in-phase correlation signal or the orthogonal correlation signal whichever is smaller to the direction of a vector shown by the in-phase correlation signal or the orthogonal correlation signal whichever is larger, combines these signals, and outputs a correlation signal after the combination as a combined correlation signal; and a timing phase difference calculating unit that outputs a phase control signal from a vector angle shown by the combined correlation signal.

The timing regenerating device according to one aspect of the present invention comprises an in-phase component square calculation unit that receives a base band signal having a preamble symbol, calculates square of an in-phase component of the base band signal and outputs the squared in-phase component; an in-phase multiplier that multiplies a sign bit (±1) of the in-phase component of the base band signal to the squared in-phase component and outputs the result as signed squared in-phase component; an orthogonal component square calculation unit that receives the base band signal, calculates square of an orthogonal component of the base band signal and outputs the squared orthogonal component; an orthogonal multiplier that multiplies a sign bit (±1) of the orthogonal component of the base band signal to the squared orthogonal component and outputs the result as a signed squared orthogonalcomponent; a squared-preamble in-phase correlation calculating unit that calculates correlation value between the signed squared in-phase component and a ½ symbol frequency component, and outputs the correlation value as an in-phase correlation signal; a squared-preamble orthogonal correlation calculating unit that calculates correlation value between the signed squared orthogonal component and the ½ symbol frequency component, and outputs the correlation value as an orthogonal correlation signal; a vector combination selecting unit that compares the magnitude of the in-phase correlation signal with the magnitude of the orthogonal correlation signal, matches the direction of a vector shown by the in-phase correlation signal or the orthogonal correlation signal whichever is smaller to the direction of a vector shown by the in-phase correlation signal or the orthogonal correlation signal whichever is larger, combines these signals, and outputs a correlation signal after the combination as a combined correlation signal; and a preamble detecting/timing phase difference calculating unit that calculates a vector angle and a vector length of the combined correlation signal, decides that the preamble symbol has been detected when the vector length is larger than a predetermined threshold value, calculates a timing phase difference using a vector angle shown by the combined correlation signal at that time, and outputs a phase control signal.

Further, according to still another aspect of the invention, in the timing regenerating device of the above aspect, the timing regenerating device comprises a VCO that outputs a regeneration symbol clock, a regeneration sample clock, and a ½ symbol frequency component, based on a phase control signal. The base band signal to be input into the in-phase component square calculation unit and the orthogonal component square calculation unit is a signal that has been sampled based on the regeneration sample clock. The squared-preamble in-phase correlation calculating unit calculates correlation value using the ½ symbol frequency component output from the VCO, and the squared-preamble orthogonal correlation calculating unit calculates correlation value using the ½ symbol frequency component output from the VCO.

Further, according to still another aspect of the invention, the timing regenerating device of the above aspect further comprises a phase detecting unit that detects advancement/delay of a timing phase using the base band signal sampled based on the regeneration sample clock, and outputs detected signals as phase detection signals; and a phase detection signal averaging unit that calculates an average of the phase detection signals, and outputs the average as a phase advance/delay signal. The VCO outputs a regeneration symbol clock, a regeneration sample clock, and a ½ symbol frequency component, based on the phase control signal and the phase advance/delay signal.

Further, according to still another aspect of the invention, the timing regenerating device of the above aspect further comprises an oscillator that outputs an asynchronous sample clock and a ½ symbol frequency component. The base band signal to be input into the in-phase component square calculation unit and the orthogonal component square calculation unit is a signal that has been sampled by the asynchronous sample clock. The squared-preamble in-phase correlation calculating unit calculates correlation value using the ½ symbol frequency component output from the oscillator, and the squared-preamble orthogonal correlation calculating unit calculates correlation value using the ½ symbol frequency component output from the oscillator.

Also, the timing phase difference calculating unit calculates a timing phase difference from a squared root of the in-phase component of a combined correlation signal and a vector angle shown by a squared root of an orthogonal component of the combined correlation signal.

Further, according to still another aspect of the invention, in the timing regenerating device of the above aspect, the preamble detecting/timing phase difference calculating unit calculates a timing phase difference from a vector angle shown by a value obtained by multiplying a sign $\{\pm 1\}$ of the in-phase component to a square root of an absolute value of an in-phase component of a combined correlation signal and a value obtained by multiplying a sign $\{\pm 1\}$ of the orthogonal component to a square root of an absolute value of an orthogonal component of the combined correlation signal.

Further, the timing regenerating device according to still another aspect of the invention comprises an in-phase component square calculation unit that receives a base band signal having a preamble symbol, calculates square of an in-phase component of the base band signal and outputs the squared in-phase component; an in-phase multiplier that multiplies a sign bit ($\pm 1$) of the in-phase component of the base band signal to the squared in-phase component and outputs the result as signed squared in-phase component; an orthogonal component square calculation unit that receives the base band signal, calculates square of an orthogonal component of the base band signal and outputs the squared orthogonal component; an orthogonal multiplier that multiplies a sign bit ($\pm 1$) of the orthogonal component of the base band signal to the squared orthogonal component and outputs the result as a signed squared orthogonal component; an adder that adds the signed squared in-phase and orthogonal components, generates a squared addition signal using a result of this addition, and outputs this signal; a subtracter that subtracts the signed squared in-phase component from the signed squared orthogonal component or vice versa, and generates and outputs a squared subtraction signal using a result of this subtraction; a squared-addition signal component correlation calculating unit that calculates correlation value between the squared addition signal and a ½ symbol frequency component, and outputs this correlation value as an addition correlation signal; a squared-subtraction signal component correlation calculating unit that calculates correlation value between the squared subtraction signal and the ½ symbol frequency component, and outputs this correlation value as a subtraction correlation signal; a vector selecting unit that compares the magnitude of the addition correlation signal with the magnitude of the subtraction correlation signal, selects the addition correlation signal or the subtraction correlation signal whichever is larger, and outputs this signal as a selected correlation signal; and a timing phase difference calculating unit that outputs a phase control signal from a vector angle shown by the selected correlation signal.

Further, the timing regenerating device according to still another aspect of the invention comprises an in-phase component square calculation unit that receives a base band signal having a preamble symbol, calculates square of an in-phase component of the base band signal and outputs the squared in-phase component; an in-phase multiplier that multiplies a sign bit ($\pm 1$) of the in-phase component of the base band signal to the squared in-phase component and outputs the result as signed squared in-phase component; an orthogonal component square calculation unit that receives the base band signal, calculates square of an orthogonal component of the base band signal and outputs the squared orthogonal component; an orthogonal multiplier that multiplies a sign bit ($\pm 1$) of the orthogonal component of the base band signal to the squared orthogonal component and outputs the result as a signed squared orthogonal component; an adder that adds the signed squared in-phase and orthogonal components, generates a squared addition signal using a result of this addition, and outputs this signal; a subtracter that subtracts the signed squared in-phase component from the signed squared orthogonal component or vice versa, and generates and outputs a squared subtraction signal using a result of this subtraction; a squared-addition signal component correlation calculating unit that calculates correlation value between the squared addition signal and a ½ symbol frequency component, and outputs this correlation value as an addition correlation signal; a squared-subtraction signal component correlation calculating unit that calculates correlation value between the squared subtraction signal and the ½ symbol frequency component, and outputs this correlation value as a subtraction correlation signal; a vector selecting unit that compares the magnitude of the addition correlation signal with the magnitude of the subtraction correlation signal, selects the addition correlation signal or the subtraction correlation signal whichever is larger, and outputs this signal as a selected correlation signal; and a preamble detecting/timing phase difference calculating unit that calculates a vector angle and a vector length of the selected correlation signal, decides that the preamble symbol has been detected when the vector length is larger than a predetermined threshold value, calculates a timing phase difference using a vector angle shown by the selected correlation signal at that time, and outputs a phase control signal.

Further, according to still another aspect of the invention, the timing regenerating device of the above aspect further comprises a VCO that outputs a regeneration symbol clock, a regeneration sample clock, and a ½ symbol frequency component, based on a phase control signal. The base band signal to be input into the in-phase component square calculation unit and the orthogonal component square calculation unit is a signal that has been sampled based on the regeneration sample clock. The squared-addition signal component correlation calculating unit calculates correlation value using the ½ symbol frequency component output from the VCO, and the squared-subtraction signal component correlation calculating unit calculates correlation value using the ½ symbol frequency component output from the VCO.

Further, according to still another aspect of the invention, the timing regenerating device of the above aspect further comprises a phase detecting unit that detects advancement/delay of a timing phase using the base band signal sampled based on the regeneration sample clock, and outputs detected signals as phase detection signals; and a phase detection signal averaging unit that calculates an average of the phase detection signals, and outputs the average as a phase advance/delay signal, wherein the VCO outputs a regeneration symbol clock, a regeneration sample clock, and a ½ symbol frequency component, based on both the phase control signal and the phase advance/delay signal.

Further, according to still another aspect of the invention, the timing regenerating device of the above aspect further comprises an oscillator that outputs an asynchronous sample clock and a ½ symbol frequency component. The base band signal to be input into the in-phase component square calculation unit and the orthogonal component square calculation unit is a signal that has been sampled by the asynchronous sample clock. The squared-addition signal component correlation calculating unit calculates correlation value using the ½ symbol frequency component output from the oscillator. The squared-subtraction signal component correlation calculating unit calculates correlation value using the ½ symbol frequency component output from the oscillator.

Further, the timing regenerating device according to still another aspect of the invention comprises an in-phase component square calculation unit that receives a base band signal having a preamble symbol, calculates square of an in-phase component of the base band signal and outputs the squared in-phase component; an in-phase multiplier that multiplies a sign bit (±1) of the in-phase component of the base band signal to the squared in-phase component and outputs the result as signed squared in-phase component; an orthogonal component square calculation unit that receives the base band signal, calculates square of an orthogonal component of the base band signal and outputs the squared orthogonal component; orthogonal multiplier that multiplies a sign bit (±1) of the orthogonal component of the base band signal to the squared orthogonal component and outputs the result as a signed squared orthogonal component; an adder that adds the signed squared in-phase and orthogonal components, generates a squared addition signal using a result of this addition, and outputs this signal; a subtracter that subtracts the signed squared in-phase component from the signed squared orthogonal component or vice versa, and generates and outputs a squared subtraction signal using a result of this subtraction; a squared-addition signal component correlation calculating unit that calculates correlation value between the squared addition signal and a ½ symbol frequency component, and outputs this correlation value as an addition correlation signal; a squared-subtraction signal component correlation calculating unit that calculates correlation value between the squared subtraction signal and the ½ symbol frequency component, and outputs this correlation value as a subtraction correlation signal; a vector selecting unit that compares the magnitude of the addition correlation signal with the magnitude of the subtraction correlation signal, selects the addition correlation signal or the subtraction correlation signal whichever is larger, and outputs this signal as a selected correlation signal; a weighting unit that gives a weight corresponding to a magnitude of a vector length shown by the selected correlation signal to the selected correlation signal, and outputs the weighted selected correlation signal as a weighted correlation signal; an averaging unit that multiplies the weighted correlation signal by two, calculates an average of the signal, and outputs this average as a weighted average correlation signal; and a timing phase difference calculating unit that outputs a phase control signal from a vector angle shown by the weighted average correlation signal.

Further, according to still another aspect of the invention, the timing regenerating device of the above aspect further comprises a VCO that outputs a regeneration symbol clock, a regeneration sample clock, and a ½ symbol frequency component, based on a phase control signal. The base band signal to be input into the in-phase component square calculation unit and the orthogonal component square calculation unit is a signal that has been sampled based on the regeneration sample clock. The squared-addition signal component correlation calculating unit calculates correlation value using the ½ symbol frequency component output from the VCO, and the squared-subtraction signal component correlation calculating unit calculates correlation value using the ½ symbol frequency component output from the VCO.

Further, according to still another aspect of the invention, the timing regenerating device of the above aspect further comprises an oscillator that outputs an asynchronous sample clock and a ½ symbol frequency component. The base band signal to be input into the in-phase component square calculation unit and the orthogonal component square calculation unit is a signal that has been sampled by the asynchronous sample clock. The squared-addition signal component correlation calculating unit calculates correlation value using the ½ symbol frequency component output from the oscillator, and the squared-subtraction signal component correlation calculating unit calculates correlation value using the ½ symbol frequency component output from the oscillator.

Further, according to still another aspect of the invention, in the timing regenerating device of the above aspect, the adder adds a signed squared in-phase and orthogonal components to obtain a result as a squared addition signal, and the subtracter subtracts the signed squared in-phase component from the signed squared orthogonal component or vice versa, and obtains a result as a squared subtraction signal.

Further, according to still another aspect of the invention, in the timing regenerating device of the above aspect, the adder adds a signed squared in-phase and orthogonal components, and obtains a square root of this sum as a squared addition signal, and the subtracter subtracts the signed squared in-phase component from the signed squared orthogonal component or vice versa, and obtains a square root of this difference as a squared subtraction signal.

Further, according to still another aspect of the invention, in the timing regenerating device of the above aspect, when the in-phase component of a weighted correlation signal is negative, the averaging unit inverts the signs of the in-phase and orthogonal components of the weighted correlation signal respectively, and generates a correlation signal with the inverted signs as a first correlation signal. On the other hand, when the in-phase component of the weighted correlation signal is positive, the averaging unit generates this weighted correlation signal as a first correlation signal. Furthermore, when the orthogonal component of the weighted correlation signal is negative, the averaging unit inverts the signs of the in-phase and orthogonal components of the weighted correlation signal respectively, and generates a correlation signal with the inverted signs as a second correlation signal. On the other hand, when the orthogonal component of the weighted correlation signal is positive, the averaging unit generates this weighted correlation signal as a second correlation signal, and the averaging unit calculates an average of the first and second correlation signals respectively. Furthermore, when the vector length of the averaged first correlation signal is larger than the vector length of the averaged second correlation signal, the averaging unit outputs the averaged first correlation signal as the weighted average correlation signal. On the other hand, when the vector length of the averaged second correlation signal is larger than the vector length of the averaged first correlation signal, the averaging unit outputs the averaged second correlation signal as the weighted average correlation signal.

Further, according to still another aspect of the invention, the timing regenerating device of the above aspect further comprises a clip detecting unit that receives a base band signal having a preamble symbol, converts both the in-phase and orthogonal components of the base band signal into "0" when at least one value of in-phase and orthogonal components of the base band signal is outside a predetermined range, and outputs the base band signal straight when at least one value of in-phase and orthogonal components of the base band signal is within the predetermined range. The base band signal input into the in-phase component square calculation unit and the orthogonal component square calculation unit is the base band signal output from the clip detecting unit.

Further, the demodulator according to still another aspect of the invention comprises an antenna that receives a radio signal; a frequency converting unit that converts the frequency of the received radio signal into the frequency of a base band signal; an A/D converting unit that converts the base band signal into a digital base band signal based on a sampling at two times a symbol rate using a regeneration sample clock; a timing regenerating device; and a data deciding unit that extracts Nyquist point data from the digital base band signal using the regeneration symbol clock, decides the extracted Nyquist point data, and outputs the data as demodulated data.

Further, the demodulator according to still another aspect of the invention comprises an antenna that receives a radio signal; a frequency converting unit that converts the frequency of the received radio signal into the frequency of a base band signal; an A/D converting unit that converts the base band signal into a digital base band signal based on a sampling at two times a symbol rate using the asynchronous sample clock; a timing regenerating device; a data interpolating unit that interpolates the digital base band signal that has been sampled by the asynchronous sample clock, and outputs the interpolated data as an interpolated base band signal; and a data deciding unit that extracts a Nyquist point of the interpolated base band signal based on a phase control signal, decides data at the extracted Nyquist point, and outputs the data as demodulated data.

BRIEF DESCRIPTION OF THE DRAWINGS

FIG. 2 is a diagram showing a sampling status of a preamble symbol;

FIG. 3 is a diagram showing a sampling status of a preamble symbol;

FIG. 4 is a diagram showing combined correlation values ($\Sigma C$, $\Sigma S$);

FIG. 10 is a diagram showing a sampling status of a preamble symbol;

FIG. 11 is a diagram showing a sampling status of a preamble symbol;

FIG. 14 is a structure diagram of a demodulator according to a fifth embodiment of the present invention;

FIG. 23 is a diagram showing a sampling status of a preamble symbol;

FIG. 24 is a diagram showing correlation values (CI, SI) and correlation values (CQ, SQ);

FIG. 26 is a diagram showing a sampling status of a preamble symbol;

FIG. 27 is a diagram showing correlation values (CI, SI) and correlation values (CQ, SQ);

FIG. 32 is a diagram showing a sampling status of a preamble symbol;

FIG. 33 is a diagram showing combined correlation values (ΣC, ΣS);

FIG. 35 is a diagram showing a sampling status of a preamble symbol; and

BEST MODE FOR CARRYING OUT THE INVENTION

Figure 1:
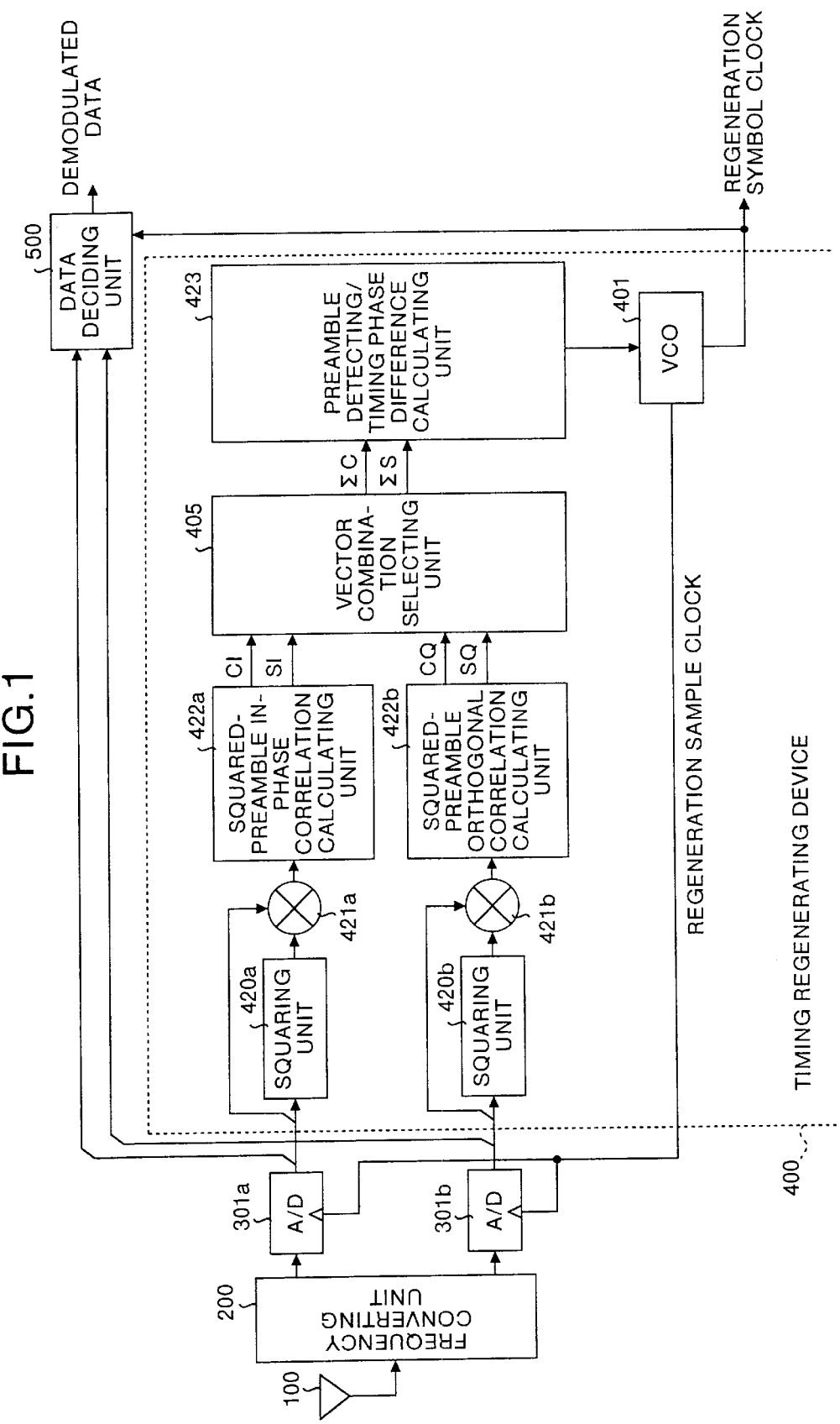
FIG. 1 is a structure diagram of a demodulator according to a first embodiment of the present invention.
Figure 20:
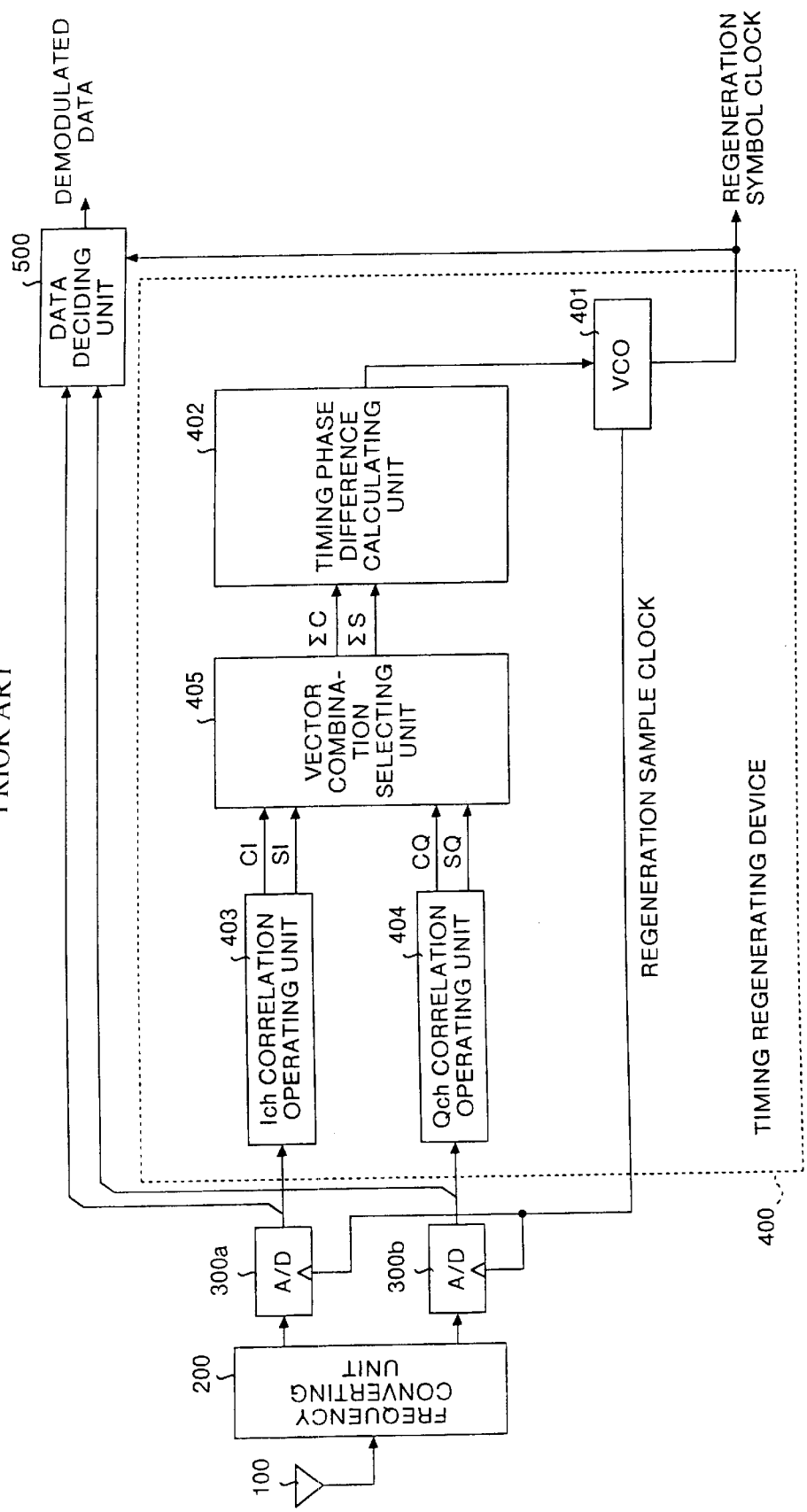
FIG. 20 is a structure diagram of a conventional demodulator.

FIG. 1 is a structure diagram of a demodulator according to a first embodiment of the present invention. Sections identical to or corresponding to those of the conventional demodulator shown in FIG. 20 are attached with the same reference numbers.

This demodulator mainly comprises antenna 100, frequency converting unit 200, first A/D converter 301a, second A/D converter 301b, timing regenerating device 400, and data deciding unit 500. The timing regenerating device 400 mainly comprises VCO 401, in-phase component square calculation unit 420a, orthogonal component square calculation unit 420b, in-phase multiplier 421a, orthogonal multiplier 421b, squared-preamble in-phase correlation calculating unit 422a, squared-preamble orthogonal correlation calculating unit 422b, vector combination selecting unit 405, and preamble detecting/timing phase difference calculating unit 423.

Figure 22:
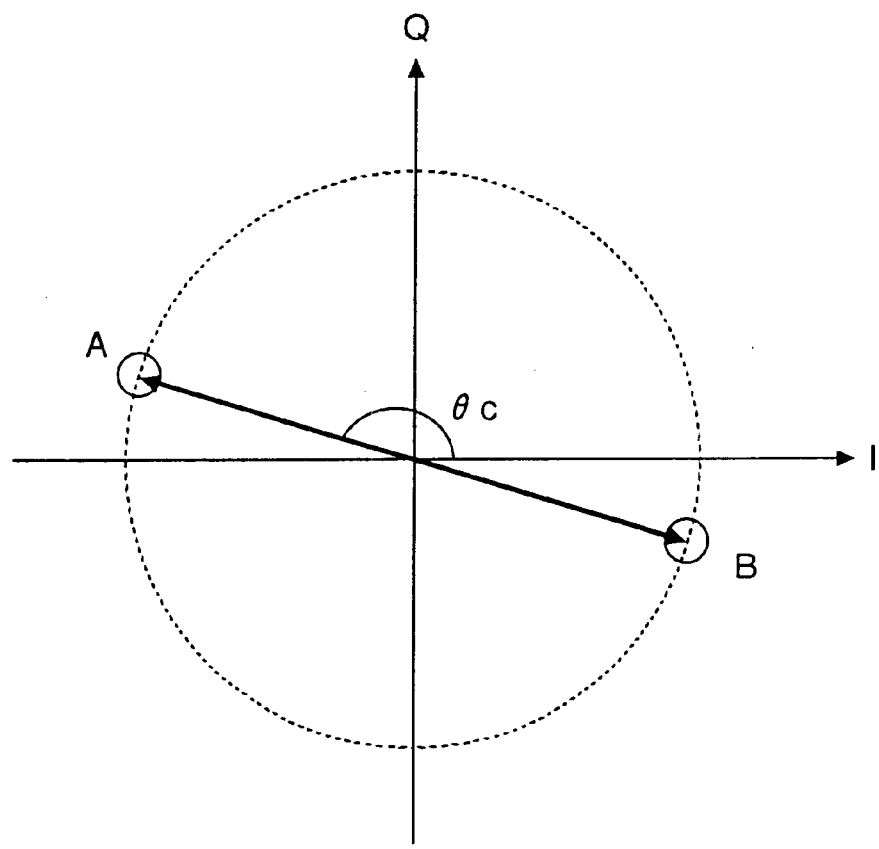
FIG. 22 is a signal space diagram showing a preamble symbol ("1001" pattern)
Figure 36:
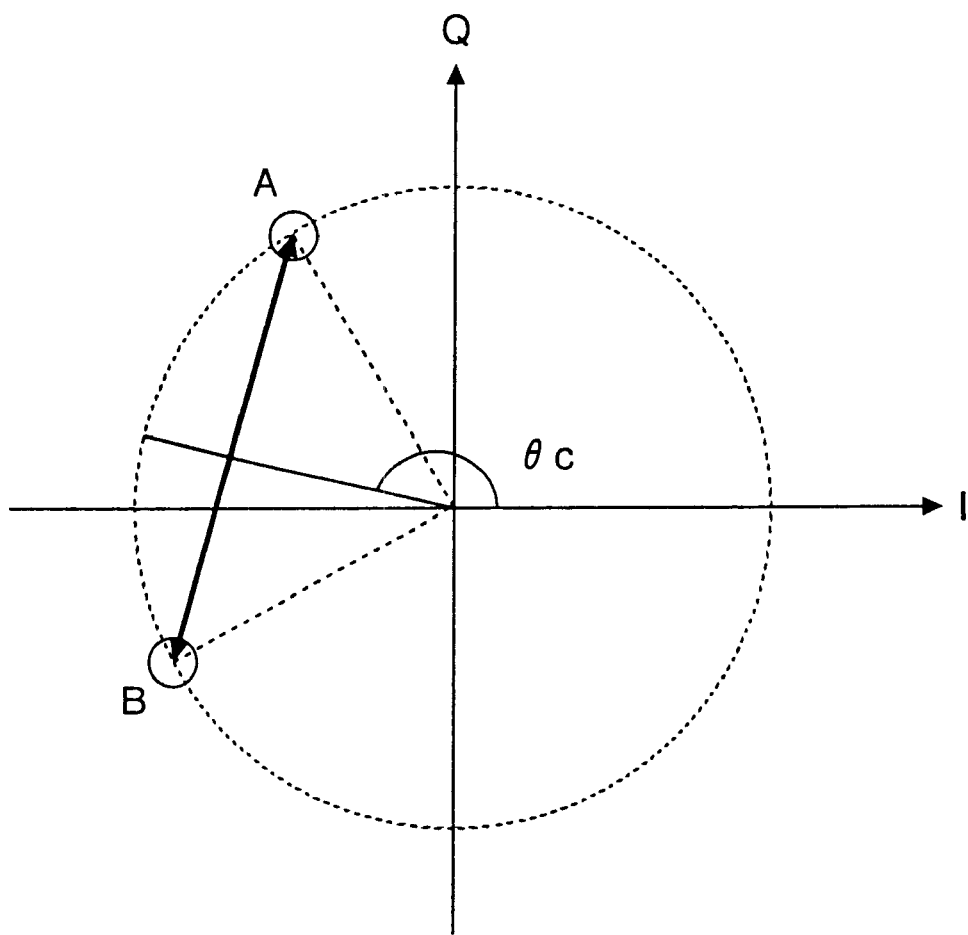
FIG. 36 is a signal space diagram showing a preamble symbol ("1101" pattern).

Detail operation of the demodulator will be explained next. First, the antenna 100 receives a burst signal of RF band. The frequency converting unit 200 frequency converts the burst signal of the RF band into a burst signal of a base band. This burst signal has a preamble symbol at the header. Significant data exists after the preamble symbol. The preamble symbol used here may be a signal (for example; the "1001" pattern) as shown in FIG. 22 or a signal (for example, the "1101" pattern) as shown in FIG. 36.

The first A/D converter 301a samples the in-phase component of the received signal of the base band at time $t=\tau+iT/2$ (where $i=1, 2, 3, \ldots$, and $\tau$ represents a timing error ($-T/2 \leq \tau < T/2$), and T represents a symbol frequency), and outputs a received data string $I_i$ ($i=1, 2, 3, \ldots$) as the in-phase component of the received signal.

Similarly, the second A/D converter 301b samples the orthogonal component of the received signal of the base band at time $t=\tau+iT/2$, and outputs a received data string $Q_i$ ($i=1, 2, 3, \ldots$) as the orthogonal component of the received signal. The A/D converters 301a and 301b sample the data using the regeneration sample clock output from the timing regenerating device 400 respectively.

According to the conventional first A/D converter 300a and second A/D converter 300b, the data to be sampled is limited to the preamble. However, the first A/D converter 301a and the second A/D converter 301b are different from these conventional converters in that the first A/D converter 301a and the second A/D converter 301b sample all the received strings including significant data in addition to the preamble.

The timing regenerating device 400 detects the preamble symbols ($Ip_i$, $Qp_i$) within the burst signal using the received data string $I_i$ ($i=1, 2, 3, \ldots$) and the received data string $Q_i$ ($i=1, 2, 3, \ldots$), calculates a timing error $\tau$ using the preamble symbols, and carries out a phase control for controlling the timing error $\tau$ to a regeneration sample clock and a regeneration symbol clock. The regeneration symbol clock is a clock of a symbol period having the regeneration sample clock frequency-divided into two.

The data deciding unit 500 receives significant random data strings $Id_i$ and $Qd_i$ ($i=1, 2, 3, \ldots$) that follow the preambles after the timing error $\tau$ has been cancelled by the timing regenerating device 400, and latches the data at the Nyquist points by the regeneration symbol clock. Then, the data deciding unit 500 decides the data using the latched Nyquist point data, and outputs the demodulated data.

Detail operation of the timing regenerating device 400 will be explained below.

First, the in-phase component square calculation unit 420a calculates a square of the in-phase component $I_i$ of the received signal, and the orthogonal component square calculation unit 420b calculates a square of the orthogonal component $Q_i$ of the received signal.

The in-phase multiplier 421a multiplies a sign $I_i$ shown by the equations (17a) and (17b) of the in-phase component $I_i$ of the received signal to $|I_i|^2$ output from the in-phase component square calculation unit 420a:

$$\text{sign } I_i = +1 (I_i \geq 0) \tag{17a}$$

$$\text{sign } I_i = -1 (I_i < 0) \tag{17b}$$

Then, the in-phase multiplier 421a outputs a signed squared in-phase component $DI_i$ as follows:

$$DI_i = \text{sign } I_i \times |I_i|^2 \tag{18a}$$

Similarly, the orthogonal multiplier 421b multiplies a sign $Q_i$ shown by the equations (17c) and (17d) of the orthogonal component $Q_i$ of the received signal to $|Q_i|^2$ output from the orthogonal component square calculation unit 420b:

$$\text{sign } Q_i = +1 (Q_i \geq 0) \tag{17c}$$

$$\text{sign } Q_i = -1 (Q_i < 0) \tag{17d}$$

Then, the orthogonal multiplier 421b outputs a signed squared orthogonal component $DQ_i$ as follows:

$$DQ_i = \text{sign } Q_i \times |Q_i|^2 \tag{18b}$$

The squared-preamble in-phase correlation calculating unit 422a receives the signed squared in-phase component $DI_i$ ($i=1, 2, 3, \ldots$), and carries out the multiplication of a ½ symbol frequency component based on the equations (19a) and (19b):

$$DIc_i = DI_i \times \cos \pi i/2 \tag{19a}$$

$$DIs_i = DI_i \times \sin \pi i/2 \tag{19b}$$

Then, the squared-preamble in-phase correlation calculating unit 422a calculates an average of the results of the multiplication ($DIc_i$, $DIs_i$), obtains correlation values ($CI_i$, $SI_i$), and outputs them as in-phase correlation signals.

Similarly, the squared-preamble orthogonal correlation calculating unit 422b carries out the multiplication of a ½ symbol frequency component to the signed squared orthogonal component $DQ_i$ ($i=1, 2, 3, \ldots$) based on the equations (20a) and (20b):

$$DQc_i = DQ_i \times \cos \pi i/2 \tag{20a}$$

$$DQs_i = DQ_i \times \sin \pi i/2 \tag{20b}$$

Then, the squared-preamble orthogonal correlation calculating unit 422b calculates an average of the results of the multiplication ($DQc_i$, $DQs_i$), obtains correlation values ($CQ_i$, $SQ_i$), and outputs them as orthogonal correlation signals.

The multiplication in the equations (19a), (19b), (20a) and (20b) is simple as cos $\pi i/2$=1, 0, −1, 0, ..., and sin $\pi i/2$=0, 1, 0, −1, ..., and the correlation values ($CI_i$, $SI_i$) and ($CQ_i$, $SQ_i$) can be obtained easily, in a similar manner to that of the multiplication of the equations (1a), (1b), (2a) and (2b).

The vector combination selecting unit 405 receives the correlation values ($CI_i$, $CQ_i$) and the correlation values ($SI_i$, $SQ_i$), combines and selects based on the processing similar to the conventional processing, and outputs the combined correlation signals ($\Sigma C_i$, $\Sigma S_i$). Based on this, it is possible to remove the influence of the carrier phase $\theta c$.

When "E" represents an envelope level, when receiving a preamble symbol that repeats ±180 [deg] for each one symbol as shown in FIG. 22, the amplitude of the signed squared in-phase component becomes (E cos $\theta c$)$^2$, and the amplitude of the signed squared orthogonal component becomes (E sin $\theta c$)$^2$. The sum of these amplitudes becomes constant as (E cos $\theta c$)$^2$+(E sin $\theta c$)$^2$=E$^2$ regardless of the carrier phase $\theta c$. Similarly, the combined correlation signals ($\Sigma C_i$, $\Sigma S_i$) that are the sums of the magnitudes of the correlation values ($CI_i$, $SI_i$) obtained from the signed squared in-phase component and the magnitudes of the correlation values ($CQ_i$, $SQ_i$) obtained from the signed squared orthogonal component become constant regardless of the carrier phase $\theta c$.

How the combined correlation signals ($\Sigma C_i$, $\Sigma S_i$) will are calculated will be explained here taking into consideration cases where the carrier phase $\theta c$ is 45 [deg] and 90 [deg].

Figure 31:
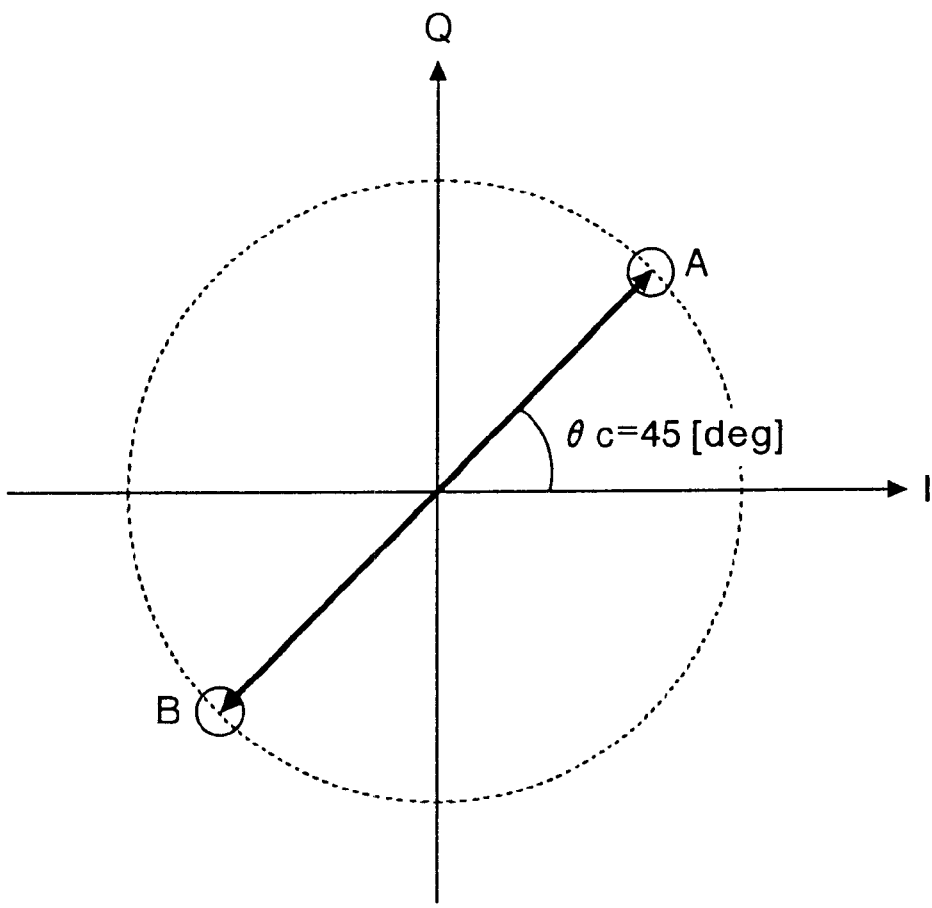
FIG. 31 is a preamble symbol space diagram when a carrier phase θc is 45 [deg]
Figure 34:
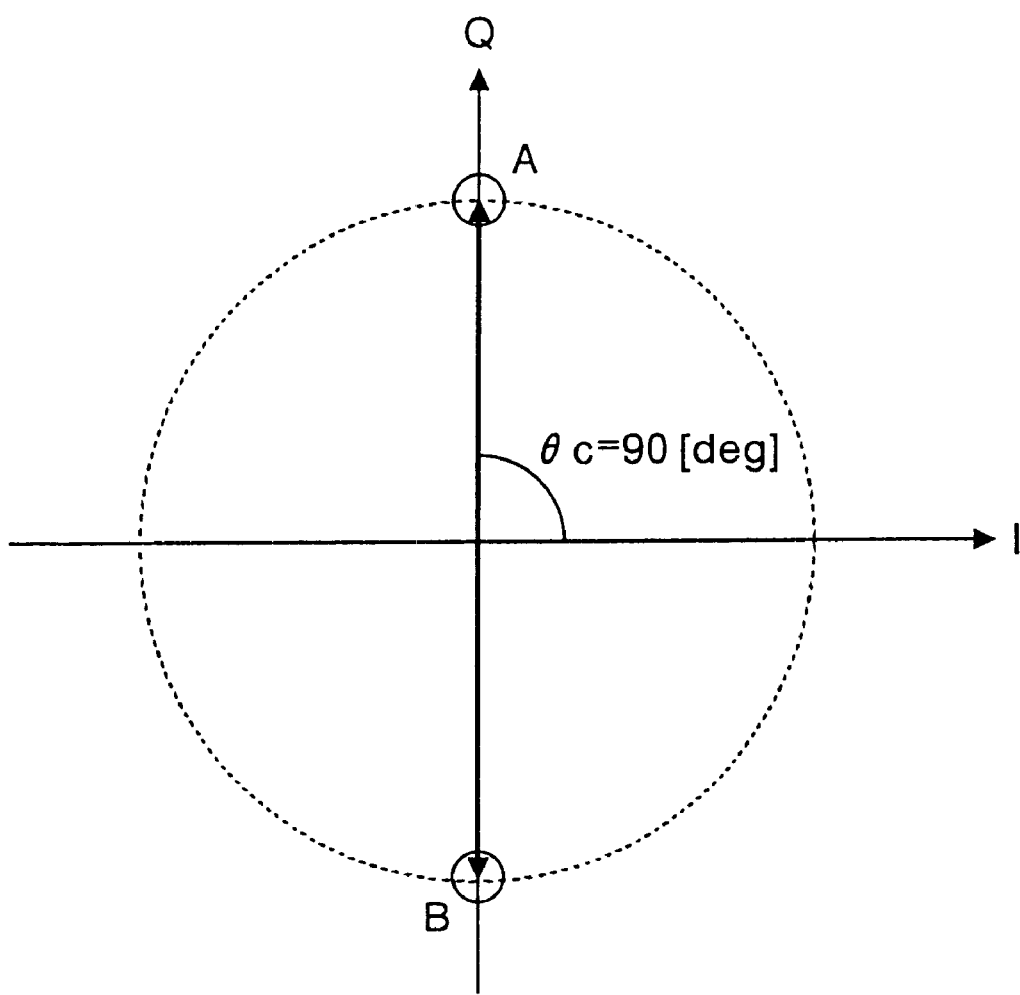
FIG. 34 is a preamble symbol space diagram when a carrier phase θc is 90 [deg]

When the preamble symbol having the carrier phase $\theta c$=45 [deg] as shown in FIG. 31 is received at the timings of the vertical lines shown in FIG. 32, the amplitude of the signed squared in-phase component and the amplitude of the signed squared orthogonal component become A$^2$/2. On the other hand, when the preamble symbol having the carrier phase $\theta c$=90 [deg] as shown in FIG. 34 is received at the same timings as the timings in FIG. 32, that is, at the timings of the vertical lines shown in FIG. 35, the signed squared in-phase component becomes "0", and the signed squared orthogonal component becomes A$^2$.

Therefore, the sum (A$^2$/2+A$^2$/2) of the amplitudes of the signed squared in-phase and orthogonal components when the carrier phase $\theta c$=45 [deg] becomes equal to the sum (0+A$^2$) of the amplitude of the signed squared in-phase and orthogonal components when the carrier phase $\theta c$=90 [deg]. Similarly, the combined correlation signals ($\Sigma C_i$, $\Sigma S_i$) when the carrier phase $\theta c$=45 [deg] and the combined correlation signals ($\Sigma C_i$, $\Sigma S_i$) when the carrier phase $\theta c$=90 [deg] coincide with each other as shown in FIG. 4. According to the conventional example, the combined correlation signals when the carrier phase $\theta c$=45 [deg] become larger than the combined correlation signals when the carrier phase $\theta c$=90 [deg]. Thus, the magnitude of the combined correlation signals ($\Sigma C_i$, $\Sigma S_i$) varies depending on the carrier phase $\theta c$. However, it can be observed that, according to the present embodiment, the magnitude of the combined correlation signals ($\Sigma C_i$, $\Sigma S_i$) becomes constant regardless of the carrier phase (that is, both when the carrier phase $\theta c$ is 45 and when it is 90 [deg]).

The preamble detecting/timing phase difference calculating unit 423 carries out the processing of obtaining a vector length $V_i$ of the combined correlation signals ($\Sigma C_i$, $\Sigma S_i$) and also the processing of obtaining a vector angle $\theta o_i$.

The vector length $V_i$ is obtained based on the equation (21):

$$Vi=(|\Sigma C_i|^2+|\Sigma S_i|^2)^{1/2} \tag{21}$$

The vector angle $\theta o_i$ is obtained based on the equation (22):

$$\theta O_i=\tan^{-1}(\Sigma S_i/\Sigma C_i) \tag{22}$$

$\theta o_i$ is a timing phase difference when the normalization has been carried out in the 2 symbol period (2T), like $\theta_T$. Therefore, a timing phase difference $\theta r_i$ [deg] when the normalization has been carried out in the symbol period (T) is obtained using the equation (23):

$$\theta r_i=2\theta o_i \bmod 360 \tag{23}$$

The processing of the equation (22) may be carried out based on the values (sign [$\Sigma C_i$]*|$\Sigma C_i$|$^{1/2}$, sign [$\Sigma S_i$]*|$\Sigma S_i$|$^{1/2}$) obtained by multiplying the sign {±1} of each correlation signal to the square root of each absolute value of the combined correlation signals ($\Sigma C_i$, $\Sigma S_i$). In this case, the vector angle $\theta o_i$ is obtained using the following equation:

$$\theta o_i=\tan^{-1}(\text{sign } [\Sigma S_i]\cdot|S_i|\Sigma^{1/2}/\text{sign } [\Sigma C_i]\cdot|\Sigma C_i|^{1/2}) \tag{22a}$$

The calculations in the equation 22a are more complex than those of the equation (22). However, it is possible to calculate the timing phase difference in higher precision.

Figure 5:
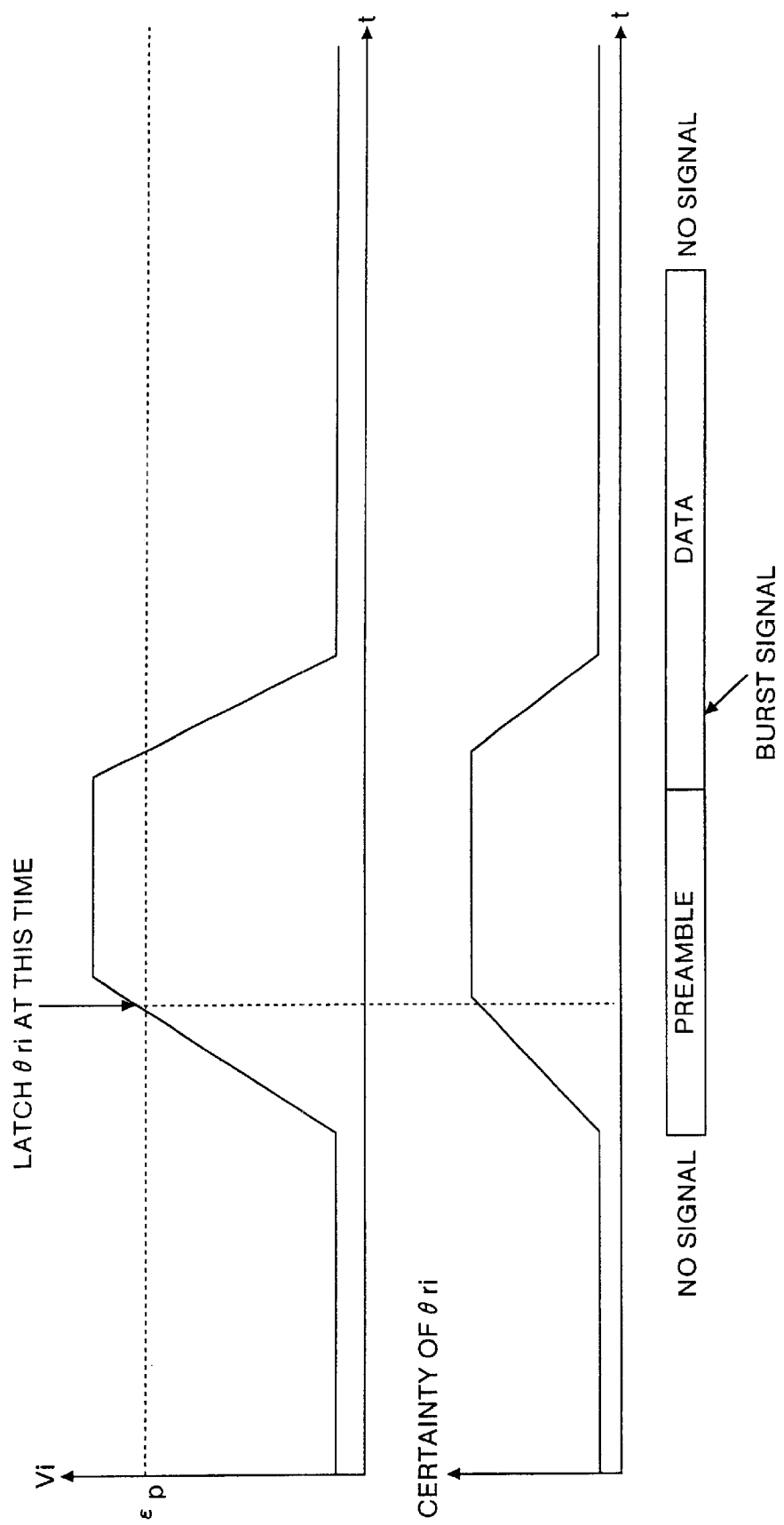
FIG. 5 is a diagram showing the operation of preamble detecting/timing phase difference calculating unit.

When the timing regenerating device 400 is receiving a preamble symbol as shown in FIG. 22, for example, the vector length $V_i$ becomes larger, and the timing phase difference $\theta r_i$ [deg] becomes a certain value. On the other hand, when the timing regenerating device 400 is receiving no signal (receiving only noise in the absence of a signal) or when the timing regenerating device 400 is receiving a significant data section that follows the preamble, the vector length $V_i$ becomes smaller, and the timing phase difference $\theta r_i$ [deg] becomes an uncertain value. FIG. 5 shows a relationship between $V_i$ and the level of certainty of $\theta r_i$ according to the reception status.

Therefore, even if the reception timing of the burst signal and the arrival time of the preamble symbol is not known, it becomes possible to obtain the timing error $\tau$ based on the following processing.

When a vector length $V_i$ is large as a result of monitoring $V_i$ (for example, when the vector length $V_i$ exceeds a certain threshold value $\epsilon p$), a decision is made that "preamble is being received", and the timing phase difference $\theta r_i$ [deg] is latched at the timing shown in FIG. 5. As is clear from FIG. 5, the latched timing phase difference $\theta r_i$ [deg] is a timing phase difference $\theta r_i$ [deg] when $V_i$ is large. Therefore, this is a certain value. The preamble detecting/timing phase difference calculating unit 423 obtains the timing error $\tau$ from the equations (16a) and (16b) using the timing phase difference $\theta s$ obtained as described above, and gives a phase control signal for canceling the timing error $\tau$ to the VCO 401 at the latter stage.

Assume, for example, that the detection of the preamble is carried out in a similar manner using the preamble detecting/timing phase difference calculating unit 423 in place of the conventional timing phase difference calculating unit 402. In this case, the magnitude (=vector length $V_i$) of the combined correlation signals ($\Sigma C$, $\Sigma S$) changes depending on the carrier phase $\theta c$. Therefore, the preamble detection characteristics for detecting the vector length $V_i$ based on the threshold value $\epsilon p$ are influenced by the carrier phase $\theta c$. However, according to the present embodiment, the magnitude (=vector length $V_i$) of the combined correlation signals ($\Sigma C_i$, $\Sigma S_i$) is constant regardless of the carrier phase θc. Therefore, the preamble detection characteristics for detecting the vector length $V_i$ based on the threshold value εp are not influenced by the carrier phase θc.

When the reception timing of the burst signal is known and also when the arrival time of the preamble can be specified, the preamble detection operation is not necessary. Therefore, in this case, it is of course possible to use the conventional timing phase difference calculating unit 402 in place of the preamble detecting/timing phase difference calculating unit 423. Since the function of obtaining the vector length $V_i$ and detecting its magnitude is not necessary, it is possible to reduce the circuit scale.

The VCO 401 receives the phase control signal from the preamble detecting/timing phase difference calculating unit 423, controls the phases of the regeneration sample clock and the regeneration symbol clock, and sets the timing error τ to "0". Further, the VCO 401 outputs the regeneration sample clock. This regeneration sample clock is used by the first A/D converting unit 301*a* and the first A/D converting unit 301*b* for sampling the base band signal. Further, the VCO 401 outputs a ½ symbol frequency component. This ½ symbol frequency component is used by the squared-preamble in-phase correlation calculating unit 422*a* and the squared-preamble orthogonal correlation calculating unit 522*b* respectively for calculating correlation values.

As explained above, a correlation calculation with the preamble symbol having a ½ symbol frequency component is carried out using a signal obtained by multiplying the sign bit (±1) of the in-phase component of the preamble symbol to the squared value of the in-phase component and a signal obtained by multiplying the sign bit (±1) of the orthogonal component of the preamble symbol to the squared value of the orthogonal component. Therefore, it is possible to realize the estimation of a timing phase at high precision without the influence of the carrier phase θc.

Further, the preamble detecting/timing phase difference calculating unit 423 can simultaneously realize the estimation of a timing phase at high precision using a preamble and the detection of a preamble. Therefore, it is possible to carry out the timing phase control normally even when the reception timing of the preamble is not known. In this case, the preamble detection characteristics are not influenced by the carrier phase θc. Further, it is possible to realize the above at a low sampling speed of 2 [sample/symbol].

Further, it is possible to realize a high-speed synchronization and a high-speed resynchronization in a short preamble without receiving an influence of a carrier phase θc, and to realize a satisfactory BER (bit-error ratio) characteristics in a significant data section that follows the preamble, even when the reception timing of a burst signal that occurs at the power supply start-up time or at the reconnection timing after a recovery from a shadowing is unknown.

Further, the timing regenerating device 400 can carry out the estimation of a timing phase and the detection of a preamble at high precision regardless of a carrier phase, when the preamble symbol is a signal that alternately shifts between two points for each one symbol on a complex plane, like the preamble symbol that alternately shifts between two adjacent Nyquist points for each symbol on the complex plane as shown in FIG. 36, in addition to the preamble symbol that alternately shifts between two Nyquist points for each symbol that become symmetrical with the origin (that shifts ±180 [deg] for each symbol) on the complex plane as shown in FIG. 22.

Figure 6:
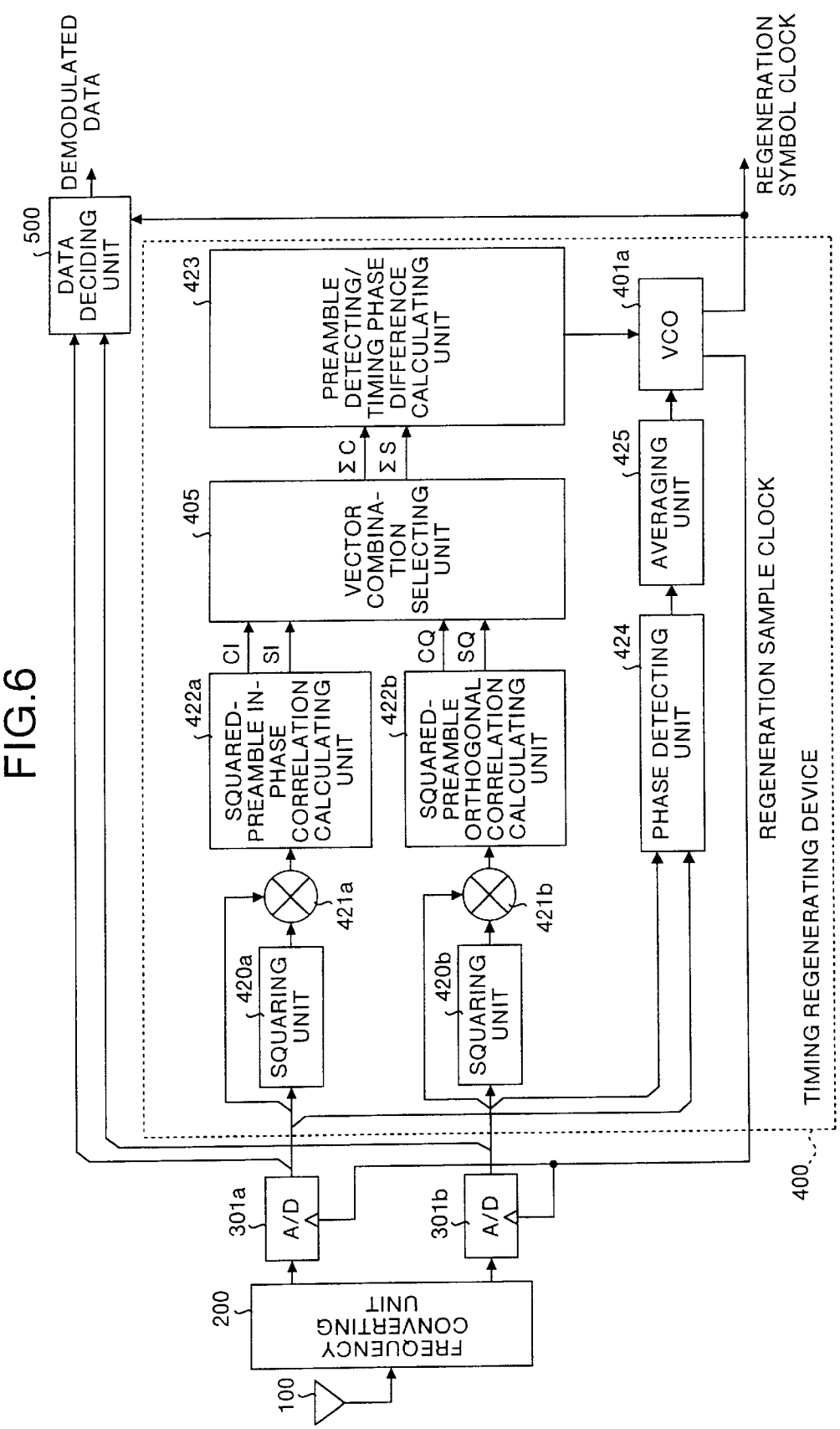
FIG. 6 is a structure diagram of a demodulator according to a second embodiment of the present invention.

FIG. 6 is a structure diagram of a demodulator according to a second embodiment of the present invention. This demodulator has a feedback system circuit called a PLL (Phase Lock Loop) built into the demodulator shown in FIG. 1. Sections identical to or corresponding to the portions of the demodulator shown in FIG. 1 are attached with the same reference numbers.

This demodulator comprises a PLL timing regenerating unit that includes phase detecting unit 424, averaging unit 425, and VCO 401*a*. This PLL timing regenerating unit is described in, for example, the document "Timing Recovery Scheme Using Received Signal Phase Information for QPSK Modulation" (by Fujimura, in Proceedings of Electronic Information Communication Association, Vol. J81-B-II No. 6, pp. 665–668, June, 1998).

The operation of the demodulator will be explained now. First, in the same manner as in the first embodiment, the PLL timing regenerating unit consisting of the phase detecting unit 417, the averaging unit 418, and the VCO 401*a* is operated at the time of detecting a preamble or at the time of calculating a timing error τ.

In this case, the processing performed by the in-phase component square calculation unit 420*a*, orthogonal component square calculation unit 420*b*, vector combination selecting unit 405, and preamble detecting/timing phase difference calculating unit 423 is similar to that of the first embodiment. That is, when a preamble symbol has been detected, a clock phase control for canceling the timing error τ obtained at the same time as this detection is given to the VCO 401*a* as a phase control signal.

In the mean time, the phase detecting unit 424 detects whether a timing phase is advanced or delayed from received data ($I_i$, $Q_i$). When the timing phase is advanced as a detection signal, "+1" is output, and when the timing phase is delayed, "−1" is output. The averaging unit 425 receives this advance/delay signal, calculates an average of the signals using a random work filter, for example, and outputs the value as a phase advance/delay signal.

The VCO 401*a* receives this phase advance/delay signal, and controls the phases of a regeneration sample clock and a regeneration symbol clock. When this phase advance/delay signal is "positive", the VCO 401*a* advances the timing phase, and when the phase advance/delay signal is "negative", the VCO 401*a* delays the timing phase. The VCO 401*a* is usually controlled based on the phase advance/delay signal. However, when a preamble has been detected and also when a phase control signal has been input, the VCO 401*a* controls each clock phase by using the phase control signal without using the phase advance/delay signal.

When only the phase advance/delay signal is used, this has a disadvantage that it takes time to lead the timing phase, as the advancement/delay control of the timing phase using this phase advance/delay signal is carried out in the ¹⁄₁₆ symbol step width, for example. On the other hand, this has an advantage that it is possible to trace the timing phase during the reception of a significant random data section that follows the preamble symbol.

In the mean time, when only the phase control signal is used, this has a disadvantage that a timing phase difference θ$r_i$ [deg] becomes uncertain and cannot be used during the reception of a significant random data section that follows the preamble symbol. On the other hand, this has an advantage that it is possible to detect a timing phase difference at high precision based on a short preamble symbol.

Since both the phase control signal and the phase advance/delay signal are used, the advantages cover the disadvantages. Therefore, it is possible to realize the tracing of the timing phase during the reception of the significant random data while carrying out the estimating and control of the timing phase at high precision using a short preamble symbol.

Further, like in the first embodiment, the timing regenerating device 400 can carry out the estimation of a timing phase and the detection of a preamble at high precision regardless of a carrier phase, when the preamble symbol is a signal that alternately shifts between two points for each one symbol on a complex plane, like the preamble symbol that alternately shifts between two adjacent Nyquist points for each symbol on the complex plane as shown in FIG. 36, in addition to the preamble symbol that alternately shifts between two Nyquist points for each symbol that become symmetrical with the origin (that shifts ±180 [deg] for each symbol) on the complex plane as shown in FIG. 22.

Figure 7:
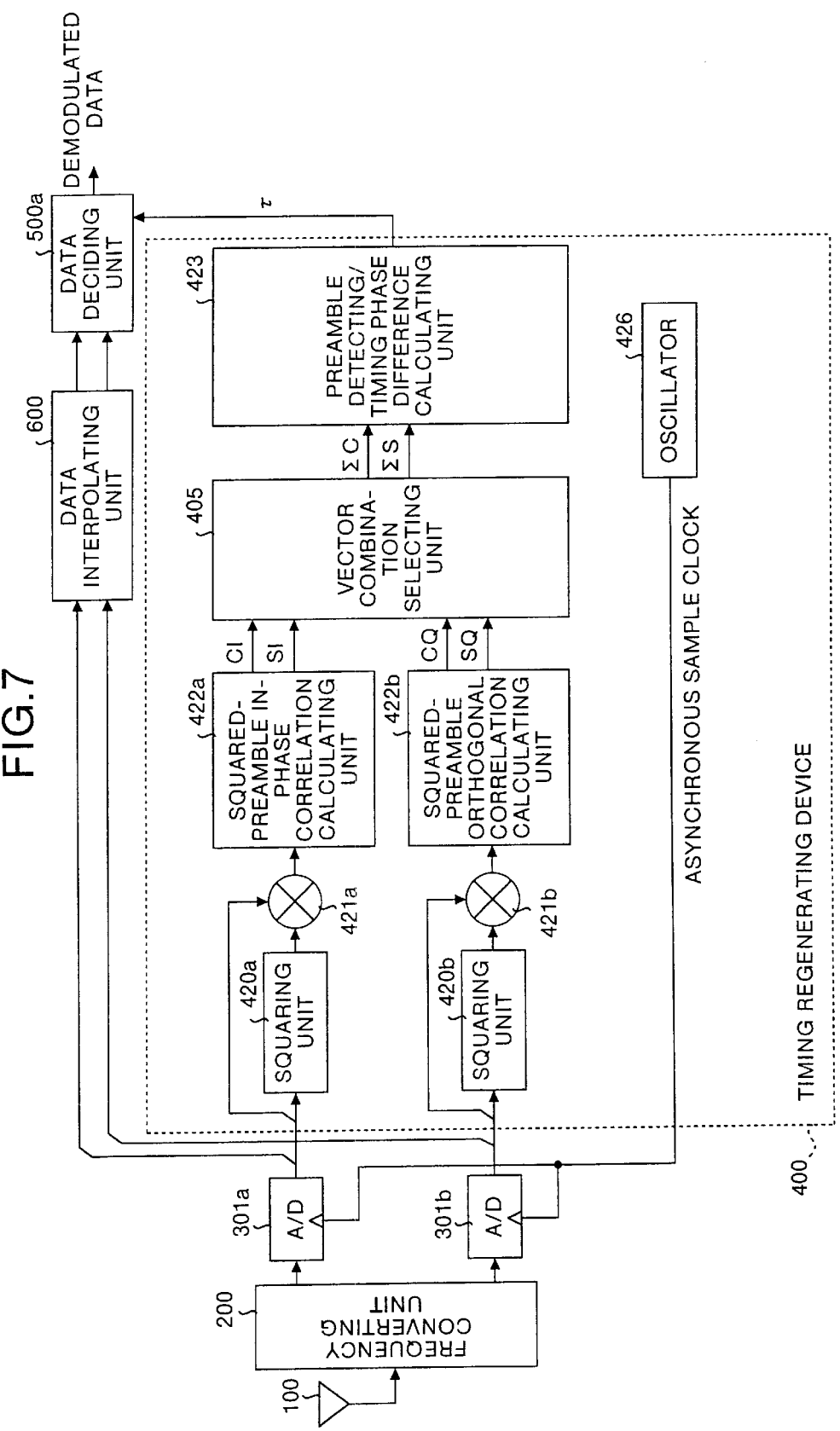
FIG. 7 is structure diagram of a demodulator according to a third embodiment of the present invention.

FIG. 7 is a structure diagram of a demodulator according to a third embodiment of the present invention. A feed forward type timing regenerating device is used in place of the VCO 401 in the demodulator shown in FIG. 1. Sections identical to or corresponding to the portions of the demodulator shown in FIG. 1 are attached with the same reference numbers.

The demodulator also comprises oscillator 426, data interpolating unit 600, and data deciding unit 500a.

Operation of the demodulator according to the third embodiment will now be explained will now be explained. The oscillator 426 outputs an asynchronous sample clock that self-runs at two times the symbol period. The first A/D converter 301a and second A/D converter 301b asynchronously sample the data at 2 [sample/symbol] by this asynchronous sample clock.

The in-phase component square calculation unit 420a and orthogonal component square calculation unit 420b obtain the square of the asynchronously sampled received data ($I_i$, $Q_i$) The in-phase multiplier 421a and orthogonal multiplier 421b multiply the sign (±1) of the received data ($I_i$, $Q_i$) to the input squared values obtained by the in-phase component square calculation unit 420a and the orthogonal component square calculation unit 420b respectively. The squared-preamble in-phase correlation calculating unit 422a calculates correlation between the signal $DI_i$ output from the in-phase multiplier 421a and a ½ frequency component $\exp[-j\pi(fs)t]$ of the symbol frequency output from the oscillator 426. The squared-preamble orthogonal correlation calculating unit 422b calculates correlation between the signal $DQ_i$ output from the orthogonal multiplier 421b and a ½ frequency component $\exp[-j\pi(fs)t]$ of the symbol frequency output from the oscillator 426. Thereafter, vector combination selecting unit 405 and preamble detecting/timing phase difference calculating unit 423 obtain the timing error τ.

The data interpolating unit 600 interpolates the data ($I_i$, $Q_i$) received by the first A/D converter 301a and the second A/D converter 301b, generates a received data having a time resolution of ¹⁄₁₆ of the symbol period, for example, and outputs the interpolated received data.

The data deciding unit 500a extracts a Nyquist point of the interpolated received data using the information of the timing error τ from the preamble detecting/timing phase difference calculating unit 423, and outputs the data of the extracted Nyquist point as demodulated data.

As explained above, based on the use of the low-cost and compact oscillator 426 in place of the VCO having a large circuit scale, it is possible to make the demodulator compact at low cost.

Further, like in the first embodiment, the timing regenerating device 400 can carry out the estimation of the timing phase and the detection of the preamble at high precision regardless of a carrier phase, when the preamble symbol is a signal that alternately shifts between two points for each one symbol on a complex plane, like the preamble symbol that alternately shifts between two adjacent Nyquist points for each symbol on the complex plane as shown in FIG. 36, in addition to the preamble symbol that alternately shifts between two Nyquist points for each symbol that become symmetrical with the origin (that shifts ±180 [deg] for each symbol) on the complex plane as shown in FIG. 22.

Figure 8:
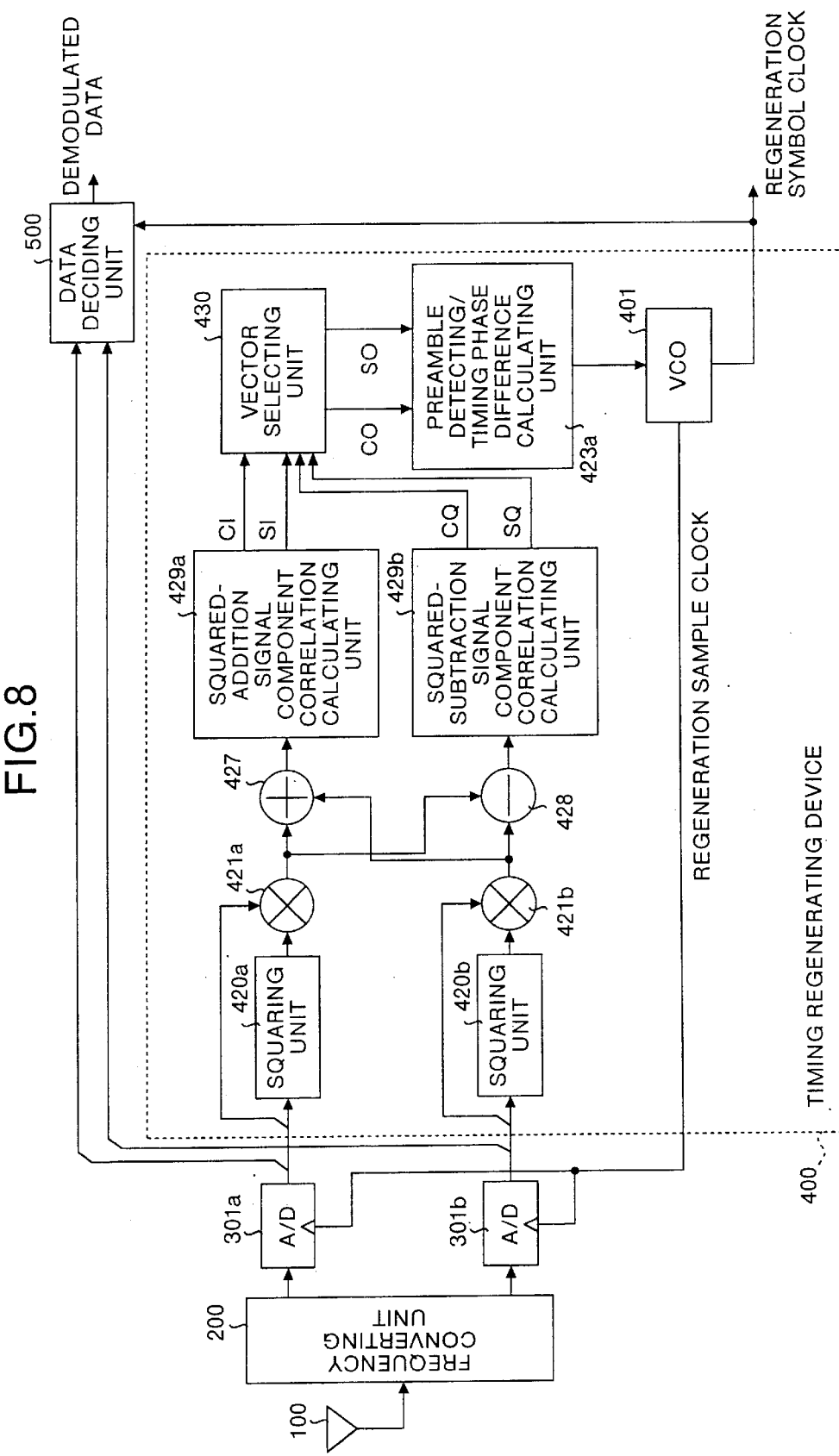
FIG. 8 is a structure diagram of a demodulator according to a fourth embodiment of the present invention.

FIG. 8 is a structure diagram of a demodulator according to a fourth embodiment of the present invention. Sections identical to or corresponding to the portions of the demodulator shown in FIG. 1 are attached with the same reference numbers. In FIG. 8, 423a denotes preamble detecting/timing phase difference calculating unit, 427 denotes adder, 428 denotes subtracter, 429a denotes squared-addition signal component correlation calculating unit, 429b denotes squared-subtraction signal component correlation calculating unit, and 430 denotes vector selecting unit.

Figure 9:
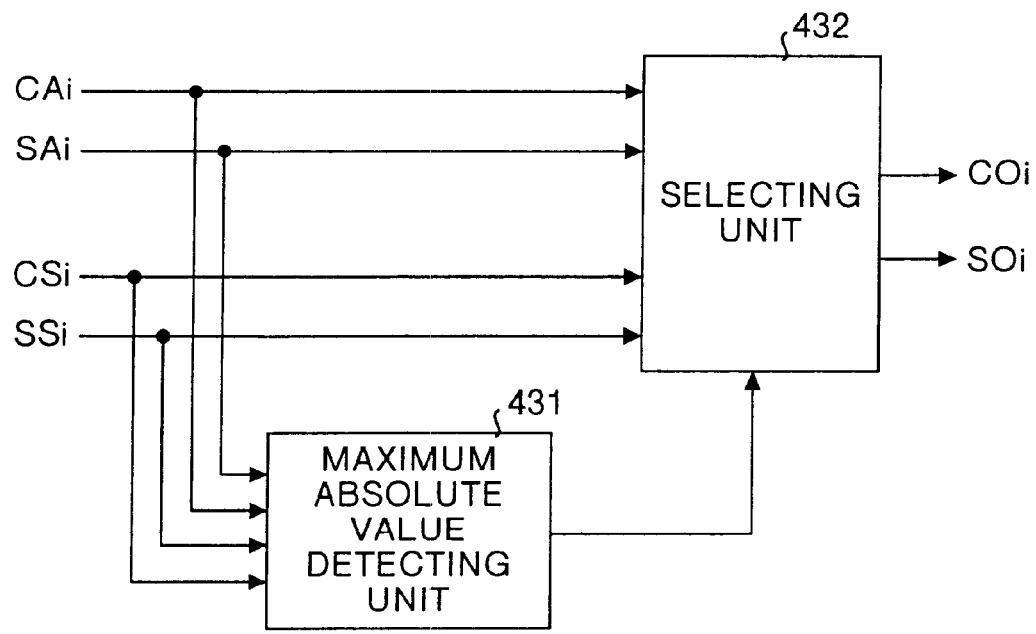
FIG. 9 is a structure diagram of vector selecting unit according to the fourth embodiment of the present invention.

Detail structure of the vector selecting unit 430 is shown in FIG. 9. This selecting unit 430 comprises maximum absolute value detecting unit 431, and selecting unit 432.

Operation of the demodulator according to the fourth embodiment will now be explained. The adder 427 adds a signed squared in-phase component $DI_i$ output from the in-phase multiplier 421a and a signed squared orthogonal component $DQ_i$ output from the orthogonal multiplier 421b, and outputs a result as a squared addition signal $A_i$. On the other hand, the subtracter 428 subtracts the signed squared in-phase component $DI_i$ output from the in-phase multiplier 421a from the signed squared orthogonal component $DQ_i$ output from the orthogonal multiplier 421b, and outputs a result as a squared subtraction signal $S_i$. The subtraction performed by the subtracter 428 may be either ($DI_i-DQ_i$) or ($DQ_i-DI_i$).

When a preamble symbol has been received ($I_i=Ip_i$, $Q_i=Qp_i$), regardless of the value of the carrier phase θc [deg], either one of the squared addition signal output from the adder 427 and the squared subtraction signal output from the subtracter 428 can become a signal having a large ½ symbol frequency component. For example, when the carrier phase θc [deg] is within the range of (90<θc<180) or (270<θc<360) as shown in FIG. 22, the phases of the in-phase and orthogonal components of the preamble symbol becomes in the opposite phase relationship as shown in FIG. 23. Therefore, the signed squared in-phase component $DI_i$ and the signed squared orthogonal component $DQ_i$ obtained by multiplying the sign (±1) to these squared values respectively also become in the opposite phase relationship.

Therefore, the amplitude of the squared addition signal $A_i$ becomes small as shown in FIG. 10(a) based on the cancellation of both signals. On the other hand, the amplitude of the squared subtraction signal $S_i$ becomes large as shown in FIG. 10(b) based on the in-phase relationship between the signed squared in-phase component $DI_i$ and the inverted signed squared orthogonal component $DQ_i$.

When the carrier phase θc [deg] is within the range of (90<θc<180) or (270<θc<360) as shown in FIG. 22, the absolute value of the amplitude of the squared subtraction signal $S_i$ becomes $||I_i|^2+|Q_i|^2|$, which is constant (the squared value of the envelope E: $E^2$) regardless of the carrier phase θc. (The absolute value of the squared addition signal $A_i$ becomes $||I_i|^2-|Q_i|^2|$, and this changes depending on the carrier phase θc.)

Figure 25:
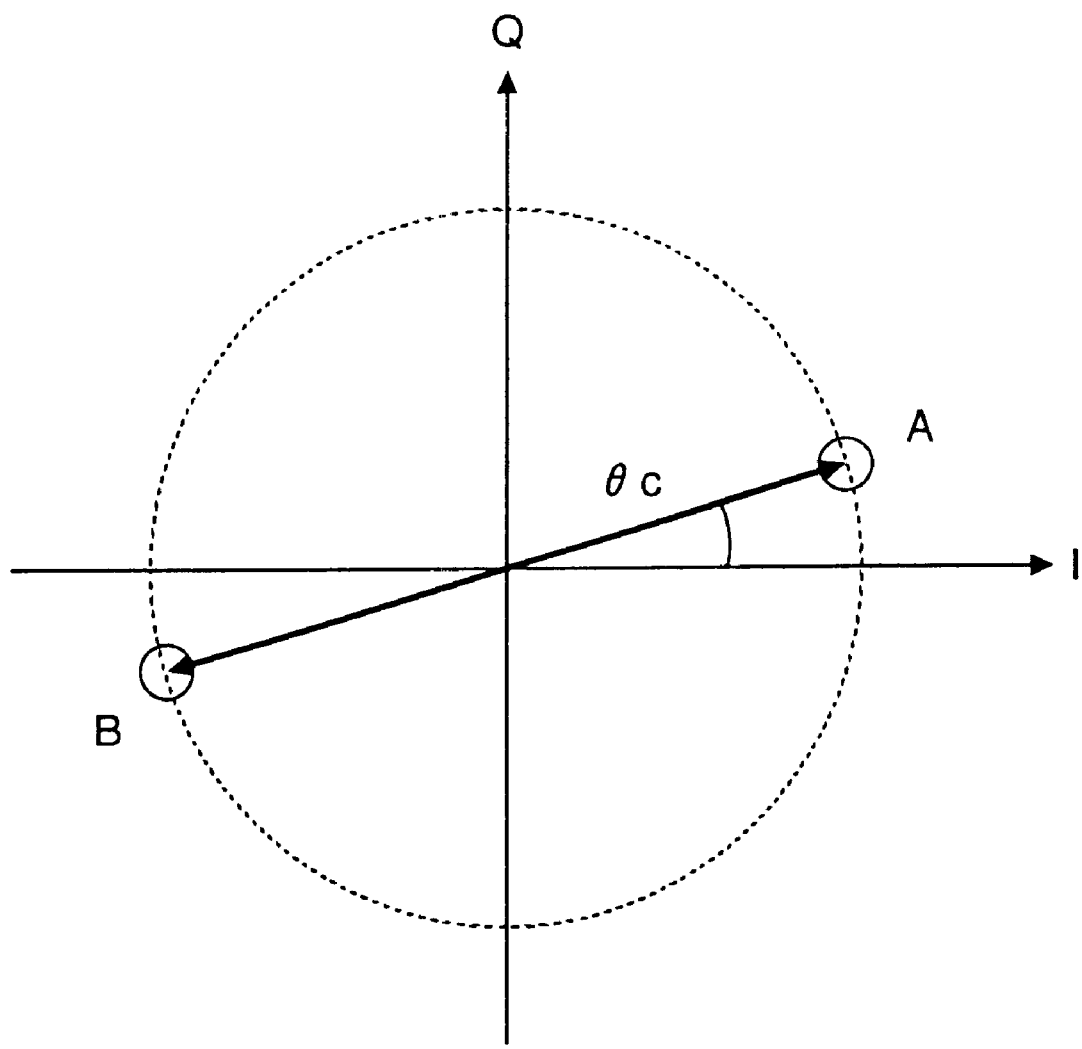
FIG. 25 is a signal space diagram showing a preamble symbol ("1001" pattern)
Figure 28:
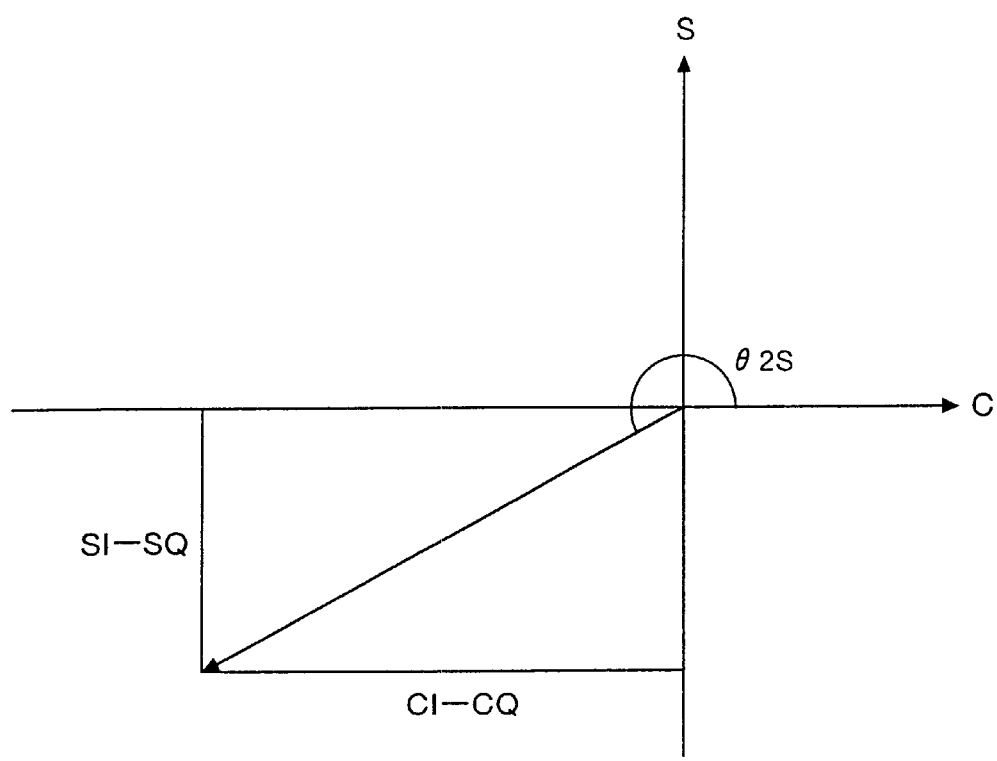
FIG. 28 is a diagram showing combined correlation values ($\Sigma C$, $\Sigma S$)
Figure 29:
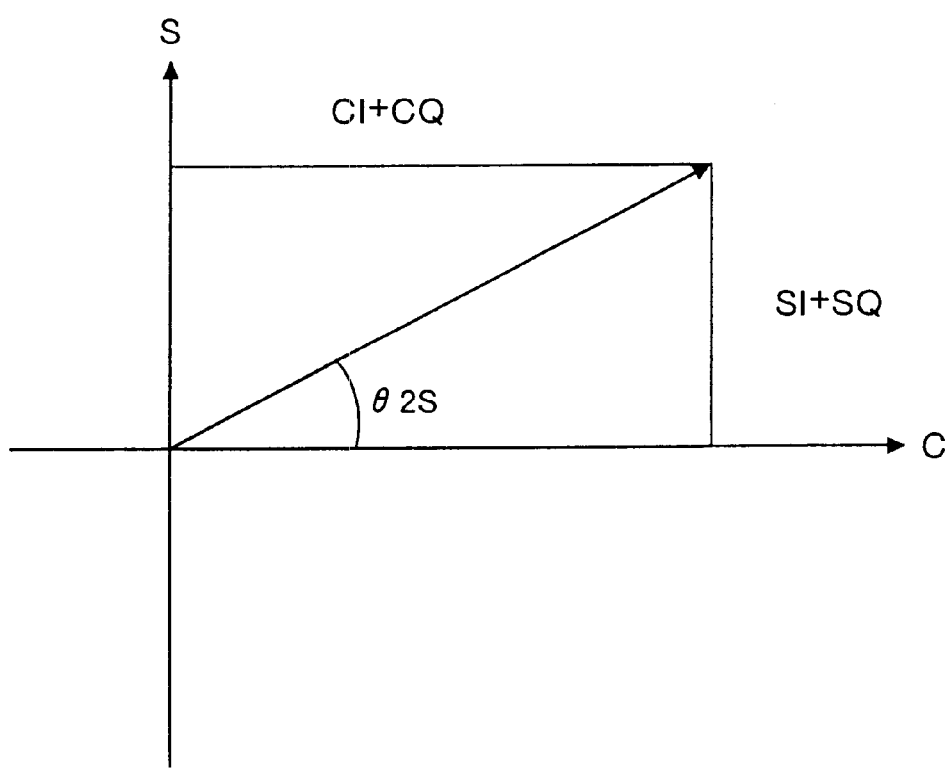
FIG. 29 is a diagram showing combined correlation values ($\Sigma C$, $\Sigma S$)
Figure 30:
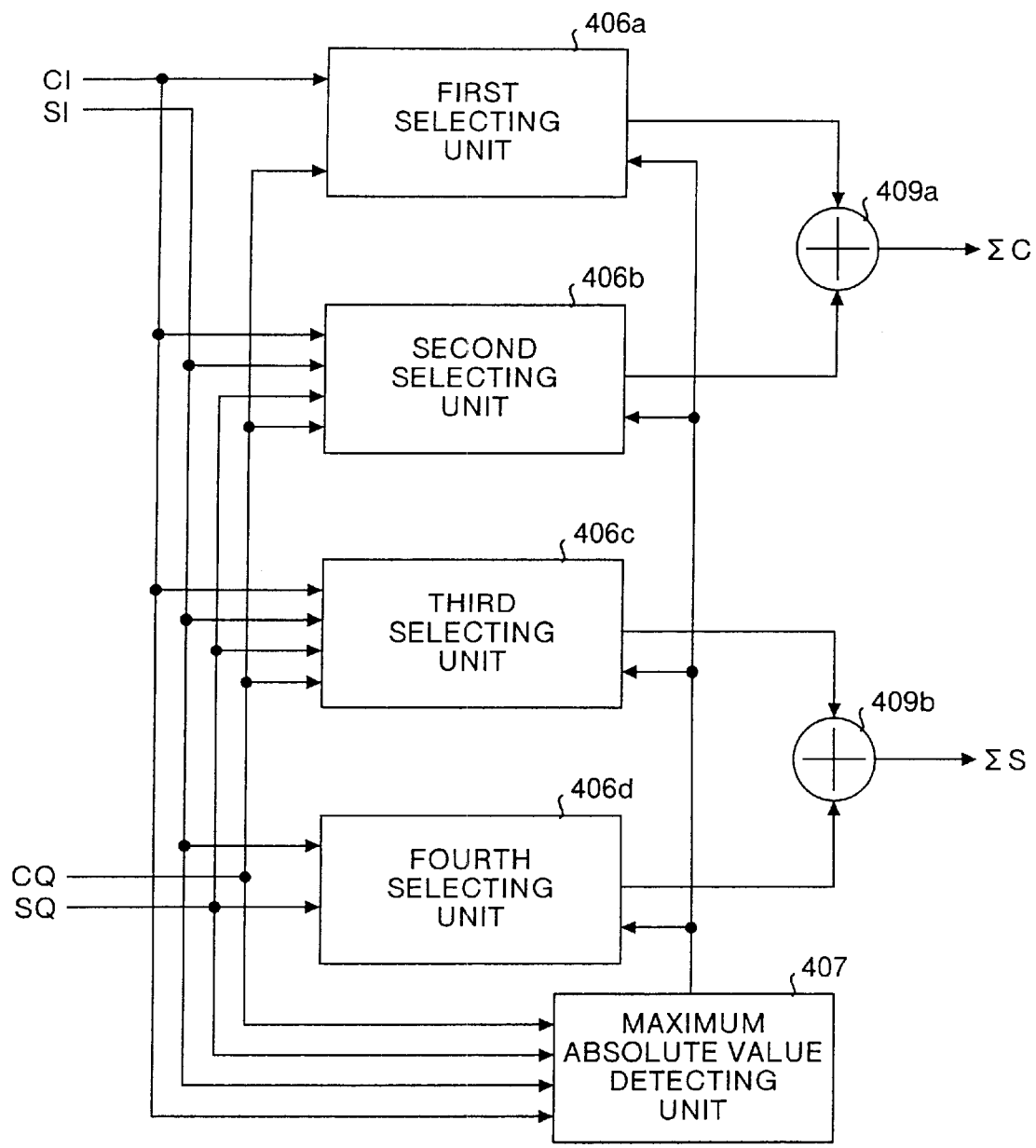
FIG. 30 is a structure diagram of vector combination selecting unit.

On the other hand, when the carrier phase θc [deg] is within the range of (0<θc<90) or (180<θc<270) as shown in FIG. 25, the phases of the in-phase and orthogonal components of the preamble symbol are in-phase as shown in FIG.

26. Therefore, the signed squared in-phase component $DI_i$ and the signed squared orthogonal component $DQ_i$ obtained by multiplying the sign (±1) to these squared values respectively also become in the in-phase phase relationship. Therefore, the amplitude of the squared addition signal $A_i$ becomes large as shown in FIG. 11(*a*). On the other hand, the amplitude of the squared subtraction signal $S_i$ becomes small as shown in FIG. 11(*b*) based on the opposite-phase relationship between the signed squared in-phase component $DI_i$ and the inverted signed squared orthogonal component $DQ_i$.

Similarly, when the carrier phase θc [deg] is within the range of (0<θc<90) or (180<θc<270) as shown in FIG. 25, the absolute value of the amplitude of the squared addition signal $A_i$ becomes $\||I_i|^2+|Q_i|^2\|$, which is constant (the squared value of the envelope E: $E^2$) regardless of the carrier phase θc. (The absolute value of the squared subtraction signal $S_i$ becomes $\||I_i|^2-|Q_i|^2\|$, and this changes depending on the carrier phase θc.)

Instead of adding the signed squared in-phase component $DI_i$ output from the in-phase multiplier 421*a* and the signed squared orthogonal component $DQ_i$ output from the orthogonal multiplier 421*b*, and outputting a result straight, the adder 427 may convert the result of the addition into an absolute value, then multiply the sign {±1} of the result of the addition to the square root of the result of the addition converted into the absolute value, and then output this multiplied value as the squared addition signal $A_i$. Similarly, instead of subtracting the signed squared in-phase component $DI_i$ output from the in-phase multiplier 421*a* from the signed squared orthogonal component $DQ_i$ output from the orthogonal multiplier 421*b* or vice versa, and outputting a result straight, the subtracter 428 may convert the result of the subtraction into an absolute value, then multiply the sign {±1} of the result of the subtraction to the square root of the result of the subtraction converted into the absolute value, and then output this multiplied value as the squared subtraction signal $S_i$. When such addition or subtraction is performed, it is necessary to carry out the calculation of obtaining the squared root, and the circuit becomes complex. However, there is an advantage that the preamble detecting/timing phase difference calculating unit 423 at the latter stage can calculate the timing phase difference in higher precision.

The squared-addition signal component correlation calculating unit 429*a* calculates correlation between the squared addition signal and the ½ symbol frequency component exp[-jπ(fs)t]. Specifically, the squared-addition signal component correlation calculating unit 429*a* performs the calculation shown in the equations (24a) and (24b) using the data string $A_i$ (i=1, 2, 3, . . . ):

$$Ac_i = A_i \times \cos \pi i/2 \quad (24\text{a})$$

$$As_i = A_i \times \sin \pi i/2 \quad (24\text{b})$$

Subsequently, the squared-addition signal component correlation calculating unit 429*a* calculates an averages of the data strings ($Ac_i$, $As_i$) obtained through the calculation in the equations (24a) and (24b), and outputs addition correlation signals ($CA_i$, $SA_i$). In the equations (24a) and (24b), cos πi/2=1, 0, -1, 0, . . . , and sin πi/2=0, 1, 0, -1, . . . . Therefore, it is possible to obtain the addition correlation signals ($CA_i$, $SA_i$) easily. For example, when averaging with four symbols, the addition correlation signals ($CA_i$, $SA_i$) can be obtained through the equations (24c) and (24d) as follows:

$$CA_i = (A_i - A_{i+2} + A_{i+4} - A_{i+6} + A_{i+8} - A_{i+10} + A_{i+12} - A_{i+14})/8 \quad (24\text{c})$$

$$SA_i = (A_{i+1} - A_{i+3} + A_{i+5} - A_{i+7} + A_{i+9} - A_{i+11} + A_{i+13} - A_{i+15})/8 \quad (24\text{d})$$

Similarly, the squared-subtraction signal component correlation calculating unit 429*b* calculates correlation between the squared subtraction signal and the ½ symbol frequency component exp[-jπ(fs)t]. Specifically, the squared-subtraction signal component correlation calculating unit 429*b* performs the calculation shown in the equations (25a) and (25b) using the data string $S_i$ (i=1, 2, 3, . . . ):

$$Sc_i = S_i \times \cos \pi i/2 \quad (25\text{a})$$

$$Ss_i = S_i \times \sin \pi i/2 \quad (25\text{b})$$

Subsequently, the squared-subtraction signal component correlation calculating unit 429*b* calculates an averages of the data strings ($Sc_i$, $Ss_i$) obtained through the calculation in the equations (25a) and (25b), and outputs subtraction correlation signals ($CS_i$, $SS_i$). In the equations (25a) and the equation (25b), cos πi/2=1, 0, -1, 0, . . . , and sin πi/2=0, 1, 0, -1, . . . . Therefore, it is possible to obtain the subtraction correlation signals ($CS_i$, $SS_i$) easily. For example, when averaging with four symbols, the subtraction correlation signals ($CS_i$, $SS_i$) can be obtained from the equation (25c) and the equation (25d) as follows:

$$CS_i = (S_i - S_{i+2} + S_{i+4} - S_{i+6} + S_{i+8} - S_{i+10} + S_{i+12} - S_{i+14})/8 \quad (25\text{c})$$

$$SS_i = (S_{i+1} - S_{i+3} + S_{i+5} - S_{i+7} + S_{i+9} - S_{i+11} + S_{i+13} - S_{i+15})8 \quad (25\text{d})$$

Figure 12:
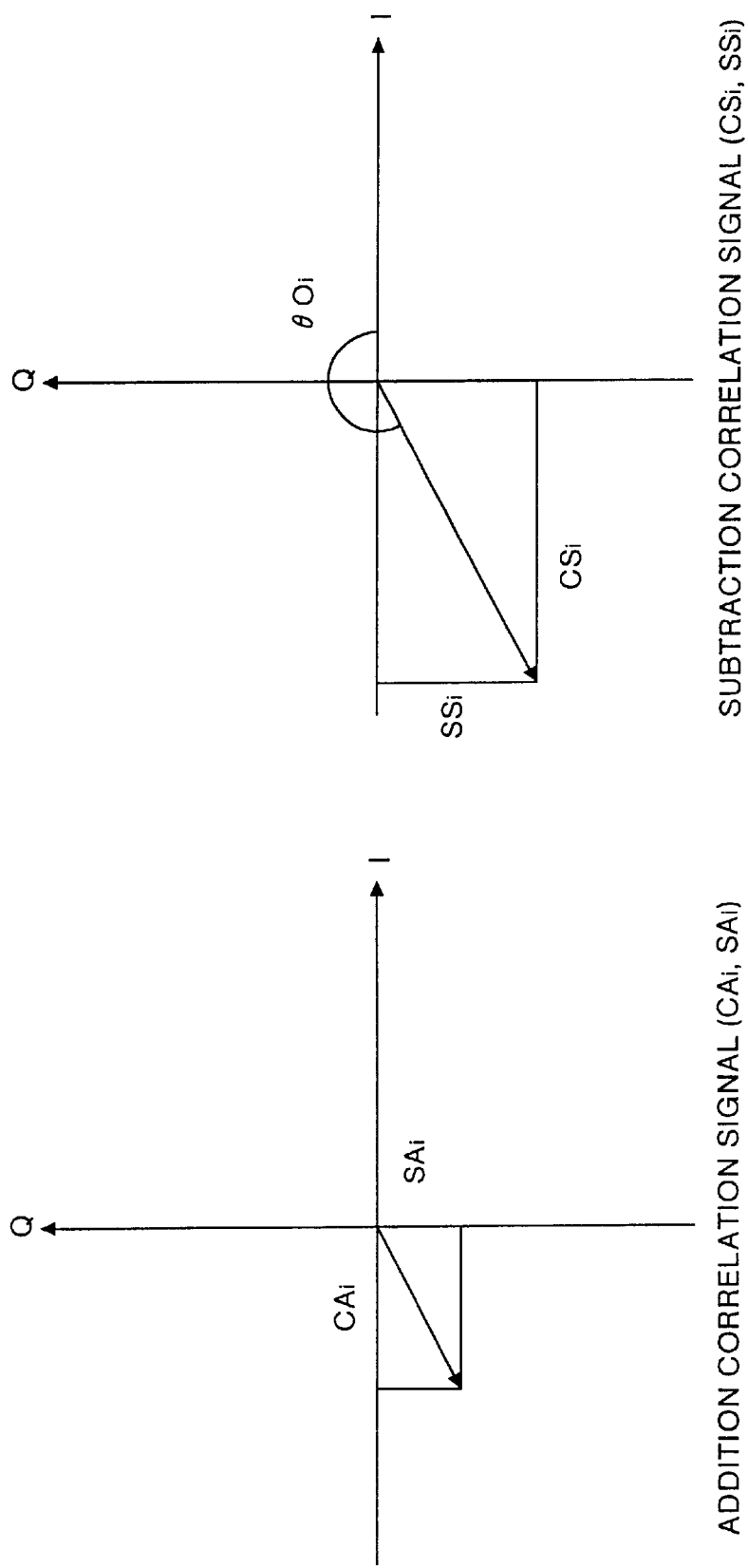
FIG. 12 is a diagram showing addition correlation signals ($CA_i$, $SA_i$) and subtraction correlation signals ($CS_i$, $SS_i$)

During the reception of the preamble symbol, when the carrier phase θc [deg] is within the range of (90<θc<180) or (270<θc<360) as shown in FIG. 22, for example, the amplitude of the squared subtraction signal $S_i$ is larger than the amplitude of the squared addition signal $A_i$. The absolute value of this takes a constant value $E^2=\||I_i|^2+|Q_i|^2\|$ regardless of the carrier phase θc. Therefore, the vector length of the subtraction correlation signals ($CS_i$, $SS_i$) becomes larger than the vector length of the addition correlation signals ($CA_i$, $SA_i$), and this also takes a constant value. For example, the correlation signals ($CA_i$, $SA_i$) and ($CS_i$, $SS_i$) obtained by sampling the preamble symbols shown in FIG. 22 at the timings shown in FIG. 10 become as shown in FIG. 12, and the vector length of the subtraction correlation signals becomes larger.

Figure 13:
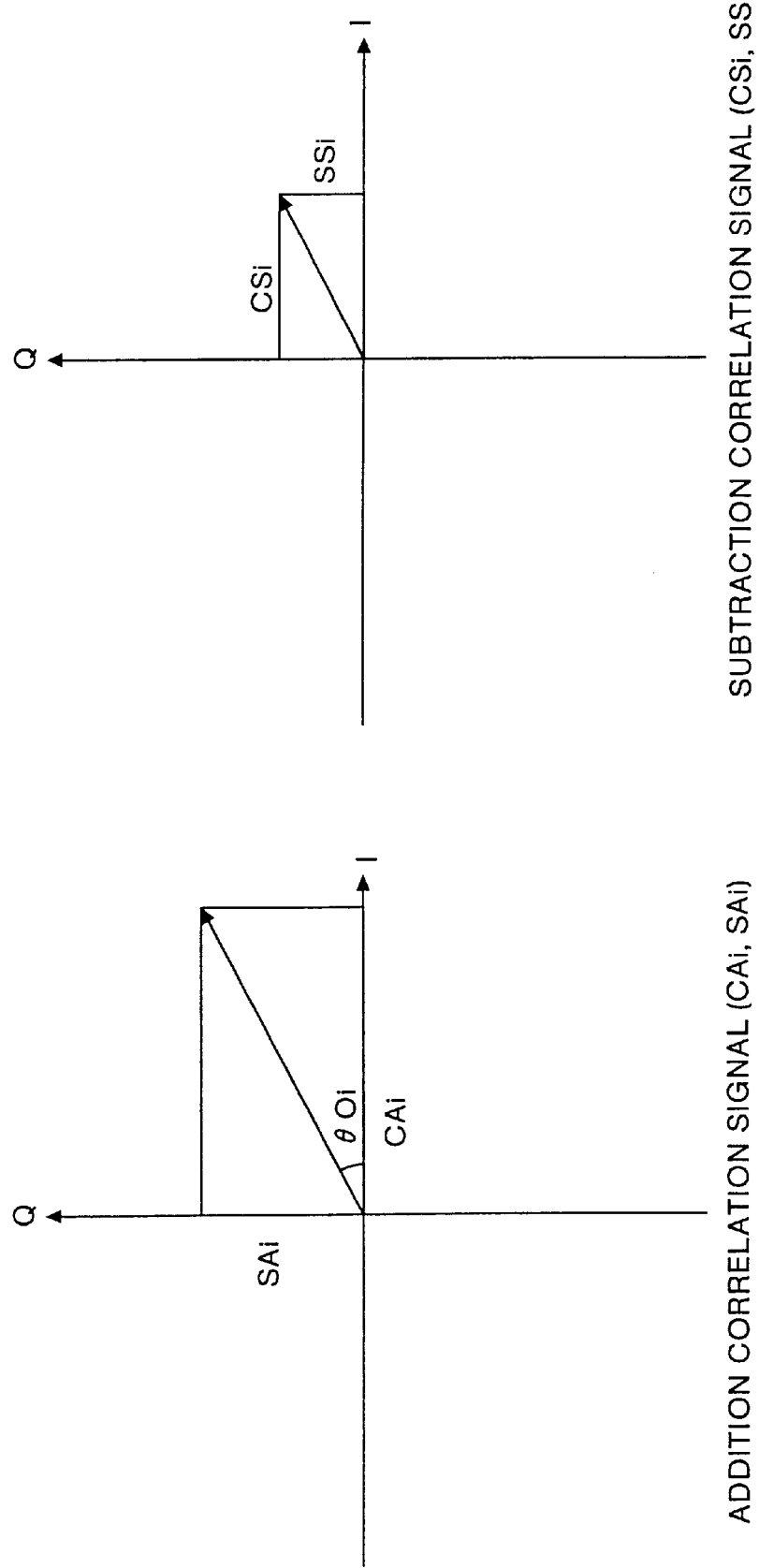
FIG. 13 is a diagram showing addition correlation signals ($CA_i$, $SA_i$) and subtraction correlation signals ($CS_i$, $SS_i$)

Further, during the reception of the preamble symbol, when the carrier phase θc [deg] is within the range of (0<θc<90) or (180<θc<270) as shown in FIG. 25, for example, the amplitude of the squared addition signal $A_i$ is larger than the amplitude of the squared subtraction signal $S_i$. The absolute value of this takes a constant value $E^2=\||I_i|^2+|Q_i|^2\|$ regardless of the carrier phase θc. Therefore, the vector length of the addition correlation signals ($CA_i$, $SA_i$) becomes larger than the vector length of the subtraction correlation signals ($CS_i$, $SS_i$), and this also takes a constant value. For example, the correlation signals ($CA_i$, $SA_i$) and ($CS_i$, $SS_i$) obtained by sampling the preamble symbols shown in FIG. 25 at the timings shown in FIG. 11 become as shown in FIG. 13, and the vector length of the addition correlation signals becomes larger.

On the other hand, during a reception when there is no signal (receiving only noise in the absence of a signal) or during the reception of a significant data section that follows the preamble, the vector shows a smaller length, as the ½ symbol frequency component does not exist for a long time in the addition correlation signals ($CA_i$, $SA_i$) and the subtraction correlation signals ($CS_i$, $SS_i$).

The vector selecting unit 430 selects signals having a larger vector length from the addition correlation signals ($CA_i$, $SA_i$) and the subtraction correlation signals ($CS_i$, $SS_i$), and outputs the selected signals as selected correlation signals ($CO_i$, $SO_i$).

Figure 21:
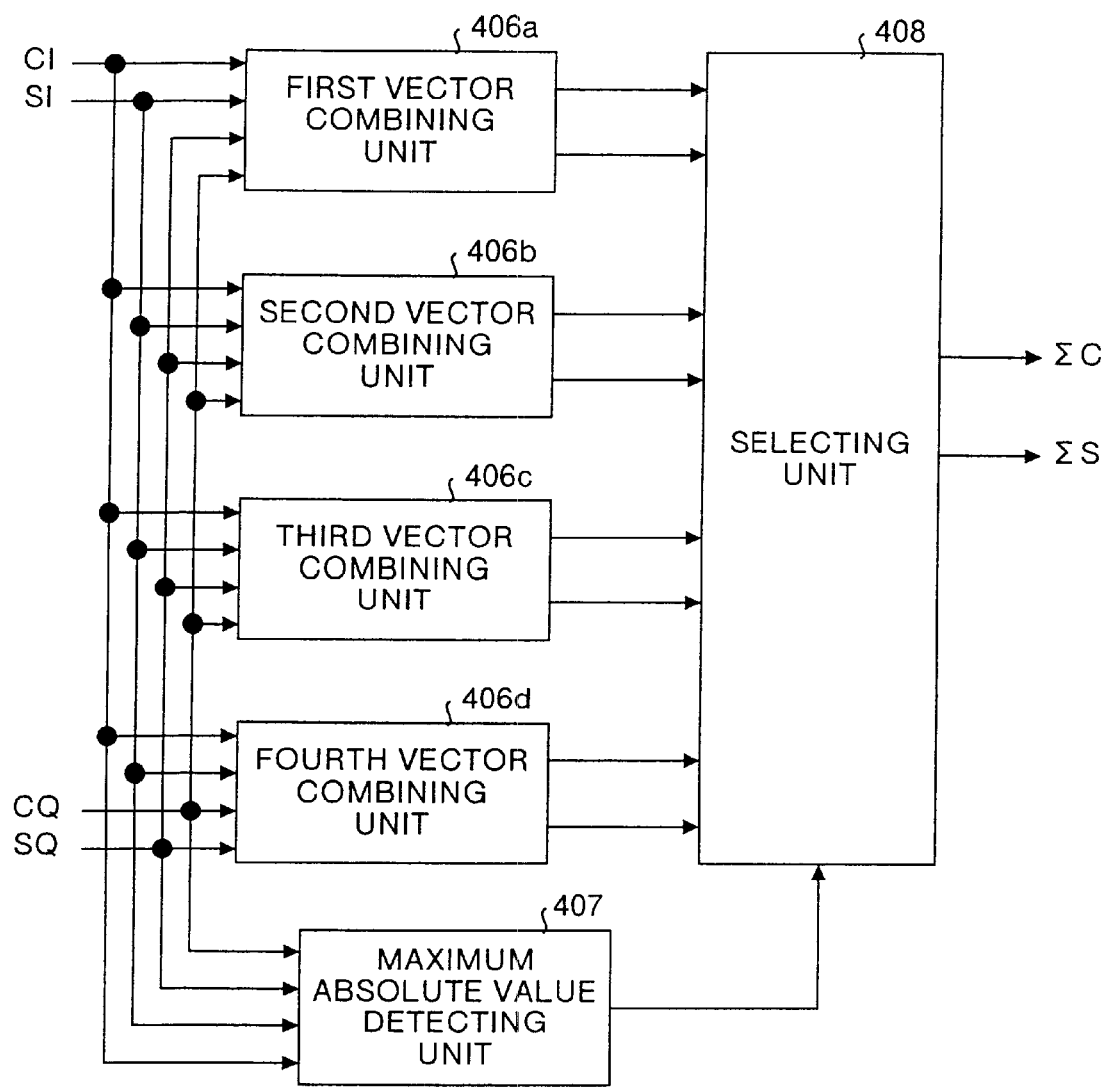
FIG. 21 is a structure diagram of vector combination selecting unit.

The detailed operation of the above will be explained based on FIG. 9. The maximum absolute value detecting unit 431 obtains maximum values of $|CA_i|$, $|SA_i|$, $|CS_i|$, and $|SS_i|$ that are the absolute values of the addition correlation signals ($CA_i$, $SA_i$) and the subtraction correlation signals ($CS_i$, $SS_i$) respectively, like in the case of the conventional vector combination selecting unit 406 shown in FIG. 21.

When the maximum value obtained by the maximum absolute value detecting unit 431 is either $|CA_i|$ or $|SA_i|$, the selecting unit 432 selects the addition correlation signals ($CA_i$, $SA_i$). When the maximum value obtained is either $|CS_i|$ or $|SS_i|$, the selecting unit 432 selects the subtraction correlation signals ($CS_i$, $SS_i$). The selecting unit 432 outputs the selected signals as the selected correlation signals ($CO_i$, $SO_i$).

Specifically, the operation of the vector selecting unit 430 during the reception of the preamble symbol is as follows.

When the carrier phase θc [deg] is within the range of (90<θc<180) or (270<θc<360) as shown in FIG. 22, the vector length of the subtraction correlation signals ($CS_i$, $SS_i$) becomes larger than the vector length of the addition correlation signals ($CA_i$, $SA_i$) as shown in FIG. 12. Therefore, the vector selecting unit 430 selects the subtraction correlation signals ($CS_i$, $SS_i$), and outputs the selected correlation signals ($CO_i$, $SO_i$)=($CS_i$, $SS_i$). On the other hand, when the carrier phase θc [deg] is within the range of (0<θc<0) or (180<θc<270) as shown in FIG. 25, the vector length of the addition correlation signals ($CA_i$, $SA_i$) becomes larger than the vector length of the subtraction correlation signals ($CS_i$, $SS_i$) as shown in FIG. 13. Therefore, the vector selecting unit 430 selects the subtraction correlation signals ($CA_i$, $SA_i$), and outputs the selected correlation signals ($CO_i$, $SO_i$)=($CA_i$, $SA_i$).

Further, when the carrier phase θc [deg] is within the range of (90<θc<180) or (270<θc<360), the vector length shown by the subtraction correlation signals ($CS_i$, $SS_i$) shows a constant value regardless of the carrier phase θc. When the carrier phase θc [deg] is within the range of (0<θc<90) or (180<θc<270), the vector length represented by the addition correlation signals ($CA_i$, $SA_i$) is constant regardless of the carrier phase θc. Therefore, the vector length represented by the selected correlation signals ($CO_i$, $SO_i$) output from the vector selecting unit 430 during the reception of the preamble is always constant and large value regardless of the carrier phase θc.

On the other hand, during the reception when there is no signal (receiving only noise in the absence of a signal) or during the reception of a significant data section that follows the preamble, the vector selecting unit 430 selects at random either the addition correlation signals ($CA_i$, $SA_i$) that take a small vector length or the subtraction correlation signals ($CS_i$, $SS_i$) that take a small vector length. Therefore, in this case, the vector length shown by the selected correlation signals ($CO_i$, $SO_i$) takes a small value.

The selected correlation signals ($CO_i$, $SO_i$) are sent to the preamble detecting/timing phase difference calculating unit 423a, and the following two calculations are carried out simultaneously.

The first calculation is of obtaining a vector length $V_i$ of the selected correlation signals ($CO_i$, $SO_i$) from the equation (26):

$$V_i=(|CO_i|^2+SO_i|^2)^{1/2} \quad (26)$$

The other calculation is of obtaining a vector angle of the selected correlation signals ($CO_i$, $SO_i$) from the equation (27):

$$\theta o_i=\tan^{-1}(SO_i/CO_i) \quad (27)$$

In the above equation, θ$o_i$ is a timing phase difference when the normalization has been carried out in the 2 symbol period (2T), like θ$_T$. Therefore, a timing phase difference θ$r_i$ [deg] when the normalization has been carried out in the symbol period (T) is obtained from the equation (23).

During the reception of the preamble symbol, the vector length $V_i$ represented by the subtraction correlation signals ($CS_i$, $SS_i$) is a constant and large value regardless of the carrier phase θc. Further, the timing phase difference θ$r_i$ [deg] also takes a certain value. For example, when the preamble signals shown in FIG. 22 are sampled at the timings of vertical lines shown in FIG. 10, the subtraction correlation signals ($CS_i$, $SS_i$) in FIG. 12 are selected by the vector selecting unit 430. The vector length of these signals becomes $V_i$, and the vector angle becomes θ$o_i$.

On the other hand, when the preamble signals shown in FIG. 25 are sampled at the timings of vertical lines shown in FIG. 11 that are the same timings as those in FIG. 10, the addition correlation signals ($CA_i$, $SA_i$) in FIG. 13 are selected by the vector selecting unit 430. The vector length of these signals becomes $V_i$, and the vector angle becomes θ$o_i$. There is a difference of 180 [deg] between the θ$o_i$ shown in FIG. 12 and the θ$o_i$ shown in FIG. 13. However, based on the processing of the equation (23), θ$r_i$ obtained from the θ$o_i$ in FIG. 12 and θ$r_i$ obtained from the θ$o_i$ in FIG. 13 coincide with each other.

On the other hand, during the reception when there is no signal (receiving only noise in the absence of a signal) or during the reception of a significant data section that follows the preamble, the vector length $V_i$ shows a small value, and the timing phase difference θ$r_i$ [deg] also takes an uncertain value. The relationship between the $V_i$ according to the reception status and the certainty of the θ$r_i$ becomes as shown in FIG. 5.

Therefore, the preamble detecting/timing phase difference calculating unit 423a can obtain the timing error τ based on the following processing, even when the reception timing of the burst signal is unknown and also when the arrival time of the preamble is unknown.

In other words, when a vector length $V_i$ is large as a result of monitoring $V_i$ (for example, when the vector length $V_i$ exceeds a certain threshold value εp), a decision is made as "preamble is being received", and the timing phase difference θ$r_i$ [deg] is latched at the timing shown in FIG. 5. As is clear from FIG. 5, the latched timing phase difference θ$r_i$ [deg] is a timing phase difference θ$r_i$ [deg] when $V_i$ is large. Therefore, this is a certain value. The preamble detecting/ timing phase difference calculating unit 423a obtains the timing errors from the equations (16a) and (16b) using the timing phase difference θs obtained as described above, and gives a phase control signal for canceling the timing error τ to the VCO 401 at the latter stage.

Under this structure, the magnitude (=vector length $V_i$) of the selected correlation signals ($CO_i$, $SO_i$) is constant regardless of the carrier phase θc, like in the first embodiment. Therefore, the preamble detection characteristics for detecting the vector length $V_i$ based on the threshold value εp are not influenced by the carrier phase θc.

When the reception timing of the burst signal is known and also when the arrival time of the preamble can be specified, the preamble detection operation is not necessary. Therefore, in this case, it is possible to use the conventional timing phase difference calculating unit 402 in place of the preamble detecting/timing phase difference calculating unit 423a. In this case, as the function of obtaining the vector length $V_i$ and detecting its magnitude is not necessary, it is possible to reduce the circuit scale.

The VCO 401 receives the phase control signal from the preamble detecting/timing phase difference calculating unit 423a, controls the phases of the regeneration sample clock and the regeneration symbol clock, and sets the timing error τ to "0".

Under this structure, it is not necessary to use the vector combination selecting unit 405 for carrying out a complex processing. Therefore, it is possible to reduce the circuit scale.

Further, like in the first embodiment, the timing regenerating device 400 in the fourth embodiment can carry out the estimation of a timing phase and the detection of a preamble at high precision regardless of a carrier phase, when the preamble symbol is a signal that alternately shifts between two points for each one symbol on a complex plane, like the preamble symbol that alternately shifts between two adjacent Nyquist points for each symbol on the complex plane as shown in FIG. 36, in addition to the preamble symbol that alternately shifts between two Nyquist points for each symbol that become symmetrical with the origin (that shifts ±180 [deg] for each symbol) on the complex plane as shown in FIG. 22.

Figure 14:
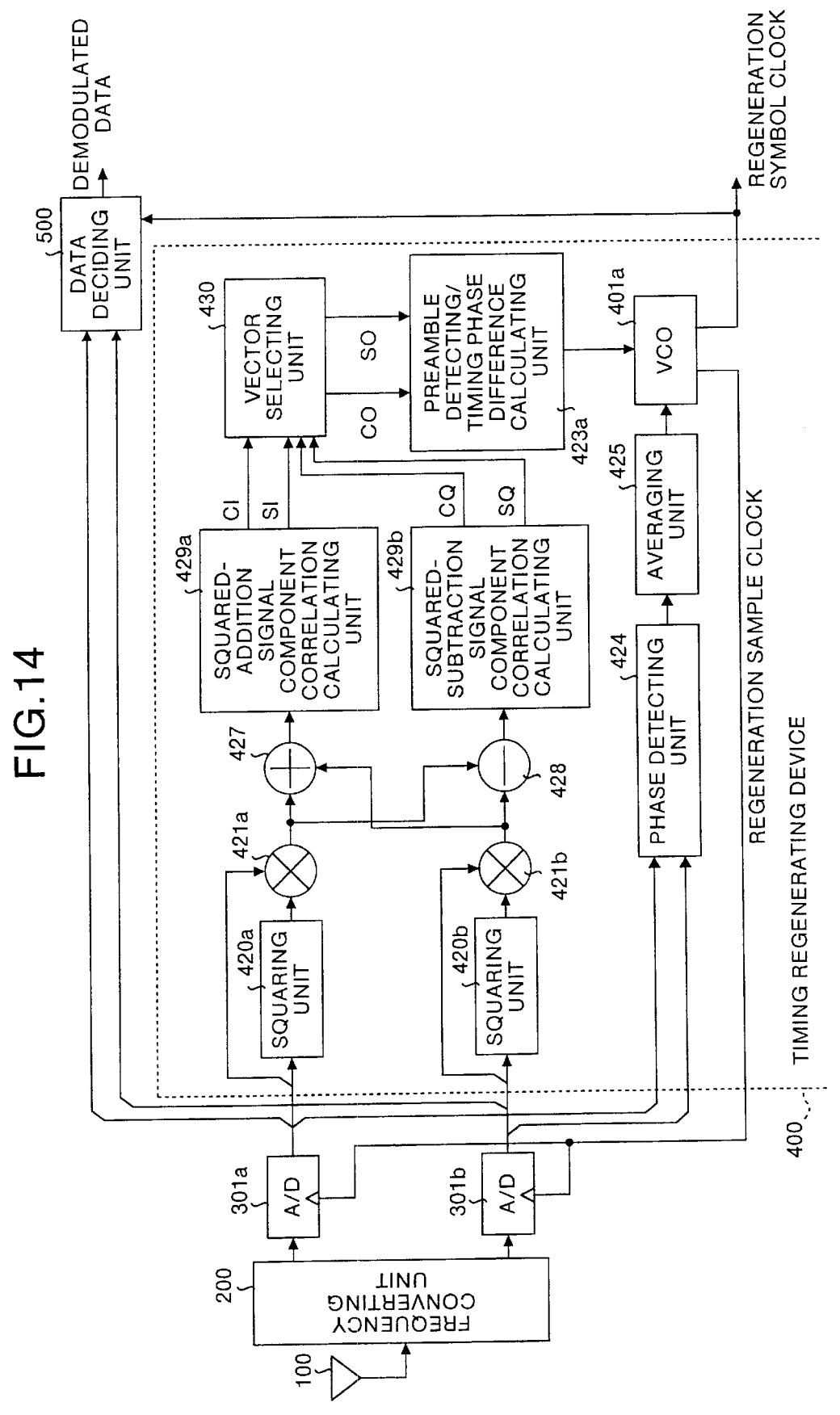

FIG. 14 is a structure diagram of a demodulator according to a fifth embodiment of the present invention. This demodulator has a feedback system circuit called a PLL (Phase Lock Loop) as shown in FIG. 6 built into the demodulator shown in FIG. 8. Sections identical to or corresponding to the portions of the demodulator shown in FIG. 6 and FIG. 8 are attached with the same reference numbers.

The demodulator comprises a PLL timing regenerating unit which includes the phase detecting unit 424, averaging unit 425, and VCO 401a.

The operation of the demodulator according to a fifth embodiment will now be explained. First, the phase detecting unit 424, the averaging unit 425, and the VCO 401a are operated at the time of detecting a preamble or at the time of calculating a timing error τ. The processing performed by the sections from the in-phase component square calculation unit 420a, orthogonal component square calculation unit 420b up to the preamble detecting/timing phase difference calculating unit 423a is similar to that of the demodulator shown in FIG. 8. When a preamble symbol has been detected, a clock phase control for canceling the timing error τ obtained at the same time as this detection is given to the VCO 401a as a phase control signal.

The phase detecting unit 424 detects whether a timing phase is advanced or delayed from received data ($I_i$, $Q_i$). When the timing phase is advanced as a detection signal, "+1" is output, and when the timing phase is delayed, "−1" is output.

The averaging unit 425 receives this advance/delay signal, calculates an average of the signals using a random work filter, for example, and outputs the obtained value as a phase advance/delay signal.

The VCO 401a controls the phases of a regeneration sample clock and a regeneration symbol clock based on this phase advance/delay signal. When this phase advance/delay signal is "positive", the VCO 401a advances the timing phase, and when the phase advance/delay signal is "negative", the VCO 401a delays the timing phase. The VCO 401a is usually controlled based on the phase advance/delay signal. However, when a preamble has been detected and also when a phase control signal has been input, the VCO 401a controls each clock phase by using the phase control signal without using the phase advance/delay signal.

According to this structure, it is possible to realize the tracing of the timing phase during the reception of the significant random data while carrying out the estimating and control of the timing phase at high precision using a short preamble symbol.

Further, like the timing regenerating device shown in FIG. 8, the timing regenerating device 400 shown in FIG. 14 can carry out the estimation of a timing phase and the detection of a preamble at high precision regardless of a carrier phase, when the preamble symbol is a signal that alternately shifts between two points for each one symbol on a complex plane, like the preamble symbol that alternately shifts between two adjacent Nyquist points for each symbol on the complex plane as shown in FIG. 36, in addition to the preamble symbol that alternately shifts between two Nyquist points for each symbol that become symmetrical with the origin (that shifts ±180 [deg] for each symbol) on the complex plane as shown in FIG. 22.

Figure 15:
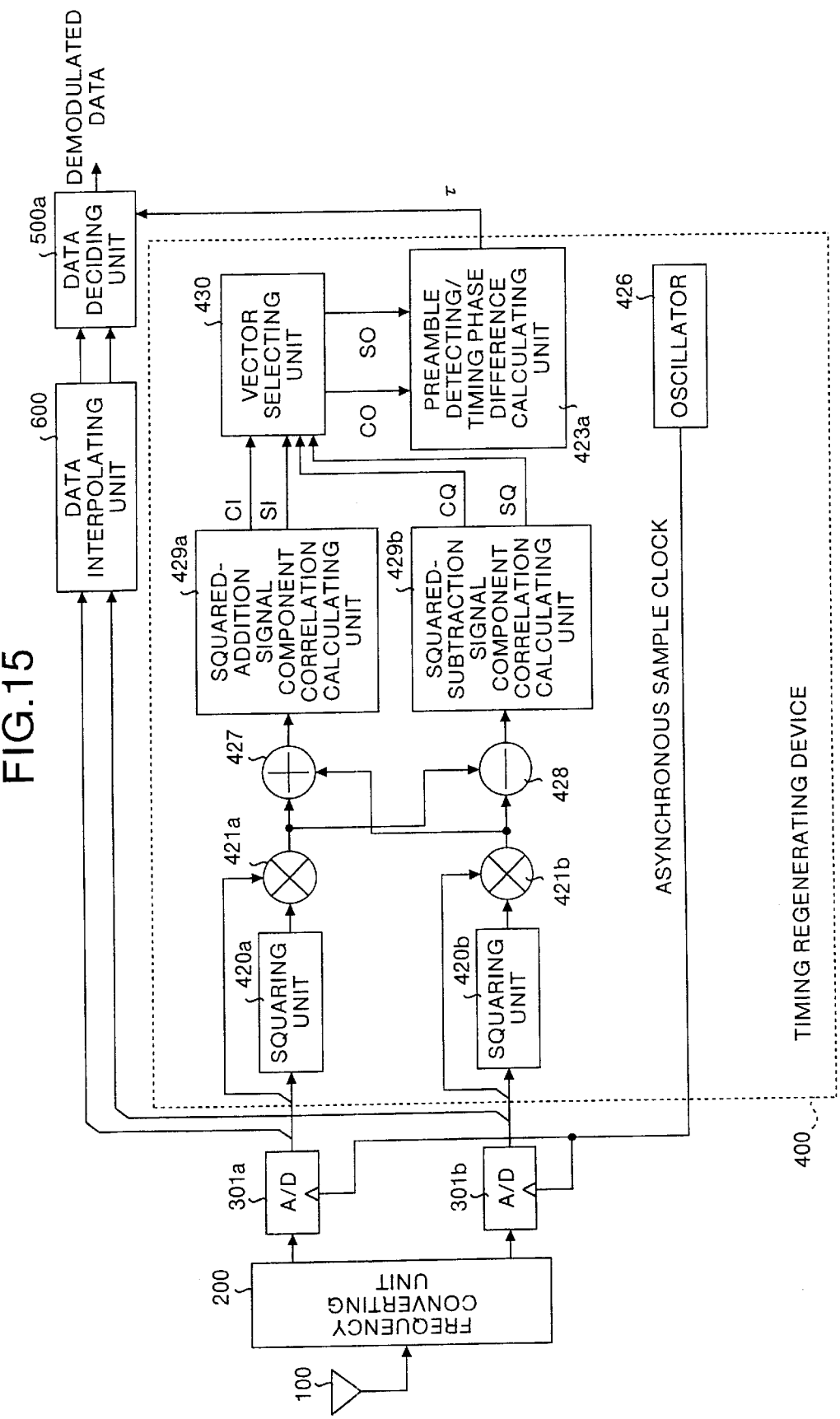
FIG. 15 is a structure diagram of a demodulator according to a sixth embodiment of the present invention.

FIG. 15 is a structure diagram of a demodulator according to a sixth embodiment of the present invention. A feedforward type timing regenerating device as shown in FIG. 7 is used in place of the VCO 401 in the demodulator shown in FIG. 8. Sections identical to or corresponding to the portions of the demodulator shown in FIG. 7 and FIG. 8 are attached with the same reference numbers.

The demodulator also comprises oscillator 426, data interpolating unit 600, and data deciding unit 500a.

Operation of the demodulator according to a sixth embodiment will now be explained. The oscillator 426 outputs an asynchronous sample clock that self-runs at two times the symbol period. The first A/D converter 301a and second A/D converter 301b asynchronously sample the data at 2 [sample/symbol] by this asynchronous sample clock. The in-phase component square calculation unit 420a, orthogonal component square calculation unit 420b, in-phase multiplier 421a, orthogonal multiplier 421b, adder 427, and subtracter 428 carry out a series of signal processing of the asynchronously sampled received data ($I_i$, $Q_i$).

The squared-addition signal component correlation calculating unit 429a calculates correlation between a squared addition signal $A_i$ output from the adder 427 and a ½ frequency component $\exp[-j\pi(fs)t]$ of a symbol frequency output from the oscillator 426. Then, the squared-addition signal component correlation calculating unit 429a averages this and outputs addition correlation signals ($CA_i$, $SA_i$). Similarly, squared-subtraction signal component correlation calculating unit 429b calculates correlation between a squared subtraction signal $S_i$ output from the subtracter 428 and a ½ frequency component $\exp[-j\pi(fs)t]$ of a symbol frequency output from the oscillator 426. Then, the squared-subtraction signal component correlation calculating unit 429b averages this and outputs addition correlation signals ($CS_i$, $SS_i$).

Next, vector selecting unit 430 and preamble detecting/timing phase difference calculating unit 423 process the addition correlation signals ($CA_i$, $SA_i$) and the subtraction correlation signals ($CS_i$, $SS_i$), thereby to obtain a timing error τ.

The data interpolating unit 600 interpolates the received data ($I_i$, $Q_i$) obtained by asynchronous 2 [sample/symbol], generates a received data having a time resolution of ¹⁄₁₆ of the symbol period, for example, and outputs the interpolated received data.

The data deciding unit 500a extracts a Nyquist point of the interpolated received data using the information of the timing error τ output from the preamble detecting/timing phase difference calculating unit 423a, and outputs the data of the extracted Nyquist point as demodulated data.

As explained above, based on the use of the low-cost and compact oscillator 426 in place of the VCO having a large circuit scale, it is possible to make the demodulator compact at low cost.

Further, the timing regenerating device 400 shown in FIG. 15 can carry out the estimation of a timing phase and the detection of a preamble at high precision regardless of a carrier phase, when the preamble symbol is a signal that alternately shifts between two points for each one symbol on a complex plane, like the preamble symbol that alternately shifts between two adjacent Nyquist points for each symbol on the complex plane as shown in FIG. 36, in addition to the preamble symbol that alternately shifts between two Nyquist points for each symbol that become symmetrical with the origin (that shifts ±180 [deg] for each symbol) on the complex plane as shown in FIG. 22.

Figure 16:
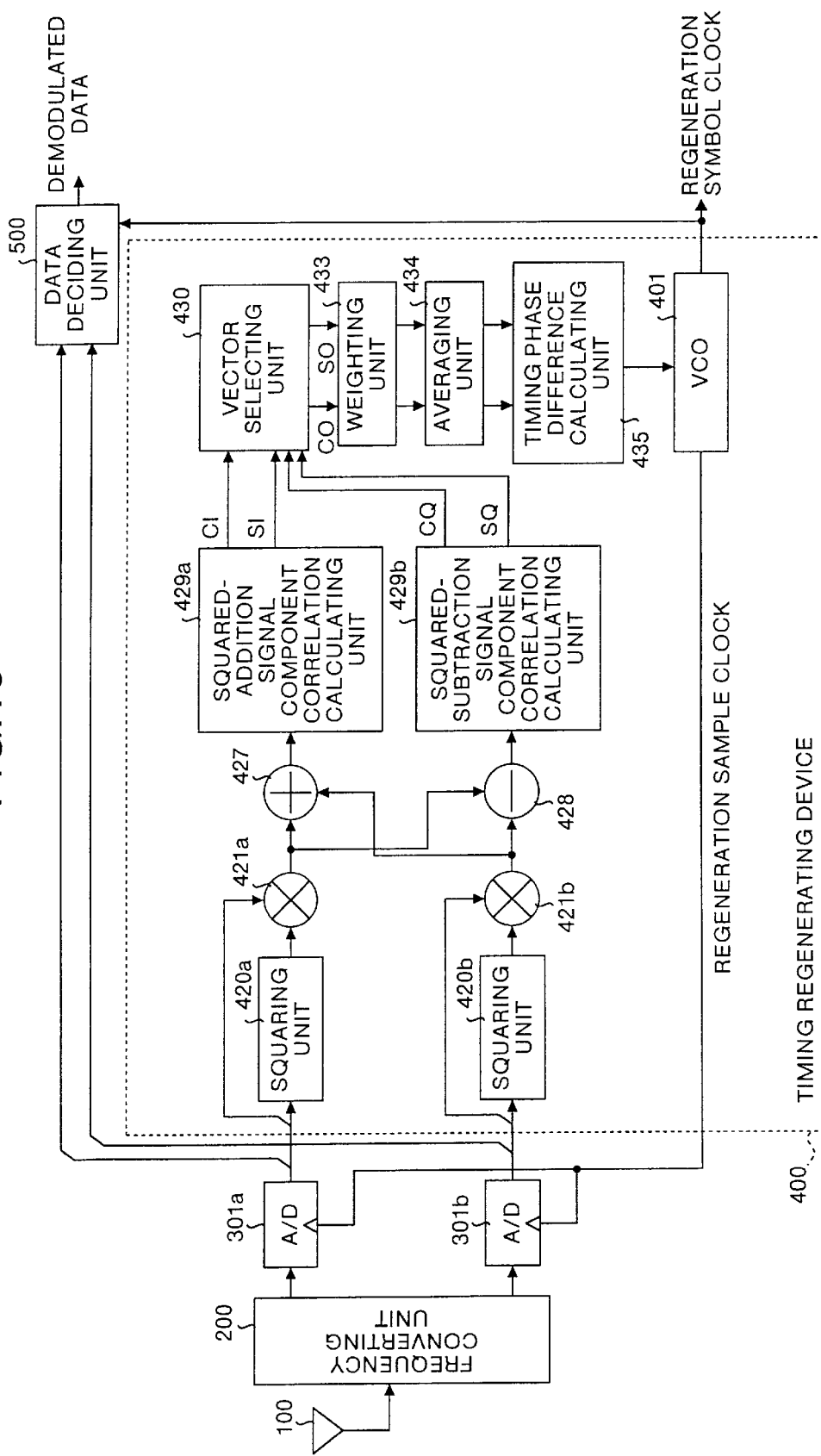
FIG. 16 is a structure diagram of a demodulator according to a seventh embodiment of the present invention.

FIG. 16 is a structure diagram of a demodulator according to a seventh embodiment of the present invention. This demodulator is such that, in the demodulator shown in FIG. 8, timing regeneration is carried out using not only a preamble symbol but also using a random pattern signal that follows the preamble symbol. Sections identical to or corresponding to the portions of the demodulator shown in FIG. 8 are attached with the same reference numbers.

The basic concept of the seventh embodiment is to extract a ½ symbol frequency component that exists in burst in time unit of a few symbols in the random pattern signal that follows the preamble, average the extracted components, and use the result for estimating a timing phase.

It is possible to utilize a ½ symbol frequency component that exists during a short period time of a few symbols in the random pattern signal. Taking the QPSK modulation system, for example, there exists a ½ symbol frequency component in the 8-bit data string of the following 12 patterns. The probability that any one of these occurs is as small as $^{12}/_{256}=4.6\%$. However, when ½ symbol frequency components included in these patterns are detected, and the detected ½ symbol frequency components are averaged over a long period of time, it is possible to realize the estimation of a timing phase at high precision.

Pattern A: 11001100

Pattern B: 00110011

Pattern C: 01100110

Pattern D: 10011001

Pattern E: 11011101

Pattern F: 01110111

Pattern G: 11101110

Pattern H: 10111011

Pattern I: 01000100

Pattern J: 00010001

Pattern K: 10001000

Pattern L: 10001000

Further, according to the timing regenerating device shown in FIG. 16, when the AGC (Automatic Gain Control) is used at the same time for controlling the signal level of the reception signal, it is possible to carry out a timing regeneration without receiving an influence of an over-amplified signal that is input due to the operation of the AGC.

This demodulator comprises the weighting unit 433, averaging unit 434, and phase detecting unit 435.

Operation of the demodulator according to the seventh embodiment will now be explained. The operation performed by the components from the antenna 100 up to adder 427 and subtracter 428 is similar to that of the demodulator shown in FIG. 8.

The squared-addition signal component correlation calculating unit 429a calculates correlation between the squared addition signal and a ½ symbol frequency component $\exp[-j\pi(fs)t]$. Specifically, the squared-addition signal component correlation calculating unit 429a obtains a data string $(Ac_i, As_i)$ from the equations (24a) and (24b), calculates an averages of the data string, and outputs addition correlation signals $(CA_i, SA_i)$. Similarly, squared-subtraction signal component correlation calculating unit 429b calculates correlation between the squared subtraction signal and a ½ symbol frequency component $\exp[-j\pi(fs)t]$. Specifically, the squared-subtraction signal component correlation calculating unit 429b obtains a data string $(Sc_i, Ss_i)$ from the equations (25a) and (25b), calculates an averages of the data sting, and outputs addition correlation signals $(CS_i, SS_i)$.

However, for averaging the data string, a small number of data like four symbols, 8 symbols, or 12 symbols are used. For example, in the case of obtaining a correlation with any one of the 8-bit patterns from the patterns A to L, continuous eight data are used for the averaging.

The vector selecting unit 430 selects signals having a larger vector length from the addition correlation signals $(CA_i, SA_i)$ and the subtraction correlation signals $(CS_i, SS_i)$, and outputs the selected signals as selected correlation signals $(CO_i, SO_i)$.

The weighting unit 433 calculates vector length $VO_i$ of the selected correlation signals $(CO_i, SO_i)$ which are output by the vector selecting unit 430, and obtains a weight according to the magnitude of this $VO_i$. Next, the weighting unit 433 multiplies the weight α to the selected correlation signals $(CO_i, SO_i)$ based on the equations (27a) and (27b), and outputs a result of this weighting as weighted correlation signals $(CW_i, SW_i)$:

$$CW_i = \alpha CO_i \quad (27a)$$

$$SW_i = \alpha SO_i \quad (27b)$$

When the patterns A to D have been received, the vector length $VO_i$ has a very large value, and when the pattern E to the pattern L have been received, the vector length $VO_i$ has a large value. When other pattern has been received, the vector length $VO_i$ shows a small value.

Therefore, as the weighting unit 433 carries out the weighting according to the vector length $VO_i$ (a smaller weighting when $VO_i$ is smaller) based on the equations (27a) and (27b), it is possible to extract only the correlation information when the patterns A to L have been received.

For example, three values are detected for $VO_i$ based on two threshold values, and the weight is set as follows:

when $VO_i$ has a very large value; α=1 when $VO_i$ has a large value; α=½ when $VO_i$ has a small value; α=0

Based on this setting, the selected correlation signals $(CO_i, SO_i)$ having uncertain timing phase information other than the patterns A to L are not output to the averaging unit at the latter stage. Among the patterns A to L, the patterns A to D include many symbol frequency components as compared with the patterns E to L. However, during the reception of these patterns A to D, a large weight is placed. Therefore, it is possible to efficiently carry out the extraction of the ½ symbol frequency components that are effective for estimating the timing phase.

When a limiter amplifier is used for controlling the signal level of the reception signal, the above-described weighting processing may be carried out. However, when the AGC amplifier is used for controlling the signal level of the reception signal, the timing phase error increases as the signal that exceeds the input range of the A/D converter is input at time of leading the AGC. In this case, the following weighting processing is carried out.

First, in the steady status of the AGC, a vector length VE of the weighted correlation signals ($CW_i$, $SW_i$) obtained when the preamble symbol is input is obtained in advance. Then, $VO_i$ is compared with VE. When $VO_i$ is larger than VE, a decision is made that a distorted signal due to the over-amplification has been input in the process of leading the AGC. Then, when the difference ($VO_i$-VE) is larger, a smaller weight is applied ($\alpha$ is set to a small value).

When $VO_i$ is substantially equal to VE, a largest weight is applied ($\alpha$ is set to a maximum value).

Further, when $VO_i$ is smaller than VE, a smaller weight is applied as the difference (VE-$VO_i$) is larger ($\alpha$ is set to a small value).

Based on the weighting, it becomes possible to normally estimate the timing phase when inputting an over-amplified signal that can be generated due to the operation of the AGC, simultaneously with the estimating of the timing phase of the random pattern.

The weighted correlation signals ($CW_i$, $SW_i$) thus obtained are input into the averaging unit 434. The averaging unit 434 calculates an average of the weighted correlation signals ($CT_i$, $ST_i$) that are obtained after multiplying the weighted correlation signals ($CW_i$, $SW_i$) by two times ($\theta A_i = 2\theta W_i$ mod 360 [deg]) based on the equation (28), when the vector angle of the weighted correlation signals ($CW_i$, $SW_i$) is expressed as $\theta W_i$ [deg], and the vector length is expressed as $\theta V_i$:

$$(CT_i, ST_i) = (\theta V_i \cos \theta A_i, \theta V_i \sin \theta A_i) \quad (28)$$

where, $\theta A_i$ [deg]=($2\theta W_i$ mod 360) [deg].

Based on the processing of the equation (28), it is possible to convert the weighted correlation signals ($CW_i$, $SW_i$) that can generate two ways of the vector angles $\theta W_i = \{\theta W_i, \theta W_i + 180\}$ [deg] depending on the data pattern into signals ($CT_i$, $ST_i$) having one vector angle $\theta A_i$. This makes it possible to normally carry out the subsequent averaging processing.

The averaging unit 434 calculates an average of the weighted correlation signals ($CT_i$, $ST_i$) to obtain averaged signals ($\Sigma CT_i$, $\Sigma ST_i$), and outputs the averaged signals ($\Sigma CT_i$, $\Sigma ST_i$).

The averaging of ($CT_i$, $ST_i$) can be realized by an FIR (Finite Impulse Response) filter or an IIR (Infinite Impulse Response) filter, for example. In this case, the characteristics of the timing regenerating device are different depending on the time constant (band) of each filter. When the time constant is made larger (when the band is made narrower), it is possible to realize the high stabilization of the timing phase (low phase jitter). When the time constant is made smaller (when the band is made wider), it is possible to realize the high-speed leading of the timing phase (low phase jitter). Therefore, when the time constant is changed over such that the time constant is small during the reception of the preamble symbol and the time constant is large during the reception of the subsequent random pattern, it is possible to realize both the high-speed leading of the timing phase within the preamble and the low-phase jitter during the reception of the random pattern.

Further, when the frame timing is unknown and also when the timing of changing over the time constant of the filter is unknown, the averaging processing is carried out as follows.

The weighted correlation signals ($CT_i$, $ST_i$) of which vector angles have been converted are averaged in the following procedure, thereby to realize both the high-speed leading and the low-phase jitter.

When a vector length $\Sigma V_i$ shown by ($\Sigma CT_i$, $\Sigma ST_i$) is equal to or lower than a threshold value $\Sigma \epsilon$, the input data is accumulated as shown in the following equations (29a) and (29b):

$$\Sigma CT_i = \Sigma CT_{i-1} + CT_i \quad (29a)$$

$$\Sigma ST_i = \Sigma ST_{i-1} + ST_i \quad (29b)$$

Further, when a vector length $\Sigma V_i$ represented by ($\Sigma CT_i$, $\Sigma ST_i$) is larger than a certain threshold value $\Sigma \epsilon$, these operate as IIR filters as shown in the following equation (30a) and the equation (30b) (where $\beta$ represents an oblivion coefficient ($1 > \beta > 0$)). The time constant of the IIR filter becomes a small value of about a half of the preamble length, for example:

$$\Sigma CT_i = \beta \Sigma CT_{i-1} + CT_i \quad (30a)$$

$$\Sigma ST_i = \beta \Sigma ST_{i-1} + ST_i \quad (30b)$$

When the preamble symbol has been input; the input weighted correlation signals ($CT_i$, $ST_i$) take large values. Therefore, the vector length $\Sigma V_i$ exceeds the threshold value $\Sigma \epsilon$, and the accumulation processing shown in the equations (29a) and (29b) is promptly changed over to the IIR filtering as shown in the equations (30a) and (30b).

When the subsequent random pattern has been received, the input weighted correlation signals ($CT_i$, $ST_i$) have small values. Therefore, the vector length $\Sigma V_i$ become smaller than the threshold value $\Sigma \epsilon$, and the IIR filtering as shown in the equations (30a) and (30b) is promptly changed over to the accumulation processing shown in the equations (29a) and (29b).

When the operation is carried out based on only the integration according to the equations (29a) and (29b), an overflow occurs. On the other hand, when the operation is carried out based on only the IIR filtering according to the equations (30a) and (30b), the vector length $\Sigma V_i$ become smaller during the reception of the random pattern and the timing phase jitter increases. However, when the above-described changeover processing is carried out, at the input time of the preamble symbol, a high-speed timing phase leading is realized according to the equations (30a) and (30b) without generating an overflow based on the IIR filtering. During the reception of the subsequent random pattern, the processing is changed over to the integration processing according to the equations (29a) and (29b). Therefore, it is possible to hold a large vector length $\Sigma V_i$ obtained during the reception of the preamble without lowering this vector length. As a result, it is also possible to realize a lower jitter of the timing phase during the reception of the random pattern.

It is necessary to determine the threshold value $\Sigma \epsilon$ corresponding to $\beta$ that determines the time constant of the IIR filter.

The processing for obtaining the vector length $\Sigma V_i$ is complex as compared with the squaring processing and the square root calculation processing. Therefore, in place of the vector length $\Sigma V_i$, it is possible to use $MV_i = \max(|\Sigma CT_i|, |\Sigma ST_i|)$ that is obtained based on a relatively simple processing, and change over the processing of the equations (29a) and (29b) with the processing of the equations (30a) and (30b) based on a result of the comparison between $MV_i$ and the threshold value $\Sigma \epsilon$.

The timing phase difference calculating unit 435 obtains the vector angle shown by the averaged weighted correlation signals ($\Sigma CT_i$, $\Sigma ST_i$) as the timing phase difference $\theta s$ [deg] from the following equation (31):

$$\theta_{2s} = \tan^{-1}(\Sigma CT_i / \Sigma ST_i) \tag{31}$$

Then, the timing phase difference calculating unit 435 substitutes the timing phase difference $\theta s$ [deg] into the equations (16a) and (16b), thereby to obtain the timing error $\tau$.

This timing phase difference calculating unit 435 is different from the conventional timing phase difference calculating unit 402 shown in FIG. 20 in that the timing phase difference calculating unit 435 carries out the processing of the equation (15). The averaging unit 434 carries out the processing of the equation (28) at a front stage as the processing corresponding to the equation (15).

Next, the timing phase difference calculating unit 435 supplies the obtained timing error $\tau$ to the VCO 401 provided at the latter stage in the symbol period of X (where X is a range of a few symbols to ten odd symbols), and also carries out the control of the equations (32a) and to the averaging unit 434:

$$\Sigma CT_i = \Sigma V_i \tag{32a}$$

$$\Sigma ST_i = 0 \tag{32b}$$

Based on this control, it is possible to realize not a one-time phase control but a continuous phase control.

The VCO 401 receives the phase control signal from the timing phase difference calculating unit 435, controls the phases of the regeneration sample clock and the regeneration symbol clock, and sets the timing error $\tau$ to "0".

Based on the above arrangement, it is possible to realize the tracing of the timing phase during the reception of the significant random data while carrying out the estimating and control of the timing phase at high precision using a short preamble symbol.

Further, when the AGC (Automatic Gain Control) is used for controlling the level of the reception signal, it is possible to carry out the timing regeneration at high precision without an increase in the error of estimating the timing phase, when the reception signal over-amplified by the AGC has been input.

Further, like in the first embodiment, the timing regenerating device 400 in the seventh embodiment can carry out the estimation of a timing phase and the detection of a preamble at high precision regardless of a carrier phase, when the preamble symbol is a signal that alternately shifts between two points for each one symbol on a complex plane, like the preamble symbol that alternately shifts between two adjacent Nyquist points for each symbol on the complex plane as shown in FIG. 35, in addition to the preamble symbol that alternately shifts between two Nyquist points for each symbol that become symmetrical with the origin (that shifts ±180 [deg] for each symbol) on the complex plane as shown in FIG. 22.

Figure 17:
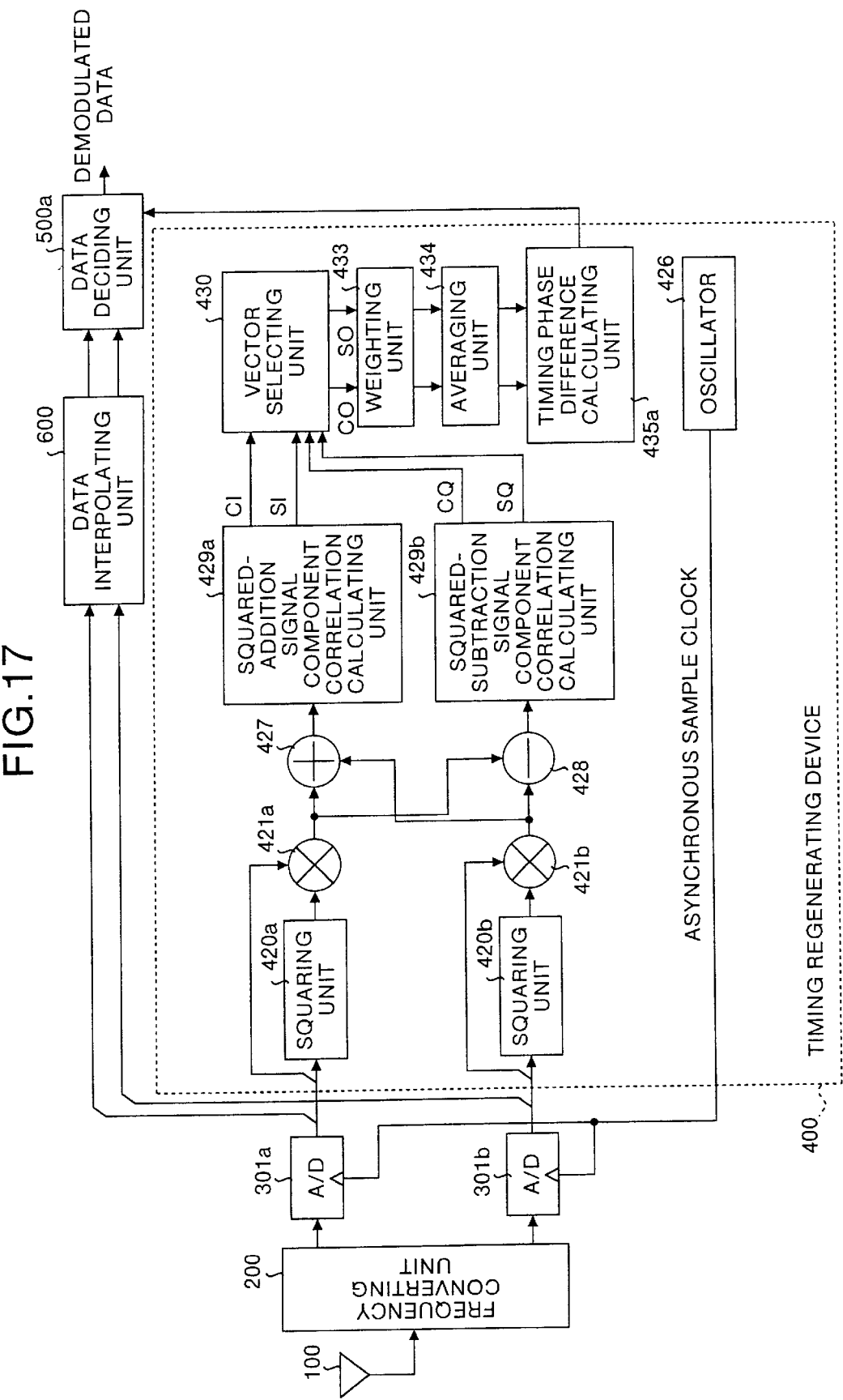
FIG. 17 is a structure diagram of a demodulator according to an eighth embodiment of the present invention.

FIG. 17 is a structure diagram of a demodulator according to an eighth embodiment of the present invention. A feedforward type timing regenerating device as shown in FIG. 7 is used in place of the VCO 401 in the demodulator shown in FIG. 16. Sections identical to or corresponding to the portions of the demodulator shown in FIG. 7 and FIG. 16 are attached with the same reference numbers. This demodulator comprises the oscillator 426, data interpolating unit 600, and data deciding unit 500a.

Operation of demodulator according to the eighth embodiment will now be explained. First, the oscillator 426 outputs an asynchronous sample clock that self-runs at two times the symbol period. The first A/D converter 301a and second A/D converter 301b asynchronously sample the data at 2 [sample/symbol] by this asynchronous sample clock. Subsequently, the in-phase component square calculation unit 420a, orthogonal component square calculation unit 420b, in-phase multiplier 421a, orthogonal multiplier 421b, adder 427, and subtracter 428 carry out a signal processing of the asynchronously sampled received data ($I_i$, $Q_i$).

The squared-addition signal component correlation calculating unit 429a calculates correlation between a squared addition signal $A_i$ output from the adder 427 and a ½ frequency component $\exp[-j\pi(fs)t]$ of a symbol frequency output from the oscillator, and outputs addition correlation signals ($CA_i$, $SA_i$). Similarly, the squared-subtraction signal component correlation calculating unit 421b calculates correlation between a squared subtraction signal $S_i$ output from the subtracter 428b and a ½ frequency component $\exp[-j\pi(fs)t]$ of a symbol frequency output from the oscillator 426, and outputs subtraction correlation signals ($CS_i$, $SS_i$).

The vector selecting unit 430, weighting unit 433, and averaging unit 434 process to obtain averaged weighted correlation signals ($\Sigma CT_i$, $\Sigma ST_i$) The timing phase difference calculating unit 435a obtains the timing phase difference $\theta s$ [deg] from the equation (31) using the averaged weighted correlation signals ($\Sigma CT_i$, $\Sigma ST_i$). The timing phase difference calculating unit 435a also substitutes the timing phase difference $\theta s$ [deg] into the equations (16a) and (16b), thereby to obtain the timing error $\tau$.

This timing phase difference calculating unit 435a is different from the timing phase difference calculating unit 435 shown in FIG. 16 in that the timing phase difference calculating unit 435a does not carry out the calculations of the equations (32a) and (32b) that are processed in the X [symbol] period. The calculation in the equations (32a) and (32b) is necessary only when the integration filters of the FIR type and the IIR type are used continuously in the feedback type timing regeneration system. This processing is not necessary in the feedforward type timing regeneration system.

The data interpolating unit 600 interpolates received data ($I_i$, $Q_i$) obtained by asynchronous 2 [sample/symbol], generates a received data having a time resolution of 1/16 of the symbol period, for example, and outputs the interpolated received data.

The data deciding unit 500a extracts a Nyquist point of the interpolated received data using the information of the timing error $\tau$ output from the timing phase difference calculating unit 435a, and outputs the data of the extracted Nyquist point as demodulated data.

As explained above, based on the use of the low-cost and compact oscillator 426 in place of the VCO having a large circuit scale, it is possible to make the demodulator compact at low cost.

Further, like in the first embodiment, the timing regenerating device 400 in the eighth embodiment can carry out the estimation of a timing phase and the detection of a preamble at high precision regardless of a carrier phase, when the preamble symbol is a signal that alternately shifts between two points for each one symbol on a complex plane, like the preamble symbol that alternately shifts between two adjacent Nyquist points for each symbol on the complex plane as shown in FIG. 35, in addition to the preamble symbol that alternately shifts between two Nyquist points for each symbol that become symmetrical with the origin (that shifts ±180 [deg] for each symbol) on the complex plane as shown in FIG. 22.

Figure 18:
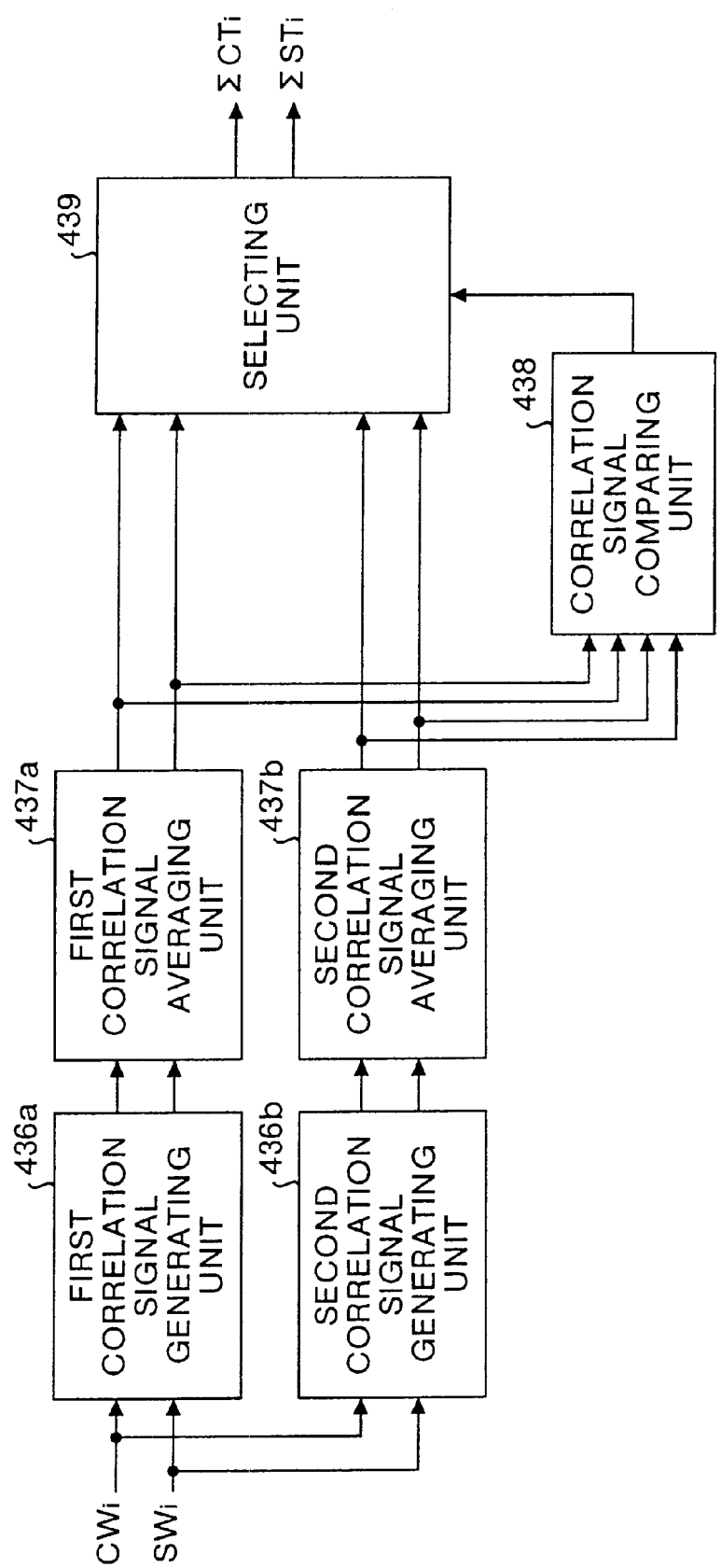
FIG. 18 is a structure diagram of vector selecting unit according to a ninth embodiment of the present invention.

FIG. 18 is a structure diagram of an averaging unit in a demodulator according to a ninth embodiment of the present invention. According to the demodulator in the seventh embodiment shown in FIG. 16 and the demodulator in the eighth embodiment shown in FIG. 17, the doubling processing shown in the equation (28) is carried out by the averaging unit 434. However, in the ninth embodiment, the processing of the averaging unit 434 is changed in order to avoid the complex calculation and the occurrence of an error (multiplication loss) due to the doubling processing. In the demodulator using the averaging unit in FIG. 18, the conventional timing phase difference calculating unit 402 is used in place of the timing phase difference calculating unit 435 or the timing phase difference calculating unit 435a.

The averaging unit comprises the first correlation signal generating unit 436a, second correlation signal generating unit 436b, first correlation signal averaging unit 437a, second correlation signal averaging unit 437b, correlation value comparing unit 438, and selecting unit 439.

Operation of the averaging unit according to the ninth embodiment will now be explained. Weighted correlation signals ($CW_i$, $SW_i$) are input into the first correlation detecting unit 436a and the second correlation detecting unit 436b.

The first correlation detecting unit 436a outputs correlation signals ($CT1_i$, $ST1_i$) based on the equations (33a) and (33b):

$$(CT1_i, ST1_i) = (CW_i, SW_1) \text{ when } (CW_i \geq 0) \quad (33a)$$

$$(CT1_i, ST1_i) = (-CW_i, -SW_1) \text{ when } (CW_i < 0) \quad (33b)$$

The second correlation detecting unit 436b outputs correlation signals ($CT2_i$, $ST2_i$) from the equation (34a) and the equation (34b):

$$(CT2_i, ST2_i) = (CW_i, SW_1) \text{ when } (SW_i \geq 0) \quad (34a)$$

$$(CT2_i, ST2_i) = (-CW_i, -SW_1) \text{ when } (SW_i < 0) \quad (34b)$$

The first correlation signal averaging unit 437a calculates an average of the correlation signals ($CT1_i$, $ST1_i$), and outputs averaged correlation signals ($\Sigma CT1_i$, $\Sigma ST1_i$). Similarly, the second correlation signal averaging unit 437b calculates an average of the correlation signals ($CT2_i$, $ST2_1$), and outputs the averaged correlation signals ($\Sigma CT2_i$, $\Sigma ST2_i$). The averages of the correlation signals ($CT1_i$, $ST1_i$) and the correlation signals ($CT2_i$, $ST2_i$) are obtained using the equations (29a), (29b), (30a), and (30b).

When two ways of vector angles $\theta W_i$ shown by the weighted correlation signals ($CW_i$, $SW_i$) are $\theta W_i = \{0, 180\}$ [deg], for example, correlation values ($CW1_i$, $SW1_i$) do not converge to one point, but correlation values ($CW2_i$, $SW2_i$) converge to one point. Therefore, the vector length $\Sigma V2_i$ of the correlation signals ($\Sigma CT2_i$, $\Sigma ST2_i$) that are obtained by averaging ($CW2_i$, $SW2_i$) becomes larger than the vector length $\Sigma V1_i$ of the correlation signals ($\Sigma CT1_i$, $\Sigma ST1_i$) that are obtained by averaging ($CW1_i$, $SW1_i$).

Further, when $\theta W_i = \{90, -90\}$ [deg], for example, the correlation values ($CW2_i$, $SW2_i$) do not converge to one point, but the correlation values ($CW1_i$, $SW1_i$) converge to one point. Therefore, the vector length $\Sigma V1_i$ of the correlation signals ($\Sigma CT1_i$, $\Sigma ST1_i$) that are obtained by averaging ($CW1_i$, $SW1_i$) becomes larger than the vector length $\Sigma V2_i$ of the correlation signals ($\Sigma CT2_i$, $\Sigma ST2_i$) that are obtained by averaging ($CW2_i$, $SW2_i$).

Further, when $\theta W_i = \{45, -45, 135, -135\}$ [deg], for example, both the correlation values ($CW1_i$, $SW1_i$) and the correlation values ($CW2_i$, $SW2_i$) converge to one point. Therefore, the vector length $\Sigma V1_i$ of the correlation signals ($\Sigma CT1_i$, $\Sigma ST1_i$) that are obtained by averaging ($CW1_i$, $SW1_i$) becomes equal to the vector length $\Sigma V2_i$ of the correlation signals ($\Sigma CT2_i$, $\Sigma ST2_i$) that are obtained by averaging ($CW2_i$, $SW2_i$).

The correlation value comparing unit 438 compares the magnitudes of the vectors $\Sigma V1_i$ with $\Sigma V2_i$ shown by the correlation signals ($\Sigma CT1_i$, $\Sigma ST1_i$) and the correlation signals ($\Sigma CT2_i$, $\Sigma ST2_i$) respectively, and outputs a result of the comparison.

Based on the result of the comparison, the selecting unit 439 outputs the correlation signals of a larger vector as the averaged correlation signals ($\Sigma CT_i$, $\Sigma ST_i$). The equation (35a) and the equation (35b) represent this processing:

$$(\Sigma CT_i, \Sigma ST_i) = (\Sigma CT1_i, \Sigma ST1_i)(\Sigma V1_i \geq \Sigma V2_i) \quad (35a)$$

$$(\Sigma CT_i, \Sigma ST_i) = (\Sigma CT2_i, \Sigma ST2_i)(\Sigma V1_i < \Sigma V2_i) \quad (35b)$$

The timing phase difference calculating unit 403 handles the averaged correlation signals ($\Sigma CT_i$, $\Sigma ST_i$) as the combined correlation values ($\Sigma C$, $\Sigma S$) in a similar manner to that of the conventional method, and obtains a vector angle $\theta_{2s}$ represented by ($\Sigma CT_i$, $\Sigma ST_i$), substitutes this $\theta_{2s}$ into the equation (15), thereby to obtain a timing phase difference $\theta s$ [deg] when the normalization is carried out in the symbol period (T). The relationship between the timing phase difference $\theta s$ and the timing error $\tau$ is as shown in the equations (16a) and (16b).

The timing phase difference calculating unit 403 outputs a phase control signal for canceling the timing error $\tau$ from the timing error $\tau$ obtained by the above calculation.

As explained above, a correlation signal that shows a more certain timing phase is selected based on a simple calculation shown in the equations (33a), (33b), (34a), (34b), (35a), and (35b), regardless of vector angle $\theta W_i$. Further, the doubling processing of the phase is carried out based on the equation (15) after the averaging, not before the averaging like the seventh embodiment and the eighth embodiment. Therefore, it is possible to realize the timing phase detection in higher precision than that in the seventh embodiment and the eighth embodiment. At the same time, it is possible to reduce the processing volume.

Further, like in the seventh embodiment, the timing regenerating device having the averaging unit in the ninth embodiment shown in FIG. 18 can carry out the estimation of a timing phase and the detection of a preamble at high precision regardless of a carrier phase, when the preamble symbol is a signal that alternately shifts between two points for each one symbol on a complex plane, like the preamble symbol that alternately shifts between two adjacent Nyquist points for each symbol on the complex plane as shown in FIG. 35, in addition to the preamble symbol that alternately shifts between two Nyquist points for each symbol that become symmetrical with the origin (that shifts ±180 [deg] for each symbol) on the complex plane as shown in FIG. 22.

Figure 19:
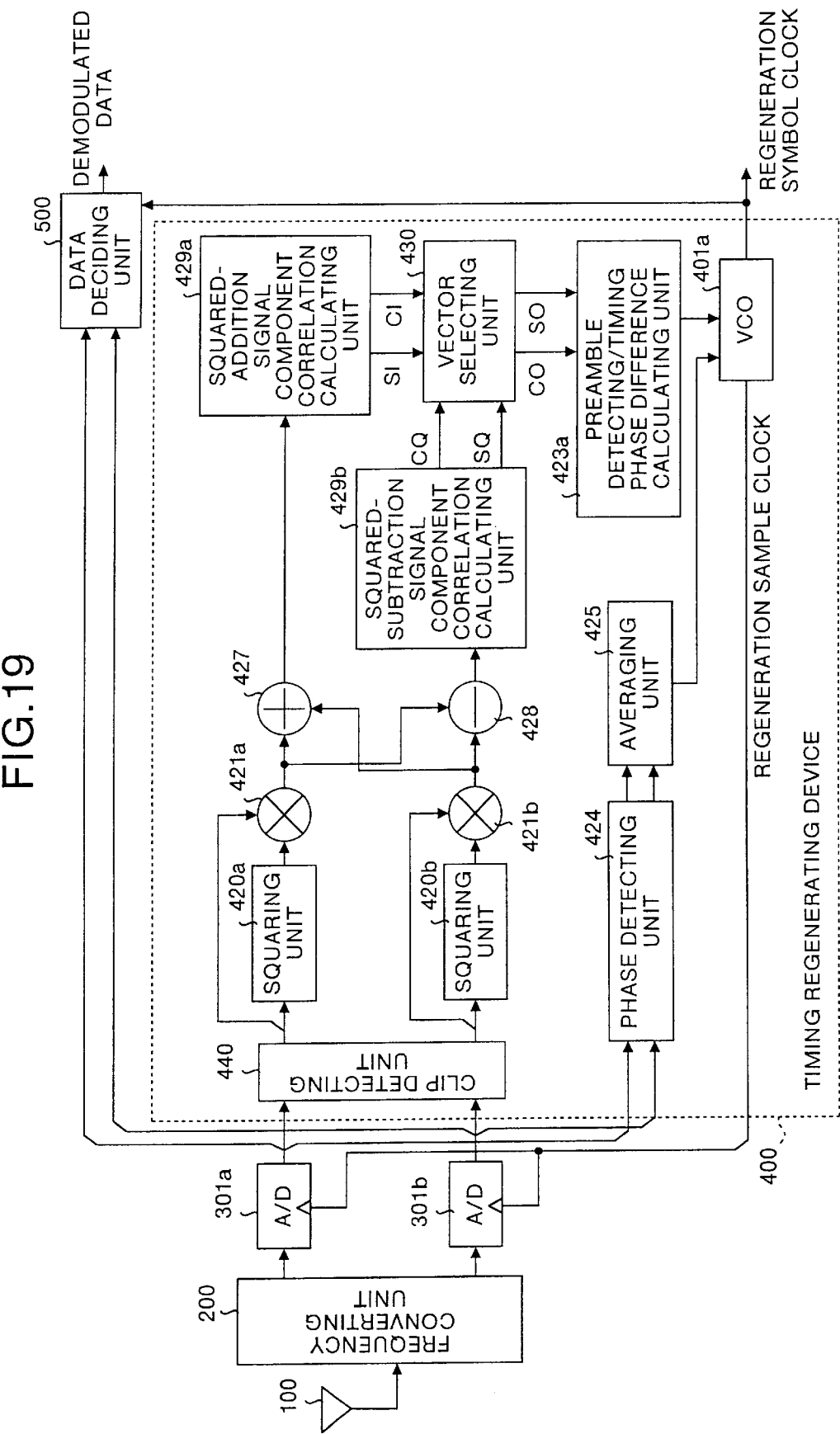
FIG. 19 is a structure diagram of a demodulator according to a tenth embodiment of the present invention.

FIG. 19 is a structure diagram of a demodulator according to a tenth embodiment of the present invention. This demodulator is such that, like the demodulator in the seventh embodiment shown in FIG. 16, during the reception of a random pattern, the timing phase is traced based on the conventional PLL, and at the same time, the influence of the over-amplification due the AGC is avoided. Sections identical to or corresponding to those of the demodulator shown in FIG. 14 and FIG. 16 are attached with the same reference numbers.

This demodulator comprises the phase detecting unit 424, averaging unit 425, preamble detecting/timing phase difference calculating unit 423a, VCO 401a, and clip detecting unit 440.

Operation of the demodulator according to the tenth embodiment will now be explained. The antenna 100 receives a burst signal of an RF band. The frequency converting unit 200, first A/D converter 301a, and second A/D converter 301b carry out the processing as explained above. The first A/D converter 301a outputs a sampled received data string $I_i$ (i=1, 2, 3, ...), and the second A/D converter 301b outputs a sampled received data string $Q_i$ (i=1, 2, 3, ...).

The clip detecting unit 440 receives the data strings $I_i$ (i=1, 2, 3, ...) and $Q_i$ (i=1, 2, 3, ...), and detects an output value. The clip detecting unit 440 decides whether this output value is within a predetermined permissible range. When this output value exceeds the permissible range or is lower than the permissible range, the clip detecting unit 440 decides that an over-amplified signal that exceeds the input range of the A/D converters has been input into the A/D converters due to the operation of the AGC. Then, the clip detecting unit 440 converts the output values of both the first A/D converter 301a and second A/D converter 301b to "0", and outputs the value to in-phase component square calculation unit 420a and orthogonal component square calculation unit 420b provided at the latter stage. When the output value is within the permissible range, the output value is output as it is.

Subsequently, the sections from the in-phase component square calculation unit 420a and orthogonal component square calculation unit 420b up to the preamble detecting/timing phase difference calculating unit 423a perform the processing as explained above, and a phase control signal for canceling a timing error $\tau$ is output.

In the absence of the clip detecting unit 440, a preamble symbol that is originally a sinusoidal wave is distorted into a rectangular wave and is input into a circuit at the latter stage, when an over-amplification that exceeds the input range of each A/D converter has occurred due to the operation of the AGC. This degrades the precision in the estimate of the timing phase. On the other hand, when the clip detecting unit 440 is provided, the over-amplification is detected even when the over-amplification that exceeds the input range of each A/D converter has occurred due to the operation of the AGC. Thus, the received signal at this time is made invalid (converted to "0"). Therefore, the timing regenerating device 400 does not carry out the estimation of a timing phase that uses the preamble symbol distorted into the rectangular shape. The timing regenerating device 400 can start the operation after leading the AGC when the input level has entered within the input range of each A/D converter. As a result, the timing regenerating device 400 can avoid the degradation in the precision of estimating the timing phase at the AGC leading time.

During the reception of the preamble symbol and after completing the leading of the AGC, the vector length $V_i$ of the timing regenerating device 400 has a constant and large value and the timing phase difference θs [deg] becomes a certain value, regardless of the carrier phase θc, like in the fourth embodiment.

On the other hand, during the reception when there is no signal (receiving only noise in the absence of a signal) or during the reception of a significant data section that follows the preamble, or during the process of leading the AGC, the vector length $V_i$ has a smaller value, and the timing phase difference θ$r_i$ [deg] becomes an uncertain value.

Therefore, when the reception timing of the burst signal is not known and also when the arrival time of the preamble symbol is not known, the preamble detecting/timing phase difference calculating unit 423a can obtain the timing error $\tau$.

When a vector length $V_i$ is large as a result of monitoring $V_i$ (for example, when the vector length $V_i$ exceeds a certain threshold value εp), a decision is made as "preamble is being received after completing the leading of the AGC", and the timing phase difference θ$r_i$ [deg] is latched at the timing shown in FIG. 5. As is clear from FIG. 5, the latched timing phase difference θ$r_i$ [deg] is a timing phase difference θ$r_i$ [deg] when $V_i$ is large. Therefore, this is a certain value. The preamble detecting/timing phase difference calculating unit 423a obtains the timing error $\tau$ from the equations (16a) and (16b) using the timing phase difference θs obtained from the above processing, and gives a phase control signal for canceling the timing error $\tau$ to the VCO 401a at the latter stage.

In the mean time, the phase detecting unit 424 detects whether a timing phase is advanced or delayed from received data ($I_i$, $Q_i$). When the timing phase is advanced, "+1" is output, and when the timing phase is delayed, "−1" is output.

The averaging unit 425 calculates an average of the detection signals that show this advance/delay using a random work filter, for example, and outputs the average as a phase advance/delay signal.

The VCO 401a controls the phases of a regeneration sample clock and a regeneration symbol clock based on the phase advance/delay signal. When this phase advance/delay signal is "positive", the VCO 401a advances the timing phase, and when the phase advance/delay signal is "negative", the VCO 401a delays the timing phase. The VCO 401a is usually controlled based on the phase advance/delay signal. However, when a preamble has been detected and also when a phase control signal has been input, the VCO 401a controls each clock phase by using the phase control signal without using the phase advance/delay signal.

As explained above, the clip detecting unit 440 reduces the increase in timing error due to the AGC leading operation, and the PLL type is used at the same time. Based on this arrangement, it is possible to realize the tracing of the timing phase during the reception of the significant random data while carrying out the estimating and control of the timing phase at high precision using a short preamble symbol.

Further, when the AGC (Automatic Gain Control) is used for controlling the level of the reception signal, it is possible to carry out the timing regeneration at high precision without an increase in the error of estimating the timing phase, when the reception signal over-amplified by the AGC has been input.

Use of the clip detecting unit 440 is not limited to the tenth embodiment. For example, it is of course possible to use the clip detecting unit 440 for the timing regenerating device described in the first to eighth embodiments. The received data string $I_i$ (i=1, 2, 3, ...) and the received data string $Q_i$ (i=1, 2, 3, ...) output from this clip detecting unit 440 may be input into the in-phase component square calculation unit 420a and orthogonal component square calculation unit 420b provided at the latter stage respectively.

Further, like in the first embodiment, the timing regenerating device having the averaging unit in the tenth embodiment can carry out the estimation of a timing phase and the detection of a preamble at high precision regardless of a carrier phase, when the preamble symbol is a signal that alternately shifts between two points for each one symbol on a complex plane, like the preamble symbol that alternately shifts between two adjacent Nyquist points for each symbol on the complex plane as shown in FIG. 35, in addition to the preamble symbol that alternately shifts between two Nyquist points for each symbol that become symmetrical with the origin (that shifts ±180 [deg] for each symbol) on the complex plane as shown in FIG. 22.

As explained above, according to the present invention, it is possible to realize the estimation of a timing phase at high precision without receiving an influence of the carrier phase θc. Further, it is possible to normally carry out the timing phase control. Further, it is possible to realize satisfactory BER characteristics at the power supply start-up time or at the line reconnection time after recovery from a shadowing is unknown, it is not possible to know the reception timing of a preamble symbol.

Industrial Applicability

As explained above, the timing regenerating device and the demodulator relating to the present invention can be applied to a broad-band digital radio communication system having a preamble symbol at the header of the burst signal. They are suitable for calculating a timing error at high precision without receiving an influence of the carrier phase θc.

What is claimed is:

1. A timing regenerating device comprising:
   an in-phase component square calculation unit that receives a base band signal having a preamble symbol, calculates square of an in-phase component of the base band signal and outputs the squared in-phase component;
   an in-phase multiplier that multiplies a sign bit (±1) of the in-phase component of the base band signal to the squared in-phase component and outputs the result as signed squared in-phase component;
   an orthogonal component square calculation unit that receives the base band signal, calculates square of an orthogonal component of the base band signal and outputs the squared orthogonal component;
   an orthogonal multiplier that multiplies a sign bit (±1) of the orthogonal component of the base band signal to the squared orthogonal component and outputs the result as a signed squared orthogonal component;
   a squared-preamble in-phase correlation calculating unit that calculates a correlation value between the signed squared in-phase component and a ½ symbol frequency component, and outputs the correlation value as an in-phase correlation signal;
   a squared-preamble orthogonal correlation calculating unit that calculates a correlation value between the signed squared orthogonal component and the ½ symbol frequency component, and outputs the correlation value as an orthogonal correlation signal;
   a vector combination selecting unit that compares the magnitudes of the in-phase and orthogonal correlation signals, matches the direction of a vector obtained from the in-phase or orthogonal correlation signals whichever is smaller to the direction of a vector obtained from the in-phase or orthogonal correlation signals whichever is larger, combines these signals, and outputs a correlation signal after the combination as a combined correlation signal; and
   a timing phase difference calculating unit that outputs a phase control signal based on a vector angle shown by the combined correlation signal.

2. A timing regenerating device according to claim 1, further comprising:
   a VCO that outputs a regeneration symbol clock, a regeneration sample clock, and the ½ symbol frequency component, based on the phase control signal, wherein
   the base band signal to be input into the in-phase component square calculation unit and the orthogonal component square calculation unit is a signal that has been sampled based on the regeneration sample clock,
   said squared-preamble in-phase correlation calculating unit calculates the correlation value using the ½ symbol frequency component output from said VCO, and
   said squared-preamble orthogonal correlation calculating unit calculates the correlation value using the ½ symbol frequency component output from said VCO.

3. A timing regenerating device according to claim 2, further comprising:
   a phase detecting unit that detects advancement/delay of a timing phase using the base band signal sampled based on the regeneration sample clock, and outputs detected signals as phase detection signals; and
   a phase detection signal averaging unit that calculates an average of the phase detection signals, and outputs the average as a phase advance/delay signal, wherein
   said VCO outputs the regeneration symbol clock, the regeneration sample clock, and the ½ symbol frequency component, based on the phase control signal and the phase advance/delay signal.

4. A timing regenerating device according to claim 1, further comprising:
   an oscillator that outputs an asynchronous sample clock and the ½ symbol frequency component, wherein
   the base band signal to be input into said in-phase component square calculation unit and said orthogonal component square calculation unit is a signal that has been sampled based on the asynchronous sample clock,
   said squared-preamble in-phase correlation calculating unit calculates the correlation value using the ½ symbol frequency component output from said oscillator, and
   said squared-preamble orthogonal correlation calculating unit calculates the correlation value using the ½ symbol frequency component output from said oscillator.

5. A timing regenerating device according to claim 1, wherein said timing phase difference calculating unit calculates a timing phase difference from a square root of the in-phase component and the vector angle of a square root of the orthogonal component of the combined correlation signal.

6. A timing regenerating device according to claim 1, further comprising:
   a clip detecting unit configured to receive digitally sampled in-phase and quadrature components of the base band signal having a preamble symbol, and either converts both the in-phase and orthogonal components of the base band signal into "0" when at least one value of the in-phase and orthogonal components of the base band signal is outside a predetermined range or outputs the received, digitally sampled in-phase and quadrature components of the base band signal without alteration when all values of the in-phase and orthogonal components of the base band signal are within the predetermined range, wherein
   the base band signal to be input into said in-phase component square calculation unit and into said orthogonal component square calculation unit is the base band signal output of said clip detecting unit.

7. A timing regenerating device comprising:
- an in-phase component square calculation unit that receives a base band signal having a preamble symbol, calculates square of an in-phase component of the base band signal and outputs the squared in-phase component;
- an in-phase multiplier that multiplies a sign bit (±1) of the in-phase component of the base band signal to the squared in-phase component and outputs the result as signed squared in-phase component;
- an orthogonal component square calculation unit that receives the base band signal, calculates square of an orthogonal component of the base band signal and outputs the squared orthogonal component;
- an orthogonal multiplier that multiplies a sign bit (±1) of the orthogonal component of the base band signal to the squared orthogonal component and outputs the result as a signed squared orthogonal component;
- a squared-preamble in-phase correlation calculating unit that calculates a correlation value between the signed squared in-phase component and a ½ symbol frequency component, and outputs the correlation value as an in-phase correlation signal;
- a squared-preamble orthogonal correlation calculating unit that calculates a correlation value between the signed squared orthogonal component and the ½ symbol frequency component, and outputs the correlation value as an orthogonal correlation signal;
- a vector combination selecting unit that compares the magnitudes of the in-phase and orthogonal correlation signals, matches the direction of a vector obtained from the in-phase or orthogonal correlation signals whichever is smaller to the direction of a vector obtained from the in-phase or orthogonal correlation signals whichever is larger, combines these signals, and outputs a correlation signal after the combination as a combined correlation signal; and
- a preamble detecting/timing phase difference calculating unit that calculates a vector angle and a vector length of the combined correlation signal, decides that the preamble symbol has been detected when the vector length is larger than a predetermined threshold value, calculates a timing phase difference using a vector angle shown by the combined correlation signal at that time, and outputs a phase control signal.

8. A timing regenerating device according to claim 7, further comprising:
- a VCO that outputs a regeneration symbol clock, a regeneration sample clock, and the ½ symbol frequency component, based on the phase control signal, wherein
    the base band signal to be input into the in-phase component square calculation unit and the orthogonal component square calculation unit is a signal that has been sampled based on the regeneration sample clock,
    said squared-preamble in-phase correlation calculating unit calculates the correlation value using the ½ symbol frequency component output from said VCO, and
    said squared-preamble orthogonal correlation calculating unit calculates correlation value using the ½ symbol frequency component output from said VCO.

9. A timing regenerating device according to claim 8, further comprising:
- a phase detecting unit that detects advancement/delay of a timing phase using the base band signal sampled based on the regeneration sample clock, and outputs detected signals as phase detection signals; and
- a phase detection signal averaging unit that calculates an average of the phase detection signals, and outputs the average as a phase advance/delay signal, wherein
    said VCO outputs the regeneration symbol clock, the regeneration sample clock, and the ½ symbol frequency component, based on the phase control signal and the phase advance/delay signal.

10. A timing regenerating device according to claim 7, further comprising:
- an oscillator that outputs an asynchronous sample clock and the ½ symbol frequency component, wherein
    the base band signal to be input into said in-phase component square calculation unit and said orthogonal component square calculation unit is a signal that has been sampled based on the asynchronous sample clock,
    said squared-preamble in-phase correlation calculating unit calculates the correlation value using the ½ symbol frequency component output from said oscillator, and
    said squared-preamble orthogonal correlation calculating unit calculates the correlation value using the ½ symbol frequency component output from said oscillator.

11. A timing regenerating device according to claim 7, wherein said preamble detecting/timing phase difference calculating unit calculates a timing phase difference from a vector angle shown by a value obtained by multiplying a sign {±1} of the in-phase component to a square root of an absolute value of an in-phase component of a combined correlation signal and a value obtained by multiplying a sign {±1} of the orthogonal component to a square root of an absolute value of an orthogonal component of the combined correlation signal.

12. A timing regenerating device according to claim 7, further comprising:
- a clip detecting unit configured to receive digitally sampled in-phase and quadrature components of the base band signal having a preamble symbol, and either converts both the in-phase and orthogonal components of the base band signal into "0" when at least one value of the in-phase and orthogonal components of the base band signal is outside a predetermined range or outputs the received, digitally sampled in-phase and quadrature comnponents of the base band signal without alteration when all values of the in-phase and orthogonal components of the base band signal are within the predetermined range, wherein
    the base band signal to be input into said in-phase component square calculation unit and into said orthogonal component square calculation unit is the base band signal output of said clip detecting unit.

13. A timing regenerating device comprising:
- an in-phase component square calculation unit that receives a base band signal having a preamble symbol, calculates square of an in-phase component of the base band signal and outputs the squared in-phase component;
- an in-phase multiplier that multiplies a sign bit (±1) of the in-phase component of the base band signal to the squared in-phase component and outputs the result as signed squared in-phase component;
- an orthogonal component square calculation unit that receives the base band signal, calculates square of an orthogonal component of the base band signal and outputs the squared orthogonal component;

an orthogonal multiplier that multiplies a sign bit (±1) of the orthogonal component of the base band signal to the squared orthogonal component and outputs the result as a signed squared orthogonal component;

an adder that adds the signed squared in-phase and orthogonal components to generate a squared addition signal, and outputs the squared addition signal;

a subtracter that subtracts the signed squared in-phase component from the signed squared orthogonal component or vice versa to generate a squared subtraction signal, and outputs the squared subtraction signal;

a squared-addition signal component correlation calculating unit that calculates a correlation value between the squared addition signal and a ½ symbol frequency component, and outputs this correlation value as an addition correlation signal;

a squared-subtraction signal component correlation calculating unit that calculates a correlation value between the squared subtraction signal and the ½ symbol frequency component, and outputs this correlation value as a subtraction correlation signal;

a vector selecting unit that compares the magnitudes of the addition and subtraction correlation signals, selects the addition correlation signal or the subtraction correlation signal whichever is larger, and outputs this signal as a selected correlation signal; and a timing phase difference calculating unit that outputs a phase control signal based on a vector angle shown by the selected correlation signal.

14. A timing regenerating device according to claim 13, further comprising:

a VCO that outputs a regeneration symbol clock, a regeneration sample clock, and the ½ symbol frequency component, based on the phase control signal, wherein
the base band signal to be input into the in-phase component square calculation unit and the orthogonal component square calculation unit is a signal that has been sampled based on the regeneration sample clock,
said squared-addition signal component correlation calculating unit calculates the correlation value using the ½ symbol frequency component output from said VCO, and
said squared-subtraction signal component correlation calculating unit calculates the correlation value using the ½ symbol frequency component output from said VCO.

15. A timing regenerating device according to claim 14, further comprising:

a phase detecting unit that detects advancement/delay of a timing phase using the base band signal sampled based on the regeneration sample clock, and outputs detected signals as phase detection signals; and a phase detection signal averaging unit that calculates an average of the phase detection signals, and outputs the average as a phase advance/delay signal, wherein
said VCO outputs the regeneration symbol clock, the regeneration sample clock, and the ½ symbol frequency component, based on the phase control signal and the phase advance/delay signal.

16. A timing regenerating device according to claim 13, further comprising:

an oscillator that outputs an asynchronous sample clock and the ½ symbol frequency component, wherein
the base band signal to be input into said in-phase component square calculation unit and said orthogonal component square calculation unit is a signal that has been sampled based on the asynchronous sample clock,
said squared-addition signal component correlation calculating unit calculates correlation value using the ½ symbol frequency component output from said oscillator, and
said squared-subtraction signal component correlation calculating unit calculates correlation value using the ½ symbol frequency component output from said oscillator.

17. A timing regenerating device according to claim 13, wherein said adder adds the signed squared in-phase and orthogonal components to obtain a result as a squared addition signal, and the subtracter subtracts the signed squared in-phase component from the signed squared orthogonal component or vice versa, and obtains a result as a squared subtraction signal.

18. A timing regenerating device according to claim 13, wherein said adder adds the signed squared in-phase and orthogonal components and, multiplies a sign {±1} of this sum to a square root of an absolute value of the sum, thereby to obtain a squared addition signal, and the subtracter subtracts the signed squared in-phase component from the signed squared orthogonal component or vice versa, and multiplies a sign {±1} of this difference to a square root of an absolute value of the difference, thereby to obtain a squared subtraction signal.

19. A timing regenerating device according to claim 13, further comprising:

a clip detecting unit configured to receive digitally sampled in-phase and quadrature components of the base band signal having the preamble symbol, and either converts both the in-phase and orthogonal components of the base band signal into "0" when at least one value of the in-phase and orthogonal components of the base band signal is outside a predetermined range or outputs the received, digitally sampled in-phase and quadrature components of the base band signal without alteration when all values of the in-phase and orthogonal components of the base band signal are within the predetermined range, wherein
the base band signal to be input into said in-phase component square calculation unit and into said orthogonal component square calculation unit is the base band signal output of said clip detecting unit.

20. A timing regenerating device comprising:

an in-phase component square calculation unit that receives a base band signal having a preamble symbol, calculates square of an in-phase component of the base band signal and outputs the squared in-phase component;

an in-phase multiplier that multiplies a sign bit (±1) of the in-phase component of the base band signal to the squared in-phase component and outputs the result as signed squared in-phase component;

an orthogonal component square calculation unit that receives the base band signal, calculates square of an orthogonal component of the base band signal and outputs the squared orthogonal component;

an orthogonal multiplier that multiplies a sign bit (±1) of the orthogonal component of the base band signal to the squared orthogonal component and outputs the result as a signed squared orthogonal component;

an adder that adds the signed squared in-phase and orthogonal components and generates a squared addition signal, and outputs the squared addition signal;

a subtracter that subtracts the signed squared in-phase component from the signed squared orthogonal component or vice versa and generates a squared subtraction signal, and outputs the squared subtraction signal;

a squared-addition signal component correlation calculating unit that calculates a correlation value between the squared addition signal and a ½ symbol frequency component, and outputs this correlation value as an addition correlation signal;

a squared-subtraction signal component correlation calculating unit that calculates a correlation value between the squared subtraction signal and the ½ symbol frequency component, and outputs this correlation value as a subtraction correlation signal;

a vector selecting unit that compares the magnitude of the addition correlation signal with the magnitude of the subtraction correlation signal, selects the addition correlation signal or the subtraction correlation signal whichever is larger, and outputs this signal as a selected correlation signal; and a preamble detecting/timing phase difference calculating unit that calculates a vector angle and a vector length of the selected correlation signal, decides that the preamble symbol has been detected when the vector length is larger than a predetermined threshold value, calculates a timing phase difference using a vector angle shown by the selected correlation signal at that time, and outputs a phase control signal.

21. A timing regenerating device according to claim 20, further comprising:

a VCO that outputs a regeneration symbol clock, a regeneration sample clock, and the ½ symbol frequency component, based on the phase control signal, wherein the base band signal to be input into said in-phase component square calculation unit and said orthogonal component square calculation unit is a signal that has been sampled based on the regeneration sample clock, said squared-addition signal component correlation calculating unit calculates the correlation value using the ½ symbol frequency component output from said VCO, and said squared-subtraction signal component correlation calculating unit calculates the correlation value using the ½ symbol frequency component output from said VCO.

22. A timing regenerating device according to claim 21, further comprising:

a phase detecting unit that detects advancement/delay of a timing phase using the base band signal sampled based on the regeneration sample clock, and outputs detected signals as phase detection signals; and a phase detection signal averaging unit that calculates an average of the phase detection signals, and outputs the average as a phase advance/delay signal, wherein said VCO outputs the regeneration symbol clock, the regeneration sample clock, and the ½ symbol frequency component, based on both the phase control signal and the phase advance/delay signal.

23. A timing regenerating device according to claim 20, further comprising:

an oscillator that outputs an asynchronous sample clock and the ½ symbol frequency component, wherein the base band signal to be input into said in-phase component square calculation unit and said orthogonal component square calculation unit is a signal that has been sampled based on the asynchronous sample clock, said squared-addition signal component correlation calculating unit calculates the correlation value using the ½ symbol frequency component output from said oscillator, and said squared-subtraction signal component correlation calculating unit calculates the correlation value using the ½ symbol frequency component output from said oscillator.

24. A timing regenerating device according to claim 20, wherein said adder adds the signed squared in-phase and orthogonal components to obtain the squared addition signal, and the subtracter subtracts the signed squared in-phase component from the signed squared orthogonal component or vice versa to obtain the squared subtraction signal.

25. A timing regenerating device according to claim 20, wherein said adder adds the signed squared in-phase and orthogonal components, multiplies a sign $\{\pm 1\}$ of this sum to a square root of an absolute value of the sum, thereby to obtain the squared addition signal, and the subtracter subtracts the signed squared in-phase component from the signed squared orthogonal component or vice versa, multiplies a sign $\{\pm 1\}$ of this difference to a square root of an absolute value of the difference, thereby to obtain the squared subtraction signal.

26. A timing regenerating device according to claim 20, further comprising:

a clip detecting unit configured to receive digitally sampled in-phase and quadrature components of the base band signal having the preamble symbol, and either converts both the in-phase and orthogonal components of the base band signal into "0" when at least one value of the in-phase and orthogonal components of the base band signal is outside a predetermined range or outputs the received, digitally sampled in-phase and quadrature components of the base band signal without alterations when all values of the in-phase and orthogonal components of the base band signal are within the predetermined range, wherein the base band signal to be input into said in-phase component square calculation unit and into said orthogonal component square calculation unit is the base band signal output of said clip detecting unit.

27. A timing regenerating device comprising:

an in-phase component square calculation unit that receives a base band signal having a preamble symbol, calculates square of an in-phase component of the base band signal and outputs the squared in-phase component;

an in-phase multiplier that multiplies a sign bit ($\pm 1$) of the in-phase component of the base band signal to the squared in-phase component and outputs the result as signed squared in-phase component;

an orthogonal component square calculation unit that receives the base band signal, calculates square of an orthogonal component of the base band signal and outputs the squared orthogonal component;

an orthogonal multiplier that multiplies a sign bit ($\pm 1$) of the orthogonal component of the base band signal to the squared orthogonal component and outputs the result as a signed squared orthogonal component;

an adder that adds the signed squared in-phase and orthogonal components to obtain a squared addition signal, and outputs the squared addition signal;

a subtracter that subtracts the signed squared in-phase component from the signed squared orthogonal component or vice versa to obtain a squared subtraction signal, and outputs the squared subtraction signal;

a squared-addition signal component correlation calculating unit that calculates a correlation value between the squared addition signal and a ½ symbol frequency component, and outputs this correlation value as an addition correlation signal;

a squared-subtraction signal component correlation calculating unit that calculates a correlation value between the squared subtraction signal and the ½ symbol frequency component, and outputs this correlation value as a subtraction correlation signal;

a vector selecting unit that compares the magnitudes of the addition and subtraction correlation signals, selects the addition correlation signal or the subtraction correlation signal whichever is larger, and outputs this signal as a selected correlation signal;

a weighting unit that gives a weight corresponding to a vector length shown by the selected correlation signal to the selected correlation signal, and outputs the weighted correlation signal;

an averaging unit that doubles the weighted correlation, calculates an average of the signals, and outputs this average as a weighted average correlation signal; and a timing phase difference calculating unit that outputs a phase control signal based on a vector angle shown by the weighted average correlation signal.

28. A timing regenerating device according to claim 27, further comprising:

a VCO that outputs a regeneration symbol clock, a regeneration sample clock, and the ½ symbol frequency component, based on the phase control signal, wherein
the base band signal to be input into said in-phase component square calculation unit and said orthogonal component square calculation unit is a signal that has been sampled based on the regeneration sample clock,
said squared-addition signal component correlation calculating unit calculates the correlation value using the ½ symbol frequency component output from said VCO, and
said squared-subtraction signal component correlation calculating unit calculates correlation value using the ½ symbol frequency component output from said VCO.

29. A timing regenerating device according to claim 27, further comprising:

an oscillator that outputs an asynchronous sample clock and the ½ symbol frequency component, wherein
the base band signal to be input into said in-phase component square calculation unit and said orthogonal component square calculation unit is a signal that has been sampled by the asynchronous sample clock,
said squared-addition signal component correlation calculating unit calculates the correlation value using the ½ symbol frequency component output from said oscillator, and
said squared-subtraction signal component correlation calculating unit calculates the correlation value using the ½ symbol frequency component output from said oscillator.

30. A timing regenerating device according to claim 27, wherein said adder adds the signed squared in-phase and orthogonal components to obtain the squared addition signal, and the subtracter subtracts the signed squared in-phase component from the signed squared orthogonal component or vice versa to obtain the squared subtraction signal.

31. A timing regenerating device according to claim 27, wherein said adder adds the signed squared in-phase and orthogonal components and, multiplies a sign {±1} of this sum to a square root of an absolute value of the sum, thereby to obtain the squared addition signal, and the subtracter subtracts the signed squared in-phase component from the signed squared orthogonal component or vice versa, and multiplies a sign {±1} of this difference to a square root of an absolute value of the difference, thereby to obtain the squared subtraction signal.

32. A timing regenerating device according to claim 27, wherein
when the in-phase component of a weighted correlation signal is negative, said averaging unit inverts the signs of the in-phase and orthogonal components of the weighted correlation signal respectively, and generates a correlation signal with the inverted signs as a first correlation signal,
when the in-phase component of the weighted correlation signal is positive, said averaging unit generates this weighted correlation signal as a first correlation signal,
when the orthogonal component of the weighted correlation signal is negative, said averaging unit inverts the signs of the in-phase and orthogonal components of the weighted correlation signal respectively, and generates a correlation signal with the inverted signs as a second correlation signal,
when the orthogonal component of the weighted correlation signal is positive, said averaging unit generates this weighted correlation signal as a second correlation signal, and
said averaging unit calculates averages of the first and second correlation signals respectively, and when the vector length of the averaged first correlation signal is larger than the vector length of the averaged second correlation signal, said averaging unit outputs the averaged first correlation signal as the weighted average correlation signal, and when the vector length of the averaged second correlation signal is larger than the vector length of the averaged first correlation signal, said averaging unit outputs the averaged second correlation signal as the weighted average correlation signal.

33. A timing regenerating device according to claim 27, further comprising:

a clip detecting unit configured to receive digitally sampled in-phase and quadrature components of the base band signal having the preamble symbol, and either converts both the in-phase and orthogonal components of the base band signal into "0" when at least one value of the in-phase and orthogonal components of the base band signal is outside a predetermined range or outputs the received, digitally sampled in-phase and quadrature comnponents of the base band signal straight when at least one value of the in-phase and orthogonal components of the base band signal are within the predetermined range, wherein
the base band signal input into said in-phase component square calculation unit and into said orthogonal component square calculation unit is the base band signal output of said clip detecting unit.

34. A demodulator comprising:
an antenna that receives a radio signal;
a frequency converting unit that converts the frequency of the received radio signal into the frequency of a base band signal;
an A/D converting unit that converts the base band signal into a digital base band signal based on a sampling at two times a symbol rate using a regeneration sample clock;
a timing regenerating device including:
   an in-phase component square calculation unit that receives a base band signal having a preamble symbol, calculates square of an in-phase component of the base band signal and outputs the squared in-phase component;
   an in-phase multiplier that multiplies a sign bit (±1) of the in-phase component of the base band signal to the squared in-phase component and outputs the result as signed squared in-phase component;
   an orthogonal component square calculation unit that receives the base band signal, calculates square of an orthogonal component of the base band signal and outputs the squared orthogonal component;
   an orthogonal multiplier that multiplies a sign bit (±1) of the orthogonal component of the base band signal to the squared orthogonal component and outputs the result as a signed squared orthogonal component;
   a squared-preamble in-phase correlation calculating unit that calculates a correlation value between the signed squared in-phase component and a ½ symbol frequency component, and outputs the correlation value as an in-phase correlation signal;
   a squared-preamble orthogonal correlation calculating unit that calculates a correlation value between the signed squared orthogonal component and the ½ symbol frequency component, and outputs the correlation value as an orthogonal correlation signal;
   a vector combination selecting unit that compares the magnitudes of the in-phase and orthogonal correlation signals, matches the direction of a vector obtained from the in-phase or orthogonal correlation signals whichever is smaller to the direction of a vector obtained from the in-phase or orthogonal correlation signals whichever is larger, combines these signals, and outputs a correlation signal after the combination as a combined correlation signal;
   a timing phase difference calculating unit that outputs a phase control signal from a vector angle shown by the combined correlation signal;
   a VCO that outputs a regeneration symbol clock, a regeneration sample clock, and the ½ symbol frequency component, based on the phase control signal, wherein
      the base band signal to be input into the in-phase component square calculation unit and the orthogonal component square calculation unit is a signal that has been sampled based on the regeneration sample clock,
      said squared-preamble in-phase correlation calculating unit calculates the correlation value using the ½ symbol frequency component output from said VCO, and
      said squared-preamble orthogonal correlation calculating unit calculates the correlation value using the ½ symbol frequency component output from said VCO;
   a phase detecting unit that detects advancement/delay of a timing phase using the base band signal sampled based on the regeneration sample clock, and outputs detected signals as phase detection signals;
   a phase detection signal averaging unit that calculates an average of the phase detection signals, and outputs the average as a phase advance/delay signal, wherein
      said VCO outputs the regeneration symbol clock, the regeneration sample clock, and the ½ symbol frequency component, based on the phase control signal and the phase advance/delay signal; and
   a data deciding unit that extracts Nyquist point data from the digital base band signal using the regeneration symbol clock, decides the extracted Nyquist point data, and outputs the data as demodulated data.

35. A demodulator comprising:
an antenna that receives a radio signal;
a frequency converting unit that converts the frequency of the received radio signal into the frequency of a base band signal;
an A/D converting unit that converts the base band signal into a digital base band signal based on a sampling at two times a symbol rate using a regeneration sample clock;
a timing regenerating device including:
   an in-phase component square calculation unit that receives a base band signal having a preamble symbol, calculates square of an in-phase component of the base band signal and outputs the squared in-phase component;
   an in-phase multiplier that multiplies a sign bit (±1) of the in-phase component of the base band signal to the squared in-phase component and outputs the result as signed squared in-phase component;
   an orthogonal component square calculation unit that receives the base band signal, calculates square of an orthogonal component of the base band signal and outputs the squared orthogonal component;
   an orthogonal multiplier that multiplies a sign bit (±1) of the orthogonal component of the base band signal to the squared orthogonal component and outputs the result as a signed squared orthogonal component;
   a squared-preamble in-phase correlation calculating unit that calculates a correlation value between the signed squared in-phase component and a ½ symbol frequency component, and outputs the correlation value as an in-phase correlation signal;
   a squared-preamble orthogonal correlation calculating unit that calculates a correlation value between the signed squared orthogonal component and the ½ symbol frequency component, and outputs the correlation value as an orthogonal correlation signal;
   a vector combination selecting unit that compares the magnitudes of the in-phase and orthogonal correlation signals, matches the direction of a vector obtained from the in-phase or orthogonal correlation signals whichever is smaller to the direction of a vector obtained from the in-phase or orthogonal correlation signals whichever is larger, combines these signals, and outputs a correlation signal after the combination as a combined correlation signal;
   a timing phase difference calculating unit that outputs a phase control signal from a vector angle shown by the combined correlation signal;
   an oscillator that outputs an asynchronous sample clock and the ½ symbol frequency component, wherein the base band signal to be input into said in-phase component square calculation unit and said orthogonal component square calculation unit is a signal that has been sampled based on the asynchronous sample clock, said squared-preamble in-phase correlation calculating unit calculates the correlation value using the ½ symbol frequency component output from said oscillator, said squared-preamble orthogonal correlation calculating unit calculates the correlation value using the ½ symbol frequency component output from said oscillator; and a data deciding unit that extracts Nyquist point data from the digital base band signal using the regeneration symbol clock, decides the extracted Nyquist point data, and outputs the data as demodulated data.

36. A demodulator comprising:

an antenna that receives a radio signal;

a frequency converting unit that converts the frequency of the received radio signal into the frequency of a base band signal;

an A/D converting unit that converts the base band signal into a digital base band signal based on a sampling at two times a symbol rate using a regeneration sample clock;

a timing regenerating device including:
  an in-phase component square calculation unit that receives a base band signal having a preamble symbol, calculates square of an in-phase component of the base band signal and outputs the squared in-phase component;
  an in-phase multiplier that multiplies a sign bit (±1) of the in-phase component of the base band signal to the squared in-phase component and outputs the result as signed squared in-phase component;
  an orthogonal component square calculation unit that receives the base band signal, calculates square of an orthogonal component of the base band signal and outputs the squared orthogonal component;
  an orthogonal multiplier that multiplies a sign bit (±1) of the orthogonal component of the base band signal to the squared orthogonal component and outputs the result as a signed squared orthogonal component;
  a squared-preamble in-phase correlation calculating unit that calculates a correlation value between the signed squared in-phase component and a ½ symbol frequency component, and outputs the correlation value as an in-phase correlation signal;
  a squared-preamble orthogonal correlation calculating unit that calculates a correlation value between the signed squared orthogonal component and the ½ symbol frequency component, and outputs the correlation value as an orthogonal correlation signal;
  a vector combination selecting unit that compares the magnitudes of the in-phase and orthogonal correlation signals, matches the direction of a vector obtained from the in-phase or orthogonal correlation signals whichever is smaller to the direction of a vector obtained from the in-phase or orthogonal correlation signals whichever is larger, combines these signals, and outputs a correlation signal after the combination as a combined correlation signal;
  a preamble detecting/timing phase difference calculating unit that calculates a vector angle and a vector length of the combined correlation signal, decides that the preamble symbol has been detected when the vector length is larger than a predetermined threshold value, calculates a timing phase difference using a vector angle shown by the combined correlation signal at that time, and outputs a phase control signal;
  an oscillator that outputs an asynchronous sample clock and the ½ symbol frequency component, wherein
    the base band signal to be input into said in-phase component square calculation unit and said orthogonal component square calculation unit is a signal that has been sampled based on the asynchronous sample clock,
    said squared-preamble in-phase correlation calculating unit calculates the correlation value using the ½ symbol frequency component output from said oscillator,
    said squared-preamble orthogonal correlation calculating unit calculates the correlation value using the ½ symbol frequency component output from said oscillator; and
  a data deciding unit that extracts Nyquist point data from the digital base band signal using the regeneration symbol clock, decides the extracted Nyquist point data, and outputs the data as demodulated data.

37. A demodulator comprising:

an antenna that receives a radio signal;

a frequency converting unit that converts the frequency of the received radio signal into the frequency of a base band signal;

an A/D converting unit that converts the base band signal into a digital base band signal based on a sampling at two times a symbol rate using a regeneration sample clock;

a timing regenerating device including:
  an in-phase component square calculation unit that receives a base band signal having a preamble symbol, calculates square of an in-phase component of the base band signal and outputs the squared in-phase component;
  an in-phase multiplier that multiplies a sign bit (±1) of the in-phase component of the base band signal to the squared in-phase component and outputs the result as signed squared in-phase component;
  an orthogonal component square calculation unit that receives the base band signal, calculates square of an orthogonal component of the base band signal and outputs the squared orthogonal component;
  an orthogonal multiplier that multiplies a sign bit (±1) of the orthogonal component of the base band signal to the squared orthogonal component and outputs the result as a signed squared orthogonal component;
  a squared-preamble in-phase correlation calculating unit that calculates a correlation value between the signed squared in-phase component and a ½ symbol frequency component, and outputs the correlation value as an in-phase correlation signal;
  a squared-preamble orthogonal correlation calculating unit that calculates a correlation value between the signed squared orthogonal component and the ½ symbol frequency component, and outputs the correlation value as an orthogonal correlation signal;
  a vector combination selecting unit that compares the magnitudes of the in-phase and orthogonal correlation signals, matches the direction of a vector obtained from the in-phase or orthogonal correlation signals whichever is smaller to the direction of a vector obtained from the in-phase or orthogonal correlation signals whichever is larger, combines these signals, and outputs a correlation signal after the combination as a combined correlation signal;

a preamble detecting/timing phase difference calculating unit that calculates a vector angle and a vector length of the combined correlation signal, decides that the preamble symbol has been detected when the vector length is larger than a predetermined threshold value, calculates a timing phase difference using a vector angle shown by the combined correlation signal at that time, and outputs a phase control signal; wherein said preamble detecting/timing phase difference calculating unit calculates a timing phase difference from a vector angle shown by a value obtained by multiplying a sign {±1} of the in-phase component to a square root of an absolute value of an in-phase component of a combined correlation signal and a value obtained by multiplying a sign {±1} of the orthogonal component to a square root of an absolute value of an orthogonal component of the combined correlation signal; and a data deciding unit that extracts Nyquist point data from the digital base band signal using the regeneration symbol clock, decides the extracted Nyquist point data, and outputs the data as demodulated data.

38. A demodulator comprising:

an antenna that receives a radio signal;

a frequency converting unit that converts the frequency of the received radio signal into the frequency of a base band signal;

an A/D converting unit that converts the base band signal into a digital base band signal based on a sampling at two times a symbol rate using a regeneration sample clock;

a timing regenerating device including:

an in-phase component square calculation unit that receives a base band signal having a preamble symbol, calculates square of an in-phase component of the base band signal and outputs the squared in-phase component;

an in-phase multiplier that multiplies a sign bit (±1) of the in-phase component of the base band signal to the squared in-phase component and outputs the result as signed squared in-phase component;

an orthogonal component square calculation unit that receives the base band signal, calculates square of an orthogonal component of the base band signal and outputs the squared orthogonal component;

an orthogonal multiplier that multiplies a sign bit (±1) of the orthogonal component of the base band signal to the squared orthogonal component and outputs the result as a signed squared orthogonal component;

an adder that adds the signed squared in-phase and orthogonal components to generate a squared addition signal, and outputs the squared addition signal;

a subtracter that subtracts the signed squared in-phase component from the signed squared orthogonal component or vice versa to generate a squared subtraction signal, and outputs the squared subtraction signal;

a squared-addition signal component correlation calculating unit that calculates a correlation value between the squared addition signal and a ½ symbol frequency component, and outputs this correlation value as an addition correlation signal;

a squared-subtraction signal component correlation calculating unit that calculates a correlation value between the squared subtraction signal and the ½ symbol frequency component, and outputs this correlation value as a subtraction correlation signal;

a vector selecting unit that compares the magnitudes of the addition and subtraction correlation signals, selects the addition correlation signal or the subtraction correlation signal whichever is larger, and outputs this signal as a selected correlation signal;

a timing phase difference calculating unit that outputs a phase control signal from a vector angle shown by the selected correlation signal;

a VCO that outputs a regeneration symbol clock, a regeneration sample clock, and the ½ symbol frequency component, based on the phase control signal, wherein the base band signal to be input into the in-phase component square calculation unit and the orthogonal component square calculation unit is a signal that has been sampled based on the regeneration sample clock, said squared-addition signal component correlation calculating unit calculates the correlation value using the ½ symbol frequency component output from said VCO, said squared-subtraction signal component correlation calculating unit calculates the correlation value using the ½ symbol frequency component output from said VCO; and a data deciding unit that extracts Nyquist point data from the digital base band signal using the regeneration symbol clock, decides the extracted Nyquist point data, and outputs the data as demodulated data.

39. A demodulator comprising:

an antenna that receives a radio signal;

a frequency converting unit that converts the frequency of the received radio signal into the frequency of a base band signal;

an A/D converting unit that converts the base band signal into a digital base band signal based on a sampling at two times a symbol rate using an asynchronous sample clock;

a timing regenerating device including:

an in-phase component square calculation unit that receives a base band signal having a preamble symbol, calculates square of an in-phase component of the base band signal and outputs the squared in-phase component;

an in-phase multiplier that multiplies a sign bit (±1) of the in-phase component of the base band signal to the squared in-phase component and outputs the result as signed squared in-phase component;

an orthogonal component square calculation unit that receives the base band signal, calculates square of an orthogonal component of the base band signal and outputs the squared orthogonal component;

an orthogonal multiplier that multiplies a sign bit (±1) of the orthogonal component of the base band signal to the squared orthogonal component and outputs the result as a signed squared orthogonal component;

a squared-preamble in-phase correlation calculating unit that calculates a correlation value between the signed squared in-phase component and a ½ symbol frequency component, and outputs the correlation value as an in-phase correlation signal;

a squared-preamble orthogonal correlation calculating unit that calculates a correlation value between the signed squared orthogonal component and the ½ symbol frequency component, and outputs the correlation value as an orthogonal correlation signal;

a vector combination selecting unit that compares the magnitudes of the in-phase and orthogonal correlation signals, matches the direction of a vector obtained from the in-phase or orthogonal correlation signals whichever is smaller to the direction of a vector obtained from the in-phase or orthogonal correlation signals whichever is larger, combines these signals, and outputs a correlation signal after the combination as a combined correlation signal;

a timing phase difference calculating unit that outputs a phase control signal from a vector angle shown by the combined correlation signal; wherein said timing phase difference calculating unit calculates a timing phase difference from a square root of the in-phase component and the vector angle of a square root of the orthogonal component of the combined correlation signal;

a data interpolating unit that interpolates the digital base band signal that has been sampled by the asynchronous sample clock, and outputs the interpolated data as an interpolated base band signal; and a data deciding unit that extracts a Nyquist point of the interpolated base band signal based on a phase control signal, decides data at the extracted Nyquist point, and outputs the data as demodulated data.

40. A demodulator comprising:

an antenna that receives a radio signal;

a frequency converting unit that converts the frequency of the received radio signal into the frequency of a base band signal;

an A/D converting unit that converts the base band signal into a digital base band signal based on a sampling at two times a symbol rate using the asynchronous sample clock;

a timing regenerating device including:
  an in-phase component square calculation unit that receives a base band signal having a preamble symbol, calculates square of an in-phase component of the base band signal and outputs the squared in-phase component;

an in-phase multiplier that multiplies a sign bit (±1) of the in-phase component of the base band signal to the squared in-phase component and outputs the result as signed squared in-phase component;

an orthogonal component square calculation unit that receives the base band signal, calculates square of an orthogonal component of the base band signal and outputs the squared orthogonal component;

an orthogonal multiplier that multiplies a sign bit (±1) of the orthogonal component of the base band signal to the squared orthogonal component and outputs the result as a signed squared orthogonal component;

a squared-preamble in-phase correlation calculating unit that calculates a correlation value between the signed squared in-phase component and a ½ symbol frequency component, and outputs the correlation value as an in-phase correlation signal;

a squared-preamble orthogonal correlation calculating unit that calculates a correlation value between the signed squared orthogonal component and the ½ symbol frequency component, and outputs the correlation value as an orthogonal correlation signal;

a vector combination selecting unit that compares the magnitudes of the in-phase and orthogonal correlation signals, matches the direction of a vector obtained from the in-phase or orthogonal correlation signals whichever is smaller to the direction of a vector obtained from the in-phase or orthogonal correlation signals whichever is larger, combines these signals, and outputs a correlation signal after the combination as a combined correlation signal;

a preamble detecting/timing phase difference calculating unit that calculates a vector angle and a vector length of the combined correlation signal, decides that the preamble symbol has been detected when the vector length is larger than a predetermined threshold value, calculates a timing phase difference using a vector angle shown by the combined correlation signal at that time, and outputs a phase control signal;

a clip detecting unit that receives the base band signal having a preamble symbol, converts both the in-phase and orthogonal components of the base band signal into "0" when at least one value of the in-phase and orthogonal components of the base band signal is outside a predetermined range, and outputs the base band signal straight when at least one value of the in-phase and orthogonal components of the base band signal is within the predetermined range, wherein the base band signal to be input into said in-phase component square calculation unit and said orthogonal component square calculation unit is the base band signal output from said clip detecting unit;

a data interpolating unit that interpolates the digital base band signal that has been sampled by the asynchronous sample clock, and outputs the interpolated data as an interpolated base band signal; and a data deciding unit that extracts a Nyquist point of the interpolated base band signal based on a phase control signal, decides data at the extracted Nyquist point, and outputs the data as demodulated data.

41. A demodulator comprising:

an antenna that receives a radio signal;

a frequency converting unit that converts the frequency of the received radio signal into the frequency of a base band signal;

an A/D converting unit that converts the base band signal into a digital base band signal based on a sampling at two times a symbol rate using an asynchronous sample clock;

a timing regenerating device including:
  an in-phase component square calculation unit that receives a base band signal having a preamble symbol, calculates square of an in-phase component of the base band signal and outputs the squared in-phase component;

an in-phase multiplier that multiplies a sign bit (±1) of the in-phase component of the base band signal to the squared in-phase component and outputs the result as signed squared in-phase component;

an orthogonal component square calculation unit that receives the base band signal, calculates square of an orthogonal component of the base band signal and outputs the squared orthogonal component;

an orthogonal multiplier that multiplies a sign bit (±1) of the orthogonal component of the base band signal to the squared orthogonal component and outputs the result as a signed squared orthogonal component;

an adder that adds the signed squared in-phase and orthogonal components to generate a squared addition signal, and outputs the squared addition signal;

a subtracter that subtracts the signed squared in-phase component from the signed squared orthogonal component or vice versa to generate a squared subtraction signal, and outputs the squared subtraction signal;

a squared-addition signal component correlation calculating unit that calculates a correlation value between the squared addition signal and a ½ symbol frequency component, and outputs this correlation value as an addition correlation signal;

a squared-subtraction signal component correlation calculating unit that calculates a correlation value between the squared subtraction signal and the ½ symbol frequency component, and outputs this correlation value as a subtraction correlation signal;

a vector selecting unit that compares the magnitudes of the addition and subtraction correlation signals, selects the addition correlation signal or the subtraction correlation signal whichever is larger, and outputs this signal as a selected correlation signal;

a timing phase difference calculating unit that outputs a phase control signal from a vector angle shown by the selected correlation signal;

a VCO that outputs a regeneration symbol clock, a regeneration sample clock, and the ½ symbol frequency component, based on the phase control signal, wherein the base band signal to be input into the in-phase component square calculation unit and the orthogonal component square calculation unit is a signal that has been sampled based on the regeneration sample clock, said squared-addition signal component correlation calculating unit calculates the correlation value using the ½ symbol frequency component output from said VCO, said squared-subtraction signal component correlation calculating unit calculates the correlation value using the ½ symbol frequency component output from said VCO;

a phase detecting unit that detects advancement/delay of a timing phase using the base band signal sampled based on the regeneration sample clock, and outputs detected signals as phase detection signals;

a phase detection signal averaging unit that calculates an average of the phase detection signals, and outputs the average as a phase advance/delay signal, wherein said VCO outputs the regeneration symbol clock, the regeneration sample clock, and the ½ symbol frequency component, based on the phase control signal and the phase advance/delay signal;

a data interpolating unit that interpolates the digital base band signal that has been sampled by the asynchronous sample clock, and outputs the interpolated data as an interpolated base band signal; and a data deciding unit that extracts a Nyquist point of the interpolated base band signal based on a phase control signal, decides data at the extracted Nyquist point, and outputs the data as demodulated data.

\* \* \* \* \*

UNITED STATES PATENT AND TRADEMARK OFFICE
CERTIFICATE OF CORRECTION

PATENT NO.     : 6,683,493 B1
DATED          : January 27, 2004
INVENTOR(S)    : Fujimura et al.

It is certified that error appears in the above-identified patent and that said Letters Patent is hereby corrected as shown below:

<u>Title page,</u>
Items [12] and [75], Inventors, should read:
-- [12]   United States Patent
          Fujimura et al.

[75]   Inventors:  Akinori Fujimura, Tokyo (JP); Seiji Okubo, Tokyo (JP); Toshiharu Kojima, Tokyo (JP) --

Signed and Sealed this

Sixth Day of April, 2004

JON W. DUDAS
*Acting Director of the United States Patent and Trademark Office*